US012485141B2

(12) United States Patent
Kessler et al.

(10) Patent No.: US 12,485,141 B2
(45) Date of Patent: Dec. 2, 2025

(54) HIGH MOLECULAR IODINE CONCENTRATION COMPOSITIONS, PHARMACEUTICAL FORMULATIONS, PREPARATION AND USES

(71) Applicant: I2PURE CORP., Reston, VA (US)

(72) Inventors: Jack Kessler, Southborough, MA (US); Eugene Duan, Lexington, MA (US)

(73) Assignee: I2PURE CORP., Ashburn, VA (US)

( * ) Notice: Subject to any disclaimer, the term of this patent is extended or adjusted under 35 U.S.C. 154(b) by 0 days.

(21) Appl. No.: 17/402,467

(22) Filed: Aug. 13, 2021

(65) Prior Publication Data

US 2022/0211751 A1     Jul. 7, 2022

Related U.S. Application Data

(60) Provisional application No. 63/211,543, filed on Jun. 16, 2021, provisional application No. 63/147,743, filed on Feb. 9, 2021, provisional application No. 63/080,769, filed on Sep. 20, 2020, provisional application No. 63/077,520, filed on Sep. 11, 2020, provisional application No. 63/068,969, filed on Aug. 21, 2020, provisional application No. 63/065,479, filed on Aug. 13, 2020.

(51) Int. Cl.
| | |
|---|---|
| *A61K 33/18* | (2006.01) |
| *A61K 9/00* | (2006.01) |
| *A61K 47/10* | (2017.01) |
| *A61K 47/18* | (2017.01) |
| *A61P 31/02* | (2006.01) |
| *A61P 31/04* | (2006.01) |
| *A61P 31/10* | (2006.01) |
| *A61P 31/12* | (2006.01) |

(52) U.S. Cl.
CPC ............ *A61K 33/18* (2013.01); *A61K 9/0014* (2013.01); *A61K 47/10* (2013.01); *A61K 47/186* (2013.01); *A61P 31/02* (2018.01); *A61P 31/04* (2018.01); *A61P 31/10* (2018.01); *A61P 31/12* (2018.01)

(58) Field of Classification Search
None
See application file for complete search history.

(56) References Cited

U.S. PATENT DOCUMENTS

| | | |
|---|---|---|
| 1,676,554 A | 7/1928 | Hoopman |
| 1,896,171 A | 2/1933 | Harry |
| 2,550,622 A | 4/1951 | Taub |
| 3,279,981 A | 10/1966 | Geiger et al. |
| 4,381,380 A | 4/1983 | Leveen |
| 4,937,072 A | 6/1990 | Kessler |
| 4,954,351 A | 9/1990 | Sackler |
| 5,013,859 A | 5/1991 | Globus |
| 5,227,161 A | 7/1993 | Kessler |
| 5,370,815 A | 12/1994 | Kessler |
| 5,629,024 A | 5/1997 | Kessler |
| 5,639,481 A | 6/1997 | Kessler |
| 5,648,075 A | 7/1997 | Kessler |
| 5,849,291 A | 12/1998 | Kessler |
| 5,885,592 A | 3/1999 | Duan |
| 5,897,872 A | 4/1999 | Picciano |
| 5,922,314 A | 7/1999 | Hoang |
| 5,962,029 A | 10/1999 | Duan |
| 6,015,836 A | 1/2000 | Martin |
| RE36,605 E | 3/2000 | Kessler |
| 6,153,105 A | 11/2000 | Tadlock |
| 6,228,354 B1 | 5/2001 | Jeng |
| 6,248,335 B1 | 6/2001 | Duan |
| 6,261,577 B1 | 7/2001 | Kessler |
| 6,432,426 B2 | 8/2002 | Kessler |
| 6,838,050 B1 | 1/2005 | Green |
| 6,902,747 B1 | 6/2005 | Gradle et al. |
| 7,147,873 B2 | 12/2006 | Scholz |
| 8,303,994 B2 | 11/2012 | Kessler |
| 8,357,392 B2 | 1/2013 | Kelly |
| 8,691,290 B2 | 4/2014 | Kessler |
| 8,808,722 B2 | 8/2014 | Scholz |
| 8,840,932 B2 | 9/2014 | Scholz |
| 9,114,156 B2 | 8/2015 | Childers |
| 2001/0056127 A1 | 12/2001 | Kessler |
| 2002/0119205 A1 | 8/2002 | Hassan |

(Continued)

FOREIGN PATENT DOCUMENTS

| | | |
|---|---|---|
| CN | 106163577 A  *  11/2016 | |
| EP | 0742006 A1     11/1996 | |

(Continued)

OTHER PUBLICATIONS

IP Office Brazil, Preliminary Office Action for Brazilian Patent Application No. BR112019001054-8, Mailing Date: Nov. 23, 2021, 5 pages with English translation.
IP Office China, Second Office Action for Chinese Patent Application No. 201780054315.6. Mailing Date: Dec. 22, 2021. 8 pages with English translation.
IP Office Japan, Notice of Reasons for Rejection for Application No. 2019-524128, with English translation, May 24, 2021.
IP Office Japan, Decision of Refusal for Application No. 2019-524128, with English translation, Jan. 20, 2022.
IP Office Mexico, Second Office Action for Mexican Patent Application No. MX/a/2019/000902, dated Oct. 6, 2021. 8 pages with English translation.

(Continued)

*Primary Examiner* — Danah Al-Awadi
(74) *Attorney, Agent, or Firm* — Perkins Coie LLP

(57) ABSTRACT

Embodiments of high molecular iodine concentration composition and pharmaceutical formulation are disclosed, which may be biostatic persistent, biocidal persistent, and have prolonged biocidal activities against microorganisms for hours after administration of the composition or pharmaceutical formulation. Articles comprising high molecular iodine concentration composition and pharmaceutical formulation, as well as preparation and use of same are also disclosed.

9 Claims, 25 Drawing Sheets
(23 of 25 Drawing Sheet(s) Filed in Color)

(56) References Cited

U.S. PATENT DOCUMENTS

| | | |
|---|---|---|
| 2003/0018306 A1 | 1/2003 | Bucay-Couto |
| 2003/0026852 A1 | 2/2003 | Duan |
| 2004/0091553 A1 | 5/2004 | Foret |
| 2005/0233006 A1 | 10/2005 | Gradle |
| 2006/0177511 A1 | 8/2006 | Scholz |
| 2006/0280809 A1 | 12/2006 | Leshchiner |
| 2009/0017139 A1 | 1/2009 | Kessler |
| 2015/0118688 A1 | 4/2015 | Weidemaier |
| 2015/0147400 A1 | 5/2015 | Kessler |
| 2017/0208814 A1 | 7/2017 | Kolsky |
| 2018/0136204 A1 | 5/2018 | Weidemaier |
| 2018/0296594 A1 | 10/2018 | Kessler |
| 2018/0360048 A1 | 12/2018 | Kolsky |
| 2019/0105344 A1 | 4/2019 | Kessler |
| 2019/0151045 A1 | 5/2019 | Boyd |
| 2019/0381093 A1* | 12/2019 | Kessler .............. A61K 33/18 |
| 2020/0129543 A1* | 4/2020 | Löscher .............. A61P 31/02 |
| 2020/0283317 A1 | 9/2020 | Boyd |

FOREIGN PATENT DOCUMENTS

| | | |
|---|---|---|
| EP | 1280538 B1 | 9/2004 |
| JP | S51144738 A | 12/1976 |
| JP | S60185720 A | 9/1985 |
| JP | H08310959 A | 11/1996 |
| JP | 2005289866 A | 10/2005 |
| JP | 2005306764 A | 11/2005 |
| JP | 2009039525 A | 2/2009 |
| JP | 2009541330 A | 11/2009 |
| WO | 2009032919 A1 | 3/2009 |
| WO | 2012002943 A1 | 1/2012 |
| WO | 2012135055 A2 | 10/2012 |
| WO | 2012177251 A1 | 12/2012 |
| WO | 2015153258 A1 | 10/2015 |
| WO | 2018193093 A1 | 10/2018 |
| WO | 2021030350 A1 | 2/2021 |
| WO | 2022036280 A1 | 2/2022 |

OTHER PUBLICATIONS

USPTO/ISR International Search Report and Written Opinion for PCT/US2021/046035, Jan. 6, 2022.
CDC, Fungal Nail Infections, https://www.cdc.gov/fungal/nail-infections.html, May 27, 2020.
Duan Y, et al., "Properties of an enzyme-based low-level iodine disinfectant," J Hosp Infect. Nov. 1999; 43(3 ):219-29.
Favero, "Iodine—Champagne in a Tin Cup," Infection Control and Hospital Epidemiology. Jan.-Feb. 1982; 3(1):30-2.
Furnée CA. Prevention and control of iodine deficiency: a review of a study on the effectiveness of oral iodized oil in Malawi. Eur J Clin Nutr. Nov. 1997;51 Suppl 4:S9-10. PMID: 9598786.
Glick PL et al., "Iodine toxicity secondary to continuous povidone-iodine mediastinal irrigation in dogs." J Surg Res. Nov. 1990;49(5):428-34.
Gottardi, W. "The uptake and release of molecular iodine by the skin: chemical and bactericidal evidence of residual effects caused by povidone-iodine preparations" Journal of Hospital Infection, 1995, vol. 29, pp. 9-18.
Gottardi, W., 1991. Iodine and iodine compounds. In: Block, S.S. (Ed.), Disinfection, Sterilization, and Preservation. Lippincott Williams & Wilkins, Philadelphia, pp. 152-166.
Gottardi, W. "Iodine and disinfection: theoretical study on mode of action, efficiency, stability, and analytical aspects in the aqueous system." Arch Pharm (Weinheim), 1999. 332(5): pp. 151-157.
Fearmonti et al., "A Review of Scar Scales and Scar Measuring Devices," Eplasty, 2010:10 e43.
Hickey et al., "Control of the Amount of Free Molecular Iodine in Iodine Germicides," J Pharm Pharmacol. Dec. 1997; 49(12): 1195-9.
IP Office China, First Office Action for Chinese Patent Application No. 201780054315.6. Mailing Date: Feb. 23, 2021. 11 pages with English translation.
IP Office Europe, extended European Search Report for EP17831741.8, May 20, 2020, 7 pages.
IP Office India, First Examination Report for IN 201917006786, Oct. 26, 2020.
IP Office Korea, International Search Report and Written Opinion for PCT/US2017/042726, Oct. 30, 2017, 12 pages.
IP Office Korea, Notice of Preliminary Rejection for Application No. 10-2019-7005137, with English translation, Oct. 25, 2021.
IP Office Mexico, First Examination Report for Mexican Patent Application No. MX/a/2019/000902. Mail Date: May 21, 2021. 9 pages with English translation.
IP Office Russia, Official Action and Search Report for RU2019104862 with English translation, Nov. 26, 2020.
Ip Office Taiwan, Pre-Notification Office Action for TW106124496 with English translation, Jul. 29, 2021.
JPO, Notice of Reasons for Refusal for Japanese Patent Application No. 2019-524128. Mail Date: May 24, 2021. 14 pages with English translation.
Mayo Clinic, Fungal Nail Diagnosis and Treatment; https://www.mayoclinic.org/diseases-conditions/nail-fungus/diagnosis-treatment/drc-20353300, Jul. 14, 2020.
Mhatre, Amol M. et al. (2018): Functionalized glass fiber membrane for extraction of iodine species, Separation Science and Technology.
Nava-Villalba et al, "6-Iodolactone, key mediator of antitumoral properties of iodine," Prostaglandins & other Lipid Mediators, 2014; vol. 112, pp. 27-33.
Simescu M, Varciu M, Nicolaescu E, Gnat D, Podoba J, Mihaescu M, Delange F. Iodized oil as a complement to iodized salt in schoolchildren in endemic goiter in Romania. Horm Res. 2002;58(2):78-82.
Untoro J, Schultink W, West CE, Gross R, Hautvast JG. Efficacy of oral iodized peanut oil is greater than that of iodized poppy seed oil among Indonesian schoolchildren. Am J Clin Nutr. Nov. 2006;84(5):1208-14. doi: 10.1093/ajcn/84.5.1208. PMID: 17093176. 10.1159/000064657. PMID: 12207166.
USPTO, Final Office Action for U.S. Appl. No. 16/088,992, filed Jul. 30, 2021.
USPTO, Nonfinal Office Action for U.S. Appl. No. 16/088,992, filed Oct. 29, 2020.
USPTO/ISR Invitation To Pay Additional Fees for PCT/US2021/046035, Oct. 13, 2021.
IP Office Mexico, Third Office action for Mexican Patent Application No. MX/a/2019/000902. Mailing Date: Mar. 15, 2022. 10 pages with English translation.
IP Office Russia, Official Action for RU2019104862/04(009225). Mailing date: Feb. 21, 2022. 13 pages with English translation.
USPTO/ISA Invitation To Pay Additional Fees for PCT/US2022/070687, Mar. 31, 2022. 2 pages.
IP Office Australia, Exam Report No. 1 for Australian Application No. 2017300497, Mailing Date: Jun. 2, 2022.
IP Office Taiwan, Decision on First Patent Exam/Official Action for Taiwan Patent Application No. 106124496. Mailing date: Apr. 1, 2022. 8 pages with translation.
USPTO/ISA International Search Report and Written Opinion for PCT/US2022/070687, Jun. 21, 2022, 2022. 14 pages.
Tyagi, M. et al., "Iodinated Natural Rubber Latex: Preparation, Characterisation & Antibacterial Activity Assessment," Artificial Cells, Blood Substitutes, and Biotechnology. 2000; 28(6):521-33.
Duckworth, P. et al., "A novel flow-system to establish experimental biofilms for modeling chronic wound infection and testing the efficacy of wound dressings," Microbiological Research. Jul. 2018; 215:141-47.
Nakamura, K. et al., "Antimicrobial Characteristics of Iodine-Releasing Silicone Membrane," Bokin Bobai. Jan. 2011; 39(6):337-42.
Aoki S. et al., "Antibacterial Properties of Silicone Membranes after a Simple Two-Step Immersion Process in Iodine and Silver Nitrate Solutions," Biocontrol Science. Jan. 2018; 23(3):97-105.
Morain, W. et al., "Iodinated Silicone—An Antibacterial Alloplastic Materials," Plastic and reconstructive surgery. Feb. 1977; 59(2):216-22.

(56) References Cited

OTHER PUBLICATIONS

Edis, Z. et al., "Antimicrobial Biomaterial on Sutures, Bandages and Face Masks with Potential for Infection Control," Polymers. 2022; 14:1-29.
Ding, Z. et al., "A New Method of Preparation of Iodine Glycerin," China Academic Journal Electronic Publishing House. Dec. 31, 1992, 1994-2022. 3 pages with English translation.
The Japanese Pharmacopoeia, Fourteenth Edition, Part II—Dental Iodine Glycerin, Apr. 1, 2001 (URL: https://www.drugfuture.com/Pharmacopoeia/JP14e/).
IP Office Australia, Exam Report No. 2 for Australian Application No. 2017300497, Mailing Date: Mar. 31, 2023.
IP Office Australia, Exam Report No. 3 for Australian Application No. 2017300497, Mailing Date: May 31, 2023.
IP Office China, Third Office Action for Chinese Application No. 201780054315.6, Dec. 9, 2022. 8 pages with English summary.
IP Office Europe, European Examination Report for EP17831741.8, Dec. 7, 2022. 4 pages.
IP Office Japan, Notice of Reasons for Rejection for Japanese Patent Application No. 2022-084378. Mail Date: May 12, 2023. 4 pages with English translation.
IP Office Korea, Last Preliminary Rejection for Application No. 10-2019-7005137, with English translation, Oct. 17, 2022.
IP Office Russia, Official Action for RU2019104862/04(009225). Mailing date: May 17, 2023. 13 pages with English translation.
IP Office Taiwan, Letter of Pending Patent Application under Re-Examination for TW106124496 with English translation, May 9, 2023.
USPTO, Notice of Allowance for U.S. Appl. No. 16/088,992, filed Jul. 14, 2022. 23 pages.
USPTO, Notice of Allowance for U.S. Appl. No. 16/088,992, filed Oct. 28, 2022. 16 pages.
IP Office Canada, Office Action for Canadian Application No. 3,031,447, Mailing Date: Aug. 21, 2023. 6 pages.
IP Office China, Fourth Office Action for Chinese Application No. 201780054315.6, Sep. 5, 2023. 6 pages with English summary.
IP Office Japan, Notice of Reasons for Rejection for Japanese Patent Application No. 2019-524128. Mail Date: Aug. 3, 2023. 18 pages with English translation.
IP Office Korea, Second Notice of Preliminary Rejection for Application No. 10-2019-7005137, 7 pages with English translation, Sep. 6, 2023.
Nedelea AG et al., "Testing the efficacy of topical antimicrobial treatments using a single, two-, and five-species chronic wound biofilm model," J. Appl. Microbiol. Jan. 2022;132(1):715-724.
USPTO/ISA International Search Report and Written Opinion for PCT/US2022/081324, Mar. 10, 2023. 14 pages.
Falkenberg, Torkel et al., "Iodine loaded nanoparticles with commercial applicability increase survival in mice cancer models with low degree of side effects," Cancer Reports, 2023; e1843.
IP Office Australia, Exam Report No. 1 for Australian Application No. 2023203406, Mailing Date: Jun. 12, 2024.
IP Office Canada, Office Action for Canadian Application No. 3,031,447, Mailing Date: Jun. 13, 2024. 4 pages.
IP Office Japan, Office Action from Appeal Board for Japanese Patent Application No. 2019-524128. Mail Date: Mar. 5, 2024, 6 pages with English translation.
IP Office Japan, Notice of Reasons for Refusal for Japanese Patent Application No. 2022-084378. Mail Date: Feb. 13, 2024. 11 pages with English translation.
IP Office Australia, Exam Report No. 2 for Australian Application No. 2023203406, Mailing Date: Jun. 5, 2025.
IP Office Europe, extended European Search Report for EP21856832.7, Oct. 10, 2024, 15 pages.
IP Office Europe, extended European Search Report for EP22856717.8, Jun. 3, 2025, 15 pages.
IP Office Japan, Decision of Rejection for Japanese Patent Application No. 2022-084378. Mail Date: Oct. 1, 2024.
Jennings, M. et al., "Quaternary Ammonium Compounds: An Antimicrobial Mainstay and Platform for Innovation to Address Bacterial Resistance," ACS Infectious Diseases, 1, 288-303, May 2015.
Office Action received for Brazil Patent Application No. 112019001054, mailed on Jul. 8, 2025, 24 pages (11 pages of original office action and 13 pages of English Translation).

* cited by examiner

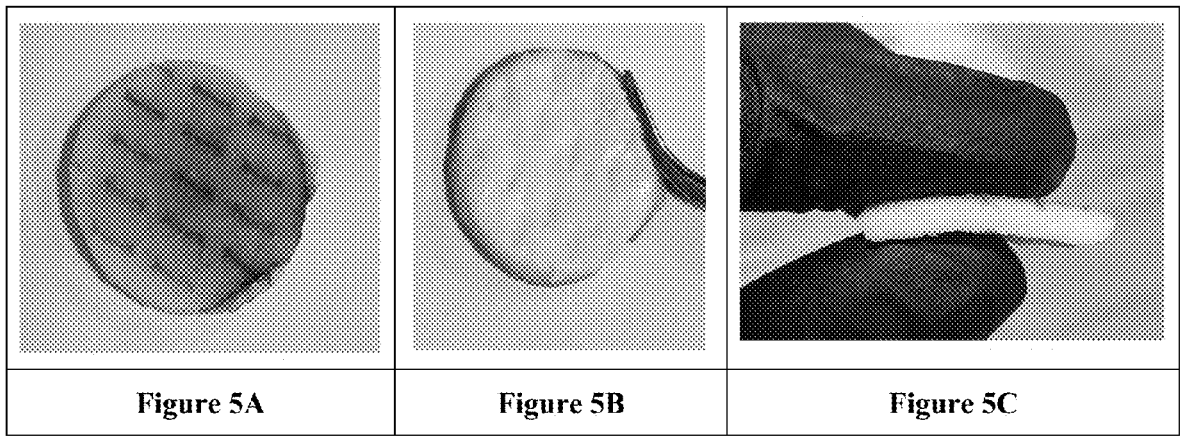

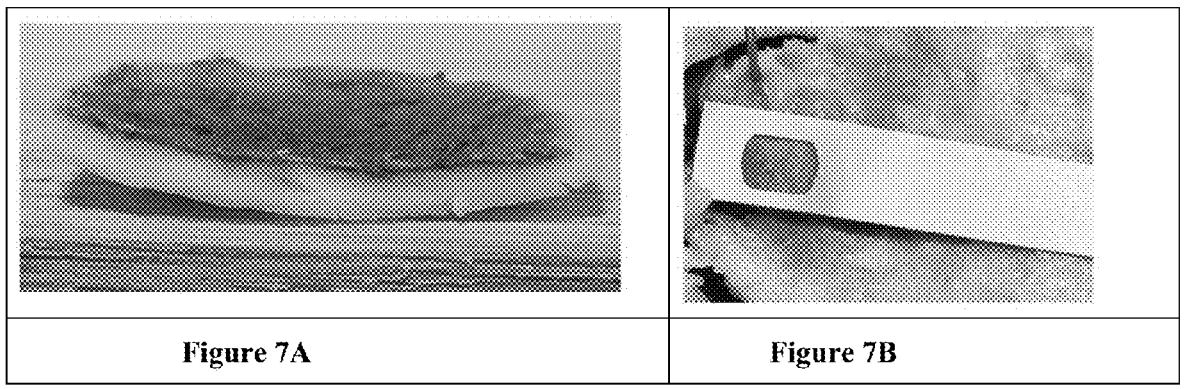

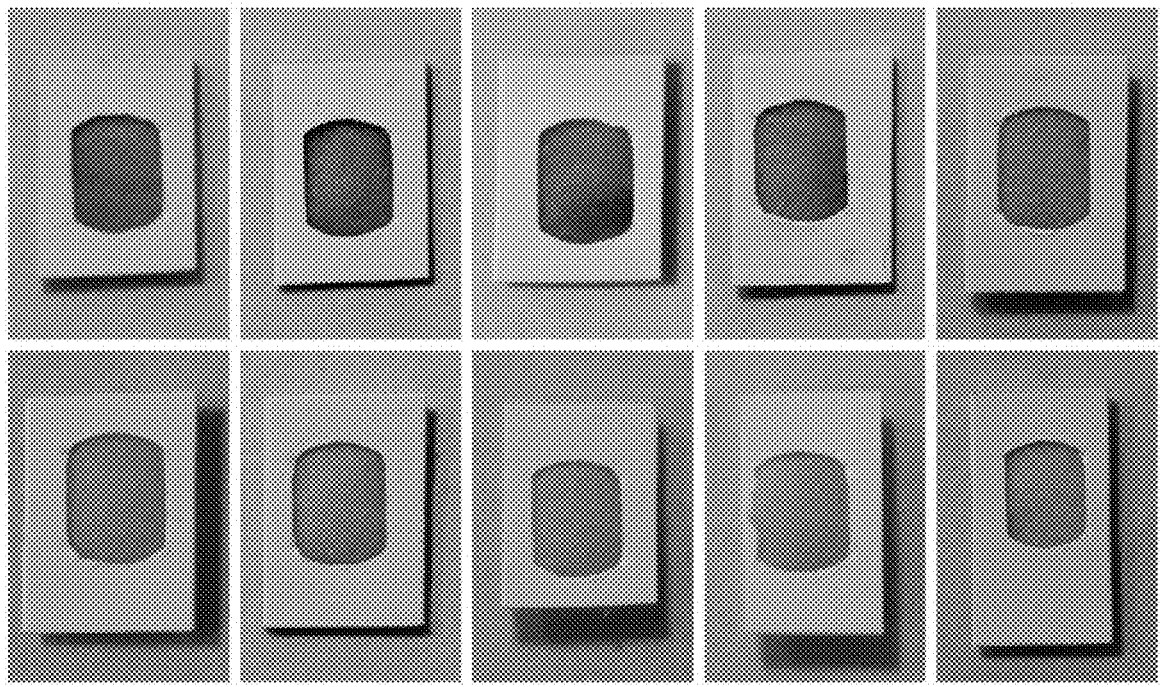

(30 min 424 ppm)

(30 min 948 ppm)

(30 min 1,100 ppm)

(30 min 1,274 ppm)

(30 min 1,500 ppm)

(30 min 4,077ppm)

(30 min 8,703ppm)

T (60 min 8,703ppm)

T (120 min 8,703ppm)

(120 min 15,200 ppm)

(30 min PVP-I)

(30 min Lugol's Application)

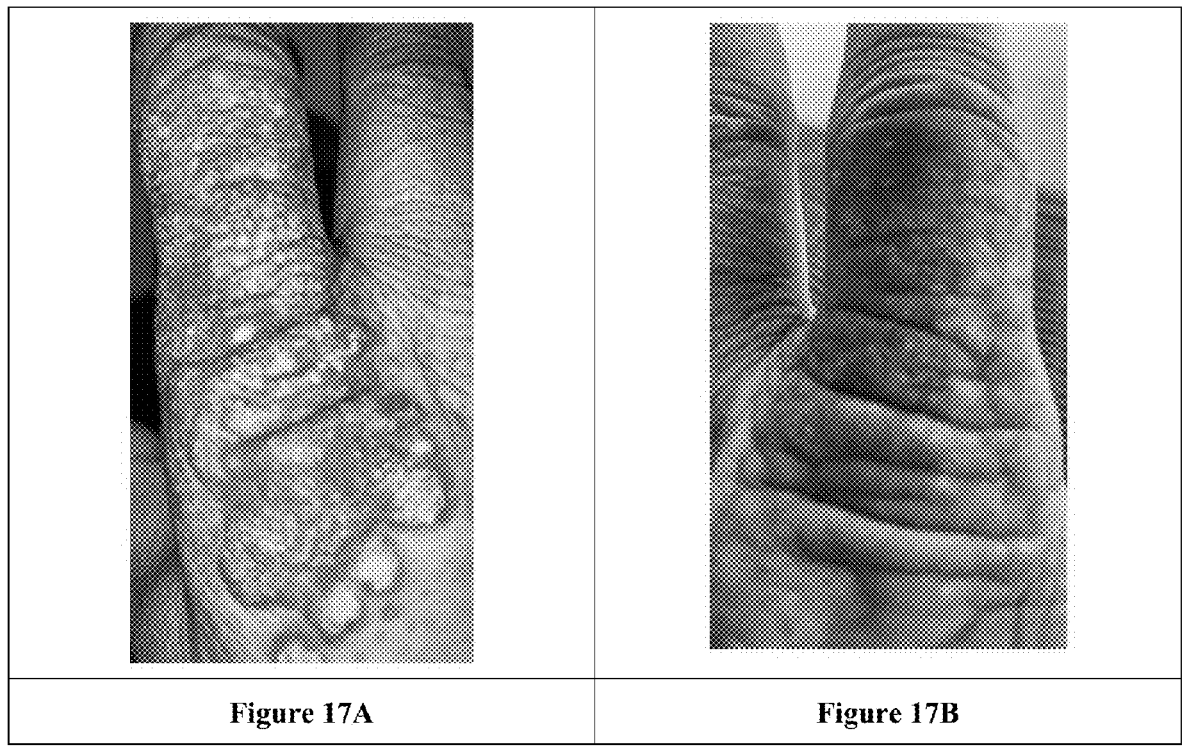
Figure 17A | Figure 17B

 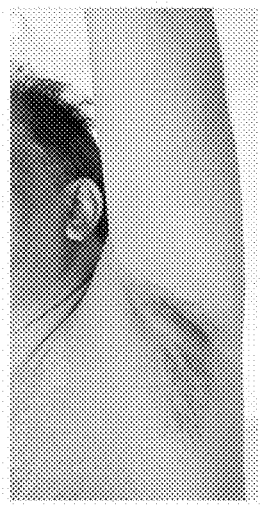
| Figure 20A | Figure 20B |

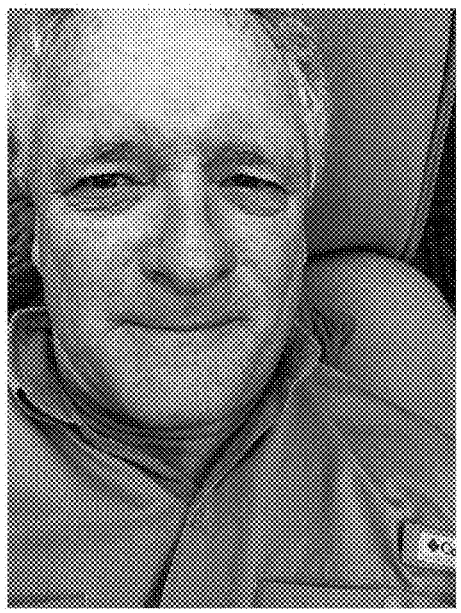 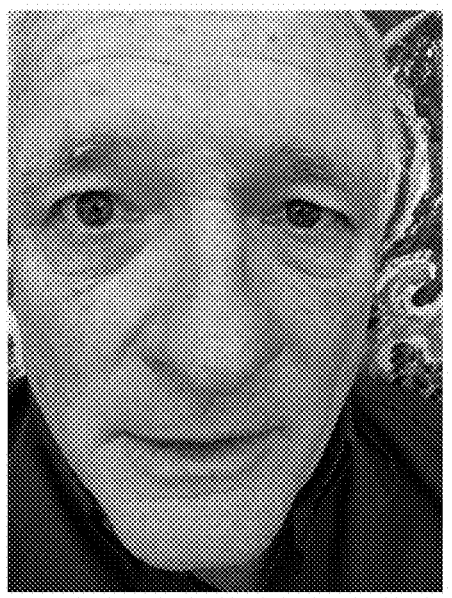
| Figure 21A | Figure 21B |

HIGH MOLECULAR IODINE CONCENTRATION COMPOSITIONS, PHARMACEUTICAL FORMULATIONS, PREPARATION AND USES

CROSS-REFERENCE TO RELATED APPLICATIONS

This application claims the benefit of U.S. Provisional Patent Application Nos. 63/065,479, filed Aug. 13, 2020, 63/068,969, filed Aug. 21, 2020, 63/077,520, filed Sep. 11, 2020, 63/080,769, filed Sep. 20, 2020, 63/147,743, filed Feb. 9, 2021, and 63/211,543, filed Jun. 16, 2021, all of which are incorporated herein by reference in their entireties.

TECHNICAL FIELD

This invention relates to compositions and pharmaceutical formulations having high concentrations of molecular iodine (high molecular iodine concentration composition and pharmaceutical formulation), articles comprising the high molecular iodine concentration compositions or pharmaceutical formulations, methods of preparing the high molecular iodine concentration compositions or pharmaceutical formulations, and methods of using the high molecular iodine concentration compositions or pharmaceutical formulations.

BACKGROUND

Molecular iodine is known to inactivate viruses, fungi and bacteria and this has led to widespread use of iodine biocides to kill pathogens on skin. Killing or inactivating topical pathogens with iodine including bacteria, viruses and fungi on skin is an established prophylactic that has been used for over 100 years in hygiene and medicine. Commercial iodine disinfectants largely rely upon a formulation approach that utilizes iodophors to complex molecular iodine. Iodophors are water-based solutions that contain at least one polymeric complexing agent that limits the hydration of molecular iodine and prevents loss of molecular iodine. The overall concentration of molecular iodine declines once it is hydrated as described in detail by Waldemar Gottardi (Gottardi, W., *Iodine and disinfection: theoretical study on mode of action, efficiency, stability, and analytical aspects in the aqueous system*. Arch Pharm (Weinheim), 1999. 332(5): pp. 151-7). Iodophors necessarily contain extremely low concentrations of unbound or free molecular iodine and very high concentrations of other iodine species such a tri-iodide and iodide. The iodophor formulations are highly acidic compositions that stain skin and other materials and exhibit toxicity.

In this application, we describe high molecular iodine concentration compositions that provide high concentrations of molecular iodine on and in skin with little or no staining, skin irritation, and/or toxicity.

SUMMARY

The present disclosure is directed to compositions, formulations (including pharmaceutical formulations), preparations, and uses of a high molecular iodine concentration composition.

In certain embodiments, the high molecular iodine concentration composition comprises:
molecular iodine having a concentration of about 1,274 ppm to about 150,000 ppm, about 1,274 ppm to about 100,000 ppm, about 1,274 ppm to about 68,000 ppm, about 1,274 ppm to about 66,000 ppm, about 1,274 ppm to about 15,200 ppm, about 1,400 ppm to about 68,000 ppm, about 1,400 ppm to about 15,200 ppm, about 1,400 ppm to about 66,000 ppm, or about 1,500 ppm by weight/volume (wt/v); and
an organic carrier having a concentration of no less than about 93.5% wt, no less than about 95% wt, no less than about 98% wt, or no less than about 99% wt of the total weight of the high molecular iodine concentration composition.

In certain embodiments, the high molecular iodine concentration pharmaceutical formulation comprises the high molecular iodine concentration composition.

In certain embodiments, the organic carrier of the high molecular iodine concentration composition is a pharmaceutically acceptable organic carrier and the high molecular iodine concentration composition is a pharmaceutically acceptable composition. In certain embodiments, the high molecular iodine concentration pharmaceutical formulation further comprises a second pharmaceutically acceptable carrier.

In certain embodiments, the high molecular iodine concentration composition or pharmaceutical formulation may be a solution, a viscous solution, a cream, an ointment, or a suspension which is used by applying a few drops to the hands and rubbing the hands or applying a few drops to a treatment area on the skin and rubbing the solution into the skin. In certain embodiments, the high molecular iodine concentration composition or pharmaceutical formulation is a hand sanitizer. In certain embodiments, the high molecular iodine concentration composition or pharmaceutical formulation is a hand sanitizer which has an $I_2$ concentration of 1,500 ppm (wt/v).

In certain embodiments, the high molecular iodine concentration composition or pharmaceutical formulation is non-aqueous. In certain embodiments, the high molecular iodine concentration composition or pharmaceutical formulation is substantially non-aqueous. In certain embodiments, the high molecular iodine concentration composition or pharmaceutical formulation is water-free. In certain embodiments, the high molecular iodine concentration composition or pharmaceutical formulation is substantially water-free. In certain embodiments, the high molecular iodine concentration composition or pharmaceutical formulation is alcohol-free. In certain embodiments, the high molecular iodine concentration composition or pharmaceutical formulation is substantially alcohol-free. In certain embodiments, the high molecular iodine concentration composition or pharmaceutical formulation is complexed iodine-free. In certain embodiments, the high molecular iodine concentration composition or pharmaceutical formulation is substantially complexed iodine-free. In certain embodiments, the high molecular iodine concentration composition or pharmaceutical formulation is free of iodine species that are not molecular iodine. In certain embodiments, the high molecular iodine concentration composition is substantially free of iodine species that are not molecular iodine. In certain embodiments, the high molecular iodine concentration composition or pharmaceutical formulation has an iodine uptake ratio of at least about 99%, at least about 95%, at least about 90%, at least about 85%, at least about 80%, at least 75%, or at least 70%.

In certain embodiments, the high molecular iodine concentration composition or pharmaceutical formulation is stable for at least 2 years at room temperature. In certain embodiments, the high molecular iodine concentration composition or pharmaceutical formulation is stable for at least 3 months when stored in closed container at room temperature. In certain embodiments, the high molecular iodine concentration composition or pharmaceutical formulation is stable for at least 3 months when stored in closed container in the dark at room temperature.

In certain embodiments, the high molecular iodine concentration composition or pharmaceutical formulation is non-staining, stain free or substantially stain free.

In certain embodiments, the high molecular iodine concentration composition or pharmaceutical formulation is not irritative to a subject skin.

In certain embodiments, the high molecular iodine concentration composition or pharmaceutical formulation is not cytotoxic.

In certain embodiments, the high molecular iodine concentration composition or pharmaceutical formulation is biostatic persistent.

In certain embodiments, the high molecular iodine concentration composition or pharmaceutical formulation is biocidal persistent.

In certain embodiments, the high molecular iodine concentration composition or pharmaceutical formulation has a prolonged biocidal activity.

Embodiments of a method of disinfecting a surface or space by killing or inhibiting the growth of a microorganism and/or parasite on a surface or in a space are disclosed. The method comprises applying an effective amount of the high molecular iodine concentration composition to the surface or space.

Embodiments of a method of killing or inhibiting the growth of a microorganism and/or parasite on or in a subject are disclosed. The method comprises administering a therapeutically effective amount or prophylactically effective amount of the high molecular iodine concentration composition or pharmaceutical formulation to the subject. In certain embodiments, the microorganism is present at a treatment site in or on the subject. In certain embodiments, an undesired biofilm is present at the treatment site.

Embodiments of a method of disrupting and/or eliminating an undesired biofilm present at a treatment site in or on a subject are disclosed. The method comprises administering a therapeutically effective amount or prophylactically effective amount of the high molecular iodine concentration composition or pharmaceutical formulation to the undesired biofilm present at the treatment site in or on the subject.

Embodiments of a method of treating or preventing a condition associated with a microorganism and/or parasite of a subject are disclosed. The method comprises administering a therapeutically effective amount or prophylactically effective amount of the high molecular iodine concentration composition or pharmaceutical formulation to the subject.

Provided are embodiments of a method of treating or preventing a skin condition of a subject comprising administering a therapeutically effective amount or prophylactically effective amount of the high molecular iodine concentration composition or pharmaceutical formulation to the subject. In certain embodiments, examples of the skin condition include, without limitation:

1) skin conditions associated with a biological reaction of a subject to an exogenously introduced irritant; and
2) skin conditions associated with an autoimmune disease.

In certain embodiments, the skin conditions include acne and rosacea.

In certain embodiments, the autoimmune disease is diabetes.

Provided are embodiments of a method of fostering wound-healing or preventing a wound of a subject comprising administering to the subject a therapeutically effective amount or a prophylactically effective amount of the high molecular iodine concentration composition or pharmaceutical formulation.

Provided are embodiments of a method of treating a surgical site to foster healing, prevent infection, and/or inhibit tumor recurrence in a subject in need comprising administering to the subject a therapeutically effective amount or a prophylactically effective amount of the high molecular iodine concentration composition or pharmaceutical formulation. In certain embodiments, the method of treating a surgical site is performed as a pre-surgical treatment, a post-surgical treatment, or a treatment during a surgery.

Provided are embodiments of a method of treating or preventing an ophthalmic condition in a subject in need comprising administering to the subject a therapeutically effective amount or a prophylactically effective amount of the high molecular iodine concentration composition or pharmaceutical formulation at or proximate to a site of the ophthalmic condition.

BRIEF DESCRIPTION OF THE DRAWINGS

The patent or application file contains at least one drawing executed in color. Copies of this patent or patent application publication with color drawing(s) will be provided by the Office upon request and payment of the necessary fees.

FIG. 3A: Epidermis of the skin after epidermal application; FIG. 3B: Subcutaneous tissue of the skin after epidermal application; and FIG. 3C: Cross-section of pig skin after epidermal application.

FIGS. 5A-5C show the staining of pig skin from epidermal administration of Iodine Tincture USP solution over 90 minutes. FIG. 5A: Epidermis of the skin after epidermal application; FIG. 5B: Subcutaneous tissue of the skin after epidermal application; and FIG. 5C: Cross-section of pig skin after epidermal application.

FIG. 6A: Epidermis of the skin after epidermal application; and FIG. 6B: Cross-section of pig skin after epidermal application.

FIGS. 7A-7B show the staining of pig skin three minutes from epidermal administration of an embodiment of molecular iodine composition in glycerin ($I_2$-glycerin composition) with $I_2$ concentration of 66,000 ppm (wt/v). FIG. 7A: Epidermis of the skin after epidermal application; and FIG. 7B: Subcutaneous tissue after epidermal application shown with the epidermis removed.

FIGS. 8A-8J show SenSafe Iodine Check test strips in contact with subcutaneous tissue of pig skin at 15 min, 30 min, 45 min, 60 min, 75 min, 90 min, 120 min, 150 min, 180 min, and 210 min after an embodiment of $I_2$-glycerin composition with $I_2$ concentration of 15,200 ppm (wt/v) was applied to the subcutaneous tissue directly.

Figure 9A:
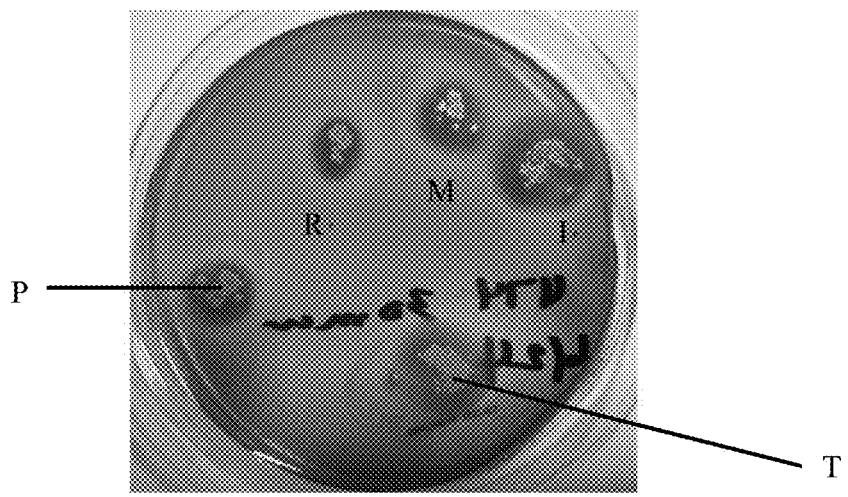
Figure 9B:
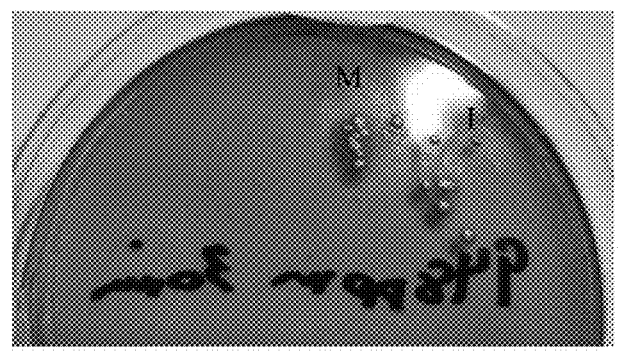
Figure 9C:
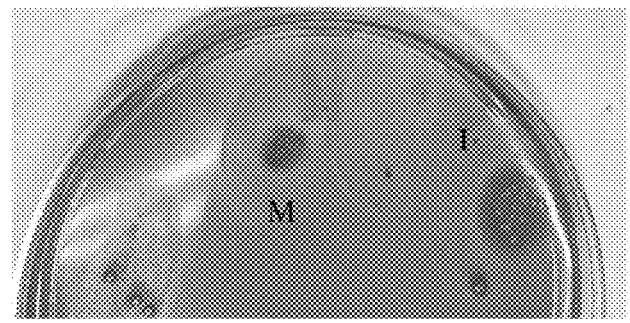
Figure 9D:
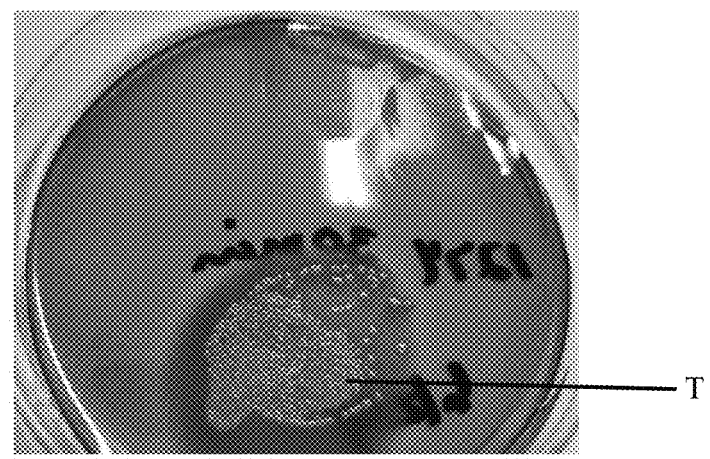
Figure 9E:
Figure 9F:
Figure 9G:
Figure 9H:
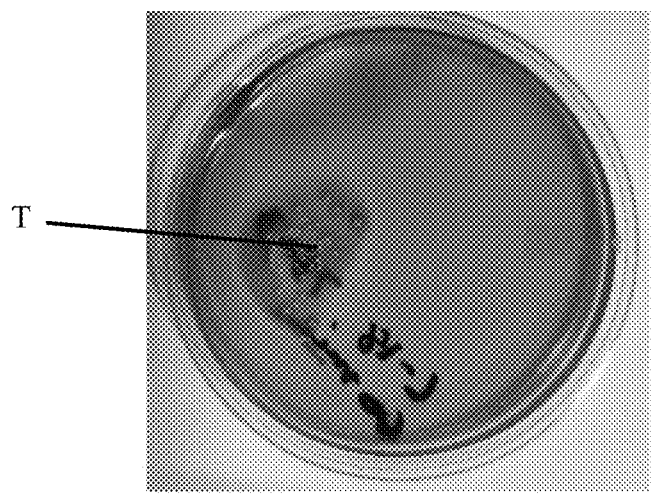
Figure 9I:
Figure 9J:
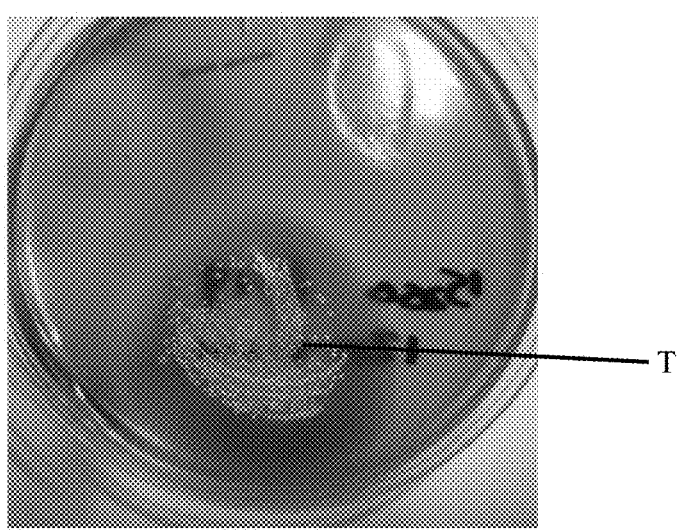
Figure 9K:
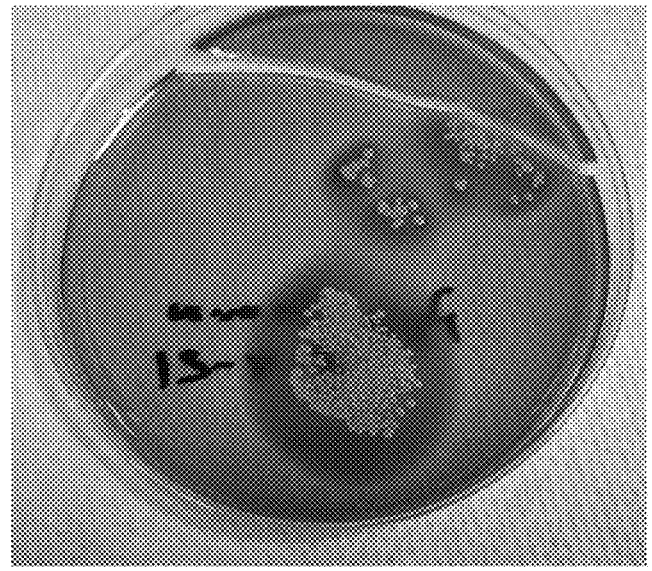
Figure 9L:

FIGS. 9A-9L show the biocidal persistent results of embodiments of $I_2$-glycerin compositions with various $I_2$ concentrations. FIG. 9A: Biocidal persistent results of challenge with *E. coli* 30 min after application of $I_2$-glycerin composition with $I_2$ concentration of 424 ppm (wt/v); FIG. 9B: Biocidal persistent results of challenge with *E. coli* 30 min after application of $I_2$-glycerin composition with $I_2$ concentration of 948 ppm (wt/v); FIG. 9C: Biocidal persistent results of challenge with *E. coli* 30 min after application of $I_2$-glycerin composition with $I_2$ concentration of 1,100 ppm (wt/v); FIG. 9D: Biocidal persistent results of challenge with *E. coli* 30 min after application of $I_2$-glycerin composition with $I_2$ concentration of 1,274 ppm; FIG. 9E: Biocidal persistent results of challenge with *E. coli* 30 min after application of $I_2$-glycerin composition with $I_2$ concentration of 1,500 ppm (wt/v); FIG. 9F: Biocidal persistent results of challenge with *E. coli* 30 min after application of $I_2$-glycerin composition with $I_2$ concentration of 4,077 ppm (wt/v); FIG. 9G: Biocidal persistent results of challenge with *E. coli* 30 min after application of $I_2$-glycerin composition with $I_2$ concentration of 8,703 ppm (wt/v); FIG. 9H: Biocidal persistent results of challenge with *E. coli* 60 min after application of $I_2$-glycerin composition with $I_2$ concentration of 8,703 ppm (wt/v); FIG. 9I: Biocidal persistent results of challenge with *E. coli* 120 min after application of $I_2$-glycerin composition with $I_2$ concentration of 8,703 ppm (wt/v); FIG. 9J: Biocidal persistent results of challenge with *E. coli* 120 min after application of $I_2$-glycerin composition with $I_2$ concentration of 15,200 ppm (wt/v); FIG. 9K: Biocidal persistent results of challenge with *E. coli* 30 min after application of 10% PVP-I; and FIG. 9L: Biocidal persistent results of challenge with *E. coli* 30 min after application of Lugol's solution.

Figure 10A:
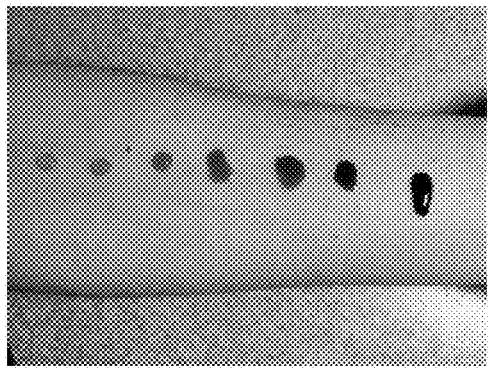
Figure 10B:
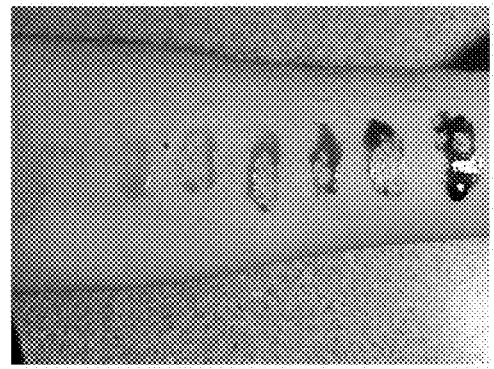
Figure 10C:
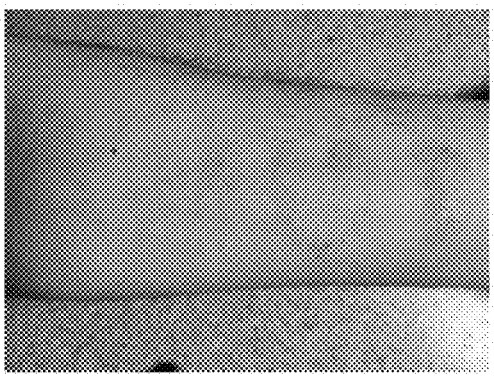
Figure 10D:
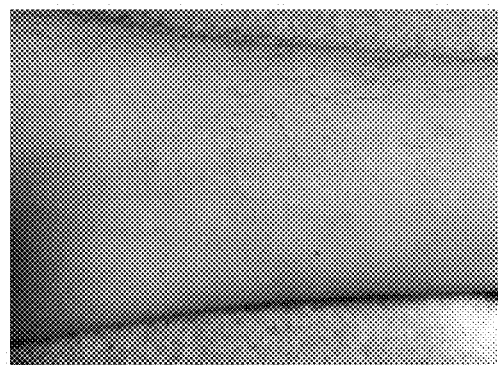
Figure 10E:

FIGS. 10A-10E show the results of administration of a series of embodiments of $I_2$-glycerin compositions with various $I_2$ concentrations prepared according to Example 8 to the forearm of a volunteer. FIG. 10A: The initial administration of the $I_2$-glycerin compositions with various $I_2$ concentrations onto the forearm of the subject; FIG. 10B shows 1 min. after the $I_2$-glycerin compositions with various $I_2$ concentrations were administered on the forearm before the residue was wiped off; FIG. 10C shows the skin of the subject at 5 minutes after the initial administration of the $I_2$-glycerin compositions with various $I_2$ concentrations; FIG. 10D shows the skin of the subject at 15 minutes after the initial administration of the $I_2$-glycerin compositions with various $I_2$ concentrations; and FIG. 10E shows the skin of the subject at 30 minutes after the initial administration of the $I_2$-glycerin compositions with various $I_2$ concentrations.

Figure 11A:
Figure 11B:
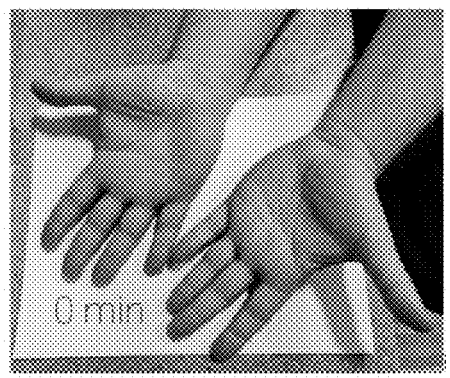

FIGS. 11A and 11B show a subject's hands before and after administration of two to three drops of an embodiment of $I_2$-glycerin composition with $I_2$ concentration of 2,200 ppm (wt/v). FIG. 11A: Before administration; and FIG. 11B: 0 min. after administration of the $I_2$-glycerin composition.

Figure 12A:
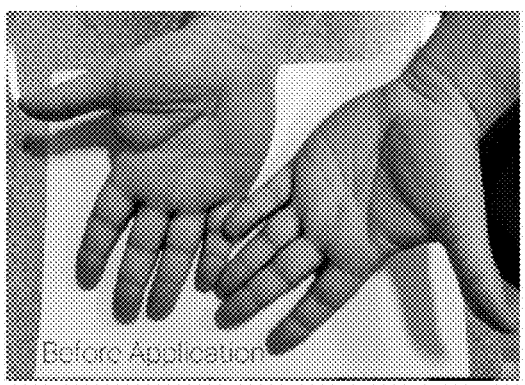
Figure 12B:
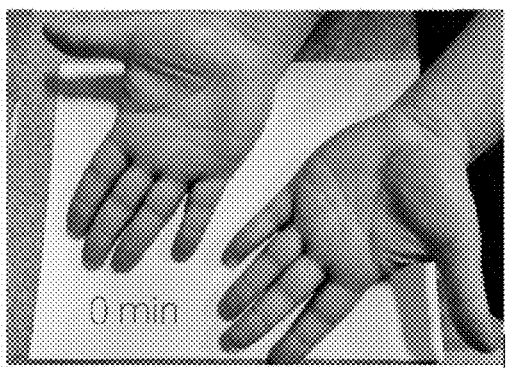

FIGS. 12A and 12B show a subject's hands before and after administration of two to three drops of an embodiment of $I_2$-glycerin composition with $I_2$ concentration of 4,400 ppm (wt/v). FIG. 12A: Before administration; FIG. 12B: 0 min. after administration of the $I_2$-glycerin composition.

Figure 13A:
Figure 13B:
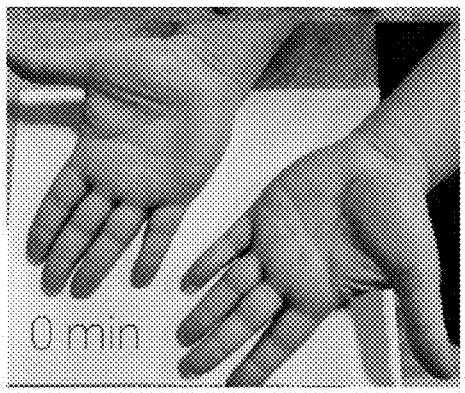

FIGS. 13A and 13B show a subject's hands before and after administration of two to three drops of an embodiment of $I_2$-glycerin composition with $I_2$ concentration of 8,400 ppm (wt/v). FIG. 13A: Before administration; FIG. 13B: 0 min. after administration of the $I_2$-glycerin composition.

Figure 14A:
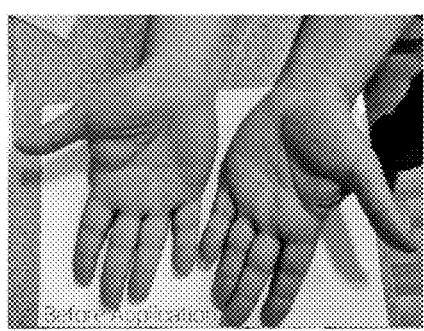
Figure 14B:
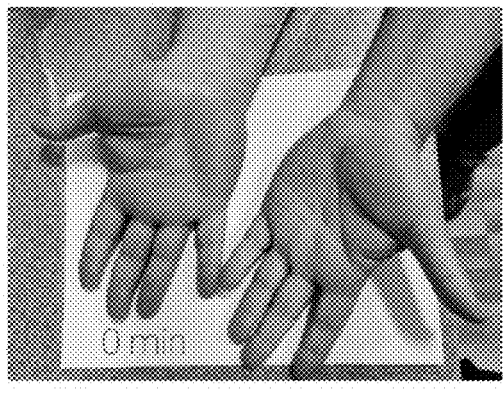

FIGS. 14A and 14B show a subject's hands before and after administration of two to three drops of an embodiment of $I_2$-glycerin composition with $I_2$ concentration of 12,250 ppm (wt/v). FIG. 14A: Before administration; FIG. 14B: 0 min. after administration of the $I_2$-glycerin composition.

Figure 15A:
Figure 15C:
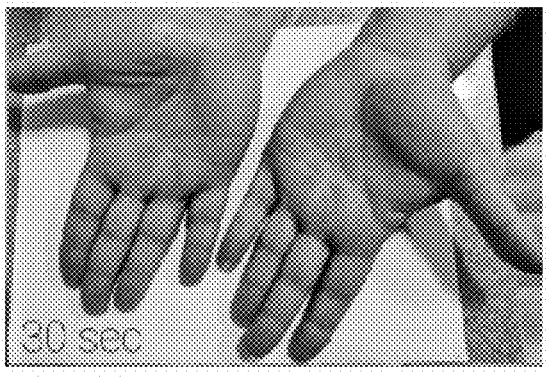
Figure 15B:
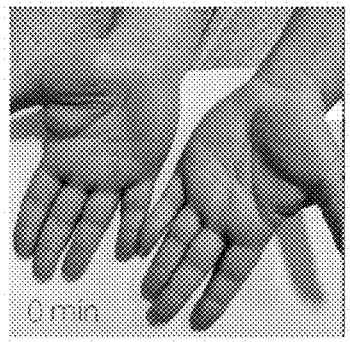
Figure 15D:
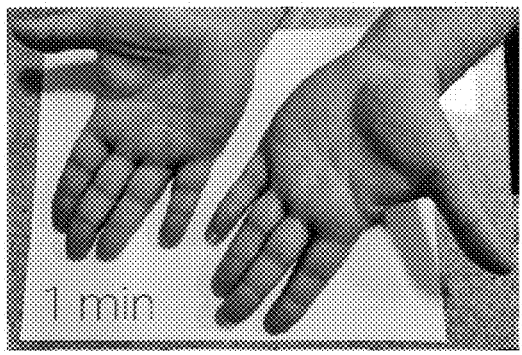
Figure 15E:
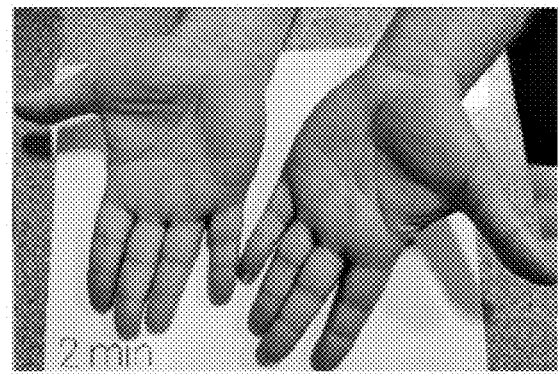

FIGS. 15A-15E show a subject's hands before and after administration of two to three drops of an embodiment of $I_2$-glycerin composition with $I_2$ concentration of 13,900 ppm (wt/v). FIG. 15A: Before administration; FIG. 15B: 0 min. after administration of the $I_2$-glycerin composition; FIG. 15C: 30 sec. after administration; FIG. 15D: 1 min. after administration; and FIG. 15E: 2 min. after administration.

Figure 16A:
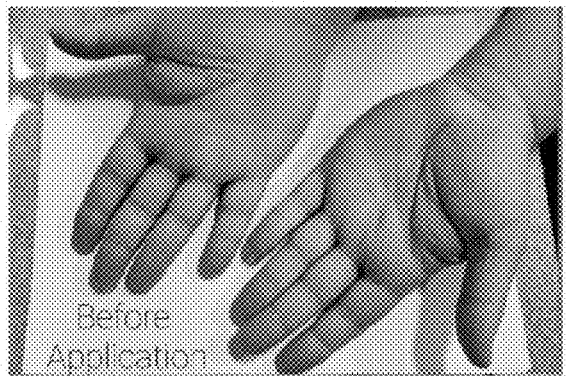
Figure 16B:
Figure 16C:
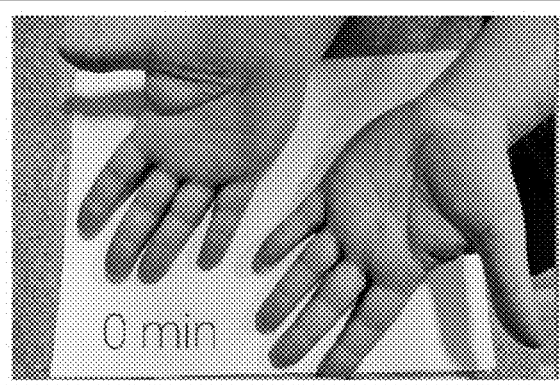
Figure 16D:
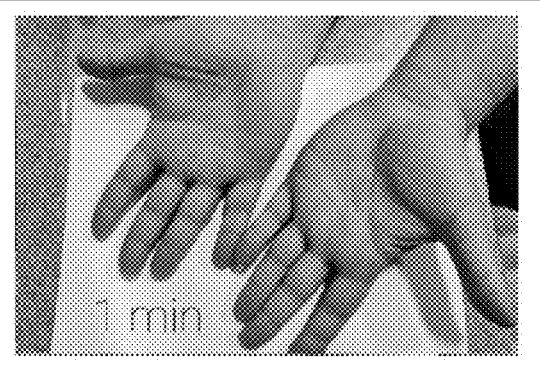
Figure 16E:
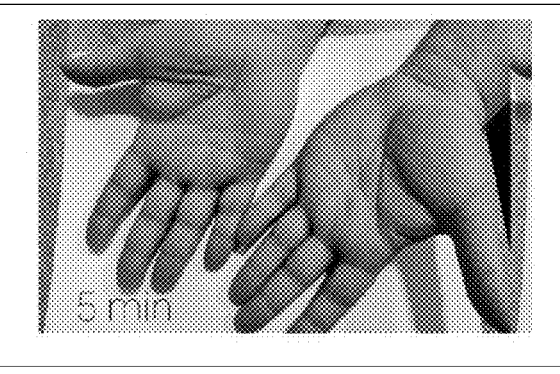
Figure 16F:
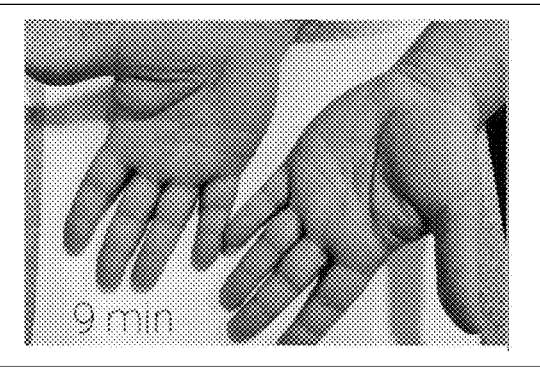

FIGS. 16A-16F show a subject's hands before and after administration of two to three drops of an embodiment of $I_2$-glycerin composition with $I_2$ concentration of 17,000 ppm (wt/v). FIGS. 16A and 16B both show the subject's hands before the administration of the $I_2$-glycerin composition; FIG. 16C: 0 min. after administration of the $I_2$-glycerin composition; FIG. 16D: 1 min. after administration; FIG. 16E: 5 min. after administration; and FIG. 16F: 9 min. after administration.

FIGS. 17A-17B show effects of an embodiment of $I_2$-glycerin composition with $I_2$ concentration of 1,500 ppm (wt/v) as prepared according to Example 1B on plaque psoriasis. FIG. 17A: Fingers of a subject having plaque psoriasis; and FIG. 17B: The fingers after treatment for one week with application of the $I_2$-glycerin composition twice a day 0.2 mL.

Figure 18A:
Figure 18B:
Figure 18C:
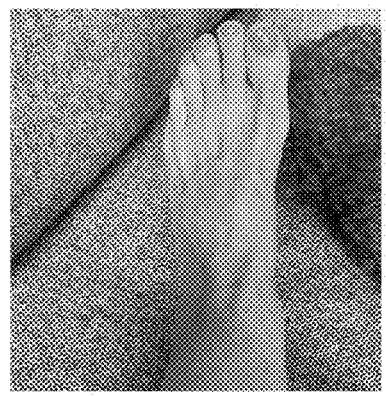
Figure 18D:
Figure 18E:

FIGS. 18A-18E show the effects of an embodiment of $I_2$-glycerin composition with $I_2$ concentration of 1,500 ppm (wt/v) as prepared according to Example 1B on bee sting. FIG. 18A: Left ankle stung by a bee; FIG. 18B: Blistering from the inflammation and swelling observed at the sting site; FIG. 18C: About 30 mins after application of the 1,500 ppm (wt/v) $I_2$-glycerin composition; FIG. 18D: About 30 minutes after the 1,500 ppm (wt/v) $I_2$-glycerin composition was applied to the area of the bee sting; FIG. 18E: The sting site after application of the 1,500 ppm (wt/v) $I_2$-glycerin composition ten times over the next 72 hours.

Figure 19A:
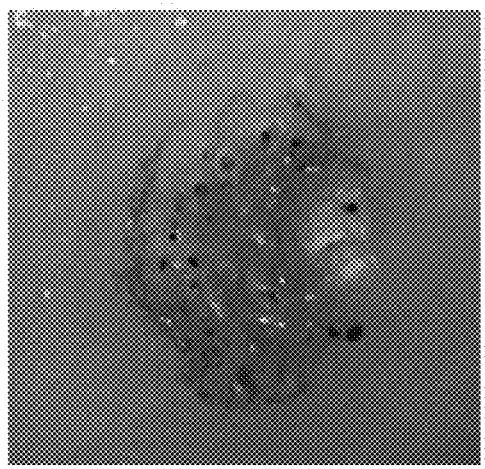
Figure 19B:
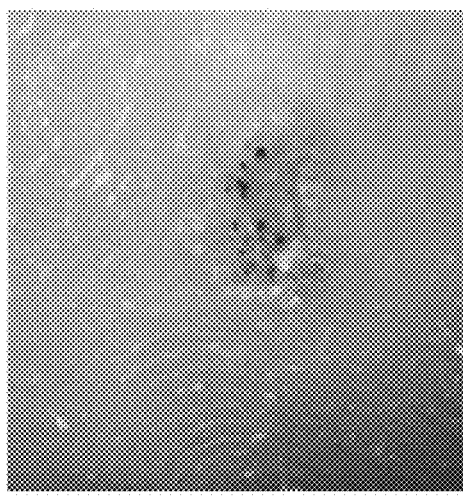
Figure 19C:
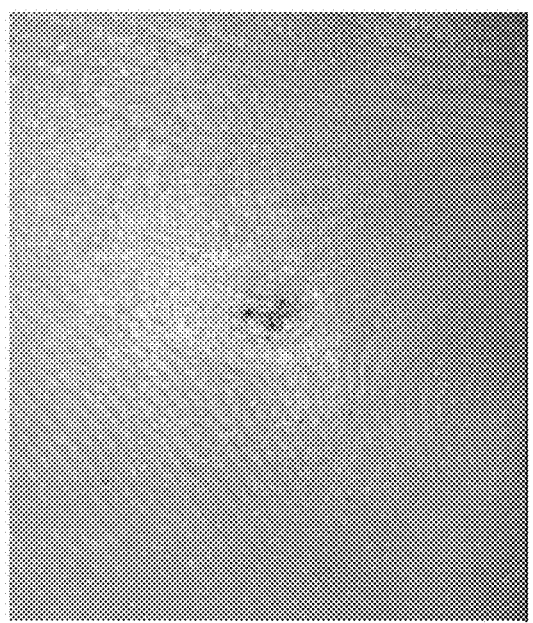

FIGS. 19A-19C show the effects of an embodiment of $I_2$-glycerin composition with $I_2$ concentration of 1,500 ppm (wt/v) as prepared according to Example 1B on a plantar wart on the bottom large right toe of a subject. FIG. 19A: The wart after two days of treatment twice a day, with one drop (0.15 mL to 0.2 mL) of the 1,500 ppm (wt/v) $I_2$-glycerin composition; FIG. 19B: The wart on the morning of the sixth day of treatment; and FIG. 19C: The wart after treatment of 2 months and 1 week.

FIG. 20A and FIG. 20B show the effects of an embodiment of $I_2$-glycerin composition with $I_2$ concentration of 1,500 ppm (wt/v) as prepared according to Example 1B on tinea. FIG. 20A: The patient's condition before treatment; and FIG. 20B: The patient after treatment of two weeks.

FIG. 21A and FIG. 21B show the effects of an embodiment of $I_2$-glycerin composition with $I_2$ concentration of 1,500 ppm (wt/v) as prepared according to Example 1B on seborrheic dermatitis. FIG. 21A: The patient's symptoms at the time of diagnosis (baseline); and FIG. 21B: The patient at day 14 of a treatment twice a day.

Figure 22A:
Figure 22B:

FIG. 22A and FIG. 22B show the effects of an embodiment of $I_2$-glycerin composition with $I_2$ concentration of 1,500 ppm (wt/v) as prepared according to Example 1B on a subject's fungal toenails. FIG. 22A: The subject's foot before treatment; and FIG. 22B: The subject's foot after thirty days of treatment twice a day with 0.2 mL.

DETAILED DESCRIPTION

Prior to the discovery of the disclosed high molecular iodine concentration compositions, iodine disinfectants available on the market were all aqueous and almost exclusively comprised of iodophors. Iodophors stabilize a low level of molecular iodine in an aqueous environment. Iodophors have been referred to as "tamed" iodine since they exhibit less toxicity than Lugol's solution which contains 170 ppm molecular iodine and the prior art ascribes iodine toxicity, irritation, and/or staining to molecular iodine. See, e.g., Glick P L et al., "Iodine toxicity secondary to continuous povidone-iodine mediastinal irrigation in dogs." J Surg Res. 1990 November; 49(5):428-34. doi: 10.1016/0022-4804(90)90191-4. PMID: 2246887.

Embodiments of high molecular iodine concentration compositions in an organic carrier (e.g., glycerin, propyl glycol) with high concentration of molecular iodine (e.g., 1,025 ppm to 150,000 ppm, about 1,274 ppm to about 150,000 ppm, about 1,274 ppm to about 100,000 ppm, about 1,274 ppm to about 68,000 ppm, about 1,274 ppm to about 66,000 ppm, about 1,274 ppm to about 15,200 ppm, about 1,400 ppm to about 68,000 ppm, 1,400 ppm to 66,000 ppm, about 1,400 ppm to about 15,200 ppm, and about 1,500 ppm by wt/v) are provided (e.g., Examples 1, 2, 4, and 8). Examples provided show that certain embodiments of the high molecular iodine concentration composition may be biostatic persistent, biocidal persistent, and/or have prolonged biocidal activities to various conditions caused by bacteria (e.g., Examples 3, 4A-4B, 4E, 5A-5C), virus (e.g., SARS COV-2, Example 6; HPV, Example 9E), fungus (e.g., Examples 3, 9F-9H), autoimmune reactions (e.g., Examples 9A and 9B), or exogeneous irritants from plants/animals (e.g., Examples 9C and 9D). Surprisingly, a substantial amount of $I_2$ diffused into subcutaneous tissue did not react with the biological matrix as reflected by the observation that outgassing of $I_2$ from subcutaneous tissue lasted for up to 2.5 hours (Example 2B). This was the first demonstration that $I_2$ remained stable in a biological tissue. Contrary to common belief that molecular iodine is responsible for irritancy, staining, and/or toxicity of aqueous iodine composition, embodiments of the high molecular iodine concentration composition showed little or no visible stain on human skin at a molecular iodine concentration of at least up to 33,000 ppm wt/v without noticeable irritancy (Example 8); and embodiments of the high molecular iodine concentration composition showed unexpectedly low cytotoxicity at least up to a molecular iodine concentration of 1,500 ppm wt/v (Example 7).

As shown in the examples provided, molecular iodine remained stable in the high molecular iodine concentration compositions (e.g., Example 1B, a 1,500 ppm (wt/v) $I_2$-glycerin composition with 1% ethanol remained stable after 113 days or 480 days at room temperature). Furthermore, the high molecular iodine concentration compositions provided biocidal persistent effects on mammal skin (e.g., Example 3, one application of 1,500 ppm (wt/v) $I_2$-glycerin composition with 1% ethanol inhibited yeast growth on pigskin for at least 20 hours). The high molecular iodine concentration compositions showed unexpected high biocidal persistence (Example 4A-4B) which neither PVP-I nor Lugol's solution achieved (Examples 4C and 4D). For example, application of a 1,500 ppm (wt/v) $I_2$-glycerin composition with 1% ethanol showed biocidal persistence for at least 1 log reduction of *S. aureus* up to at least 6 hours after the 1,500 ppm (wt/v) $I_2$-glycerin composition was applied to a skin of a subject (Example 4A); a concentration above 1,100 ppm (e.g., 1,274 ppm) provided complete kill of dried *E. coli* about 30 minutes after application to human skin; longer period for biocidal persistence were achieved as the concentration of $I_2$ increased; and at 15,000 ppm $I_2$ provided complete kill activity 2 hours after application (Example 4B). The longer biocidal persistence achieved by higher $I_2$ concentration may be due to the more $I_2$ delivered to subcutaneous tissue by compositions having higher $I_2$ concentrations (Example 2B). When biocidal embodiments of the high molecular iodine concentration composition were applied at the same amount, compositions with higher molecular iodine concentrations were more effective to neutralize more significant bioburden (Example 4E).

The high molecular iodine concentration compositions showed unexpectedly low cytotoxicity despite a high concentration of molecular iodine (Example 7) and was effective in killing or inhibiting growth of a wide range of bacteria (e.g., Examples 5A and 5B, 1,500 ppm (wt/v) $I_2$-glycerin composition with 1% ethanol, *Escherichia coli, Shigella flexneri, Staphylococcus aureus, Staphylococcus epidermidis, Serratia marcescens, Vibrio cholera* and *Salmonella enterica*). Furthermore, the high molecular iodine concentration compositions were effective in treating autoimmune skin conditions (e.g., chronic plaque psoriasis in Example 9A), hive (e.g., Example 9B), biologic reaction to exogeneous irritants from plant (e.g., poison sumac rash, Example 9C), or from animals (e.g., bee sting, Example 9D), viral infections (e.g., plantar warts, Example 9E; and SARS COV-2, Example 6), fungus infections (e.g., tinea, Example 9F; yeast infection, seborrheic dermatitis, Example 9G; and fungal nails (Example 9H). Unexpectedly, various embodiments of the high molecular iodine concentration compositions showed little or no staining after being applied to the skin of a subject. For example, as shown in Example 8, no stain was observed within 60 min. after administration for all tested $I_2$ concentrations (1,025 ppm, 1,655 ppm, 2,000 ppm, 2,200 ppm, 4,100 ppm, 4,400 ppm, 8,200 ppm, 8,400 ppm, 12,250 ppm, 13,900 ppm, 15,000 ppm, 16,500 ppm, 17,000 ppm, 33,000 ppm, 66,000 ppm, and 68,000 ppm). When the high molecular iodine concentration compositions were spread after administration, no stain was observed for the high molecular iodine concentration compositions with $I_2$ concentrations of 1,655 ppm, 2,200 ppm, 4,400 ppm, 8,400 ppm, and 12,250 ppm; a stain was observed immediately after administration for the high molecular iodine concentration compositions with $I_2$ concentrations of 13,900 ppm, 15,000 ppm, and 17,000 ppm, but the stain disappeared within 2 min, 5 min, and 10 min, respectively. When the high molecular iodine concentration compositions were left undisturbed for one minute after administration and then wiped off, the high molecular iodine concentration compositions with $I_2$ concentrations of 1,025 ppm did not stain, while the high molecular iodine concentration compositions with $I_2$ concentrations of 2,000 ppm, 4,100 ppm, 8,200 ppm, or 16,500 ppm) showed some stains that disappeared within 5 min to 30 min.

In certain embodiments, the high molecular iodine concentration compositions or pharmaceutical formulations have unexpected indications due to the high concentration of molecular iodine in the high molecular iodine concentration composition with surprisingly little or no stain or irritancy on a subject's skin, low cytotoxicity, and high stability.

Definitions

The singular forms "a," "an," and "the" include plural referents unless the context clearly dictates otherwise. Thus, for example, reference to a "gelling agent" refers to a single gelling agent as well as to several different gelling agents, reference to an "excipient" includes a single excipient as well as two or more different excipients, and the like.

The term "optional" or "optionally" means that the subsequently described circumstance may or may not occur, so that the description includes instances where the circumstance occurs and instances where it does not.

The term "pharmaceutically acceptable" in reference to an entity or ingredient is one that causes no significant adverse toxicological effects in a subject when administered to the subject.

The term "molecular iodine" refers to diatomic iodine, which is represented by the chemical symbol $I_2$ (CAS Registry Number: 7553-56-2) whether dissolved, suspended or in a solid state. The term "molecular iodine" may also be referred to as "elemental iodine" when in the solid state and is sometimes represented as "$I_2$" in this application. The term "molecular iodine" may also be referred as $I_2$, "free molecular iodine," "unbound molecular iodine," "uncomplexed molecular iodine," and "un-complexed molecular iodine" in the art. Chemical activity of molecular iodine is not reduced by association with or complexation with other polymers or iodide and therefore exhibits antimicrobial activity. In aqueous solutions only hypoiodous acid (HOI) and molecular iodine are biocidal. The active biocide in acidic iodine-based biocides is believed to be free molecular iodine.

The term "iodide" or "iodide anion" refers to the species which is represented by the chemical symbol $I^-$ (CAS Registry Number: 20461-54-5). Suitable counter-ions for the iodide anion include sodium, potassium, calcium, and the like.

The term "iodophor" refers to a mixture of molecular iodine with one or more polymers that form a complex with molecular iodine and thereby reduce the concentration of molecular iodine in the mixture, usually in an aqueous medium. Polymers that are used to form iodophors include polyvinylpyrrolidone, copolymers of N-vinyl lactams, acrylates and acrylamides, polyether glycols. Examples of polyether glycol include nonylphenolethoxylates. Combinations of polymers may also be used.

The term "all iodine species" in a sample refers to all iodine containing components in the sample.

The term "ratio of molecular iodine to all iodine species" in a composition refers to the iodine content of molecular iodine ($I_2$) in the composition divided by the iodine content of all iodine species in the composition.

The term "organic carrier" refers to an organic molecule in which molecular iodine can be dispersed and the organic molecule does not react with molecular iodine. Examples of organic carrier include glycols with molecular weight below 300 (e.g., propylene glycol, di-propylene glycol, glycerin), propylene glycol monomethyl ether acetate, dimethyl sulfoxide, alcohols (e.g., ethanol, propanols such as isopropanol and 1-propanol), and any mixtures of the foregoing.

The term "gelling agent" or "viscosity enhancer" refers to an organic molecule that increases the viscosity of a composition. Examples of gelling agent or viscosity enhancer include hydroxypropyl methylcellulose (HPMC) and cross-linked polyacrylic acid polymers (e.g., Carbopols). Examples of the gelling agents for use in the high molecular iodine concentration compositions or pharmaceutical formulations may also include, without limitation, synthetic hydrocolloids like homopolymers of acrylic acid such as those offered by Lubrizol Advanced Materials, Inc., Cleveland, OH, including Ultrez 10®, Ultrez 20®, Ultrez 30® and the Carbopols including Carbopol® 934, Carbopol® 940, Carbopol® 980, Carbopol® SC-200; methyl glucoside derivatives; alcohol esters such as monohydric alcohol esters, polyhydric alcohol esters; polyethylene glycols (PEG) such as PEG-diisostearate, propoxylated PEG monolaurate, polyglyeryl-3-laurate, natural hydrocolloids like carrageenan, locust bean gum, guar gum, acacia, tragacanth, alginic acid, gelatin, and semisynthetic hydrocolloids, e.g., carboxymethyl cellulose, methyl cellulose and hydroxypropyl methyl cellulose. Examples of the viscosity enhancing agents for use in the high molecular iodine concentration compositions or pharmaceutical formulations may also include, without limitation, methyl cellulose, microcrystalline cellulose, carboxymethyl cellulose, hydroxypropyl cellulose, hydroxymethyl cellulose, hydroxyethyl cellulose, hydroxypropylmethyl cellulose, poloxamer (copolymers of polyoxypropylene and polyoxyethylene), cross-linked homopolymers of acrylic acid like Ultrez 30, and guar gum.

The term "stable" means that the variation of the molecular iodine content of the high molecular iodine concentration composition or pharmaceutical formulation is less than 10% of the initial molecular iodine content.

The term "shelf-life" means the period of time that the high molecular iodine concentration composition or pharmaceutical formulation remains stable in a package under a storage condition. In certain embodiments, the shelf-life is at least 1 month, 2 months, 3 months, 4 months, 5 months, 6 months, 7 months, 8 months, 9 months, 10 months, 11 months, 1 year, 1.5 years, 2 years, 2.5 years, 3 years, 3.5 years, 4 years, 4.5 years, or 5 years. In certain embodiments, the storage condition is room temperature. In certain embodiments, the storage condition is in the dark at room temperature. In certain embodiments, the package is in a closed container. In certain embodiments, the package is in a closed container that prevents more than 90% environmental light from penetrating through the package to reach the high molecular iodine concentration composition or pharmaceutical formulation stored in the package.

The term "effective amount" means an amount of the high molecular iodine concentration composition or pharmaceutical formulation that is needed to effectuate a desired clinical outcome from a subject the high molecular iodine concentration composition or pharmaceutical formulation is administered to.

The term "biostatic persistence" means that after the administration of the high molecular iodine concentration composition the microorganism count at the site of administration will be equal to or lower than baseline for at least six hours post administration. The term "baseline" means the microorganism count at the site of administration immediately before administration of the high molecular iodine concentration composition. See FDA Briefing Document discussed in a Nonprescription Drugs Advisory Committee meeting dated Mar. 11, 2020 (the FDA Briefing at pp. 9-11, https://www.fda.gov/media/135559/download. The disclosed pharmaceutical formulations may also exhibit biostatic persistence.

Unless otherwise specified, the term "biocidal persistence" means that at the site of the administration of the high molecular iodine concentration composition the microorganism count measured one minute after one post administration challenge at the site and within a set period of time (e.g., 0.5 hr, 1 hr, 1.5 hr, 2 hr, 2.5 hr, 3 hr, 3.5 hr, 4 hr, 4.5 hr, 5 hr, 5.5 hr, 6 hr) of the administration of the composition will be reduced at least about 1 log lower compared to the microorganism count at a site of the same microorganism challenge without administration of the composition. The term "biocidal persistence" may be modified by the extent of microorganism reduction and the time length the "biocidal persistence" lasts. For example, a 3 log/6 hours biocidal persistence means that at the site of the administration of the high molecular iodine concentration composition the microorganism count measured one minute after one post administration challenge at the site and within six hours of the administration of the composition will be reduced about 3 log lower compared to the microorganism count at a site of the same microorganism challenge without administration of the composition. For example, a 2 log/12 hour biocidal persistence means that at the site of the administration of the high molecular iodine concentration composition the microorganism count measured one minute after one post administration challenge at the site and within twelve hours of the administration of the composition will be reduced about 2 log lower compared to the microorganism count at a site of the same microorganism challenge without administration of the composition. The disclosed pharmaceutical formulations may also exhibit biocidal persistence Unless otherwise specified, the term "prolonged biocidal activity" means that at the site of the administration of the high molecular iodine concentration composition, the microorganism count measured one minute after not only a first post administration challenge but also a subsequent post administration challenge at the site and within a set period of time (e.g., 0.5 hr, 1 hr, 1.5 hr, 2 hr, 2.5 hr, 3 hr, 3.5 hr, 4 hr, 4.5 hr, 5 hr, 5.5 hr, 6 hr) of the administration of the composition will be reduced at least about 1 log lower compared to the microorganism count at a site of the same microorganism challenges respectively without administration of the composition. Similarly, the term prolonged biocidal activity may be further defined by the extent of microorganism reduction and the time length the "prolonged biocidal activity" lasts. For example, a 3 log/6 hours prolonged biocidal persistence means that at the site of the administration of the high molecular iodine concentration composition, the microorganism count measured one minute after not only a first post administration challenge of microorganism but also a subsequent post administration challenge at the site and within six hours of the administration of the composition will be reduced about 3 log lower compared to the microorganism count at a site of the same microorganism challenges respectively without administration of the composition. For example, a 2 log/12 hour prolonged biocidal persistence means that that at the site of the administration of the high molecular iodine concentration composition, the microorganism count measured one minute after not only a first post administration challenge but also a subsequent post administration challenge at the site and within twelve hours of the administration of the composition will be reduced about 2 log lower compared to the microorganism count at a site of the same microorganism challenges respectively without administration of the composition. The disclosed pharmaceutical formulations may also exhibit prolonged biostatic activity.

The term "non-staining" means that the high molecular iodine concentration composition or pharmaceutical formulation does not leave a visible stain on a subject's skin.

The term "stain free" means that the high molecular iodine concentration composition or pharmaceutical formulation does not leave a visible stain on a subject's skin after about 10 min.

The term "substantially stain free" means that the high molecular iodine concentration composition or pharmaceutical formulation does not leave a visible stain on a subject's skin after about 1 hour.

The term "non-aqueous" means the total water content of the high molecular iodine concentration composition or pharmaceutical formulation is no more than 1.5% wt of the total weight of the composition.

The term "substantially non-aqueous" means the total water content of the high molecular iodine concentration composition or pharmaceutical formulation is no more than 5.0% wt of the total weight of the composition.

The term "water-free" means the total water content of the high molecular iodine concentration composition or pharmaceutical formulation is no more than 0.5% wt of the total weight of the composition.

The term "substantially water-free" means the total water content of the high molecular iodine concentration composition or pharmaceutical formulation is no more than 2.5% wt of the total weight of the composition.

The term "alcohol-free" means the total alcohol content of the high molecular iodine concentration composition or pharmaceutical formulation is no more than 0.75% wt of the total weight of the composition.

The term "substantially alcohol-free" means the total alcohol content of the high molecular iodine concentration composition or pharmaceutical formulation is no more than 5.5% wt of the total weight of the composition.

The term "complexed iodine free" means the total concentration of complexed iodine of the high molecular iodine concentration composition or pharmaceutical formulation is no more than about 5.0 ppm wt/v. Examples of complexed iodine include tri-iodide and iodophors.

The term "substantially complexed iodine-free" means the total concentration of complexed iodine of the high molecular iodine concentration composition or pharmaceutical formulation is no more than about 30.0 ppm wt/v.

The term "iodine uptake ratio" means the amount of molecular iodine absorbed at a site of administration of the high molecular iodine concentration composition or pharmaceutical formulation divided by the total amount of molecular iodine administered.

The term "PPM" of an agent in a composition means a weight/volume (wt/v) concentration of the agent in the composition expressed in parts per million, which may also be referred to as a mass/volume (m/v) concentration.

The term "surgical site" means an incision site on a subject, or any part of a subject's anatomy in organs or spaces which is opened or manipulated during a surgery.

The term "about" before a numeric value means a range of ±10% of the numeric value.

I. High Molecular Iodine Concentration Compositions and Pharmaceutical Formulations One aspect of the disclosure relates to a high molecular iodine concentration composition comprising:

molecular iodine having a concentration of about 1,400 ppm to about 150,000 ppm, about 1,400 ppm to about 100,000 ppm, about 1,400 ppm to about 68,000 ppm, about 1,400 ppm to about 66,000 ppm, about 1,400 ppm to about 60,000 ppm, about 1,400 ppm to about 55,000 ppm, about 1,400 ppm to about 50,000 ppm, about 1,400 ppm to about 45,000 ppm, about 1,400 ppm to about 40,000 ppm, about 1,400 ppm to about 35,000 ppm, about 1,400 ppm to about 30,000 ppm, about 1,400 ppm to about 25,000 ppm, about 1,400 ppm to about 20,000 ppm, about 1,400 ppm to about 15,200 ppm, about 1,400 ppm to about 15,000 ppm, about 1,400 ppm to about 10,000 ppm, about 1,400 ppm to about 8,703 ppm, about 1,400 ppm to about 8,000 ppm, about 1,400 ppm to about 5,000 ppm, about 1,400 ppm to about 4,077 ppm, about 1,400 ppm to about 2,000 ppm, about 1,400 ppm to about 1,700 ppm, about 1,274 ppm to about 150,000 ppm, about 1,274 ppm to about 100,000 ppm, about 1,274 ppm to about 68,000 ppm, about 1,274 ppm to about 66,000 ppm, about 1,274 ppm to about 60,000 ppm, about 1,274 ppm to about 55,000 ppm, about 1,274 ppm to about 50,000 ppm, about 1,274 ppm to about 45,000 ppm, about 1,274 ppm to about 40,000 ppm, about 1,274 ppm to about 35,000 ppm, about 1,274 ppm to about 30,000 ppm, about 1,274 ppm to about 25,000 ppm, about 1,274 ppm to about 20,000 ppm, about 1,274 ppm to about 15,200 ppm, about 1,274 ppm to about 15,000 ppm, about 1,274 ppm to about 10,000 ppm, about 1,274 ppm to about 8,703 ppm, about 1,274 ppm to about 8,000 ppm, about 1,274 ppm to about 5,000 ppm, about 1,400 ppm to about 4,077 ppm, about 1,274 ppm to about 2,000 ppm, about 1,274 ppm to about 1,700 ppm, about 1,500 ppm, about 2,000 ppm, about 4,077 ppm, about 4,100 ppm, about 8,200 ppm, about 8,703 ppm, about 15,200 ppm, about 16,500 ppm, or about 33,000 ppm by wt/v; and an organic carrier having a concentration of no less than about 93.5% wt, no less than about 95% wt, no less than about 98% wt, or no less than about 99% wt of the total weight of the high molecular iodine concentration composition.

Another aspect of the disclosure relates to a high molecular iodine concentration composition comprising:

molecular iodine having a concentration of about 1,121 ppm to about 1,399 ppm wt/v, about 1,150 ppm to about 1,350 ppm wt/v, about 1,200 ppm to about 1,300 ppm wt/v, or about 1,250 ppm to about 1,275 ppm wt/v; and an organic carrier having a concentration of no less than about 93.5% wt, no less than 95% wt, no less than about 98% wt, or no less than about 99% wt of the total weight of the high molecular iodine concentration composition.

In certain embodiments, the high molecular iodine concentration composition may be a solution, a viscous solution, a cream, an ointment or a suspension which is used by applying a few drops to the hands and rubbing the hands or applying a few drops to a treatment area on the skin and rubbing the solution into the skin. In certain embodiments, the high molecular iodine concentration composition is a hand sanitizer. In certain embodiments, the high molecular iodine concentration composition is a hand sanitizer which has an $I_2$ concentration of 1,500 ppm (wt/v).

Another aspect of the disclosure relates to a high molecular iodine concentration pharmaceutical formulation comprising the high molecular iodine concentration composition. In certain embodiments, the organic carrier of the high molecular iodine concentration composition is pharmaceutically acceptable. In certain embodiments, the high molecular iodine concentration composition is pharmaceutically acceptable. In certain embodiments, the high molecular iodine concentration pharmaceutical formulation further comprises a second pharmaceutically acceptable carrier and/or one or more pharmaceutically acceptable additives.

Examples of the organic carrier of certain embodiments of the high molecular iodine concentration compositions or pharmaceutical formulations include glycols with molecular weight of less than 300 (e.g., propylene glycol, di-propylene glycol, glycerin), propylene glycol monomethyl ether acetate, dimethyl sulfoxide, alcohols (e.g., ethanol, propanols such as isopropanol and 1-propanol), and any mixtures of the foregoing.

In certain embodiments, the organic carrier of the high molecular iodine concentration compositions or pharmaceutical formulations has a boiling point higher than 100° C. and has a vapor pressure that is less than about 30% of the vapor pressure of molecular iodine. In certain embodiments, the organic carrier comprises one or more anhydrous organic solvents. In certain embodiments, the organic carrier is anhydrous.

In certain embodiments of the high molecular iodine concentration compositions or pharmaceutical formulations, at least about 90%, at least about 95%, at least about 96%, at least about 97%, at least about 98%, at least about 99%, or at least about 99.9% of all iodine species is molecular iodine.

The ratio of molecular iodine to all iodine species of certain embodiments of the high molecular iodine concentration compositions or pharmaceutical formulations is at least about 95%, at least about 96%, at least about 97%, at least about 98%, at least about 99%, or at least about 99.9%.

Examples of suitable pharmaceutical formulations include creams, lotions, gels, ointments, and sprays. In one embodiment, the high molecular iodine concentration composition is formulated into a vaginal lubricant or gel to provide treatment for or prophylactic protection from viral, bacterial, or fungal infections.

In certain embodiments, the high molecular iodine concentration compositions or pharmaceutical formulations is non-aqueous. In certain embodiments, the high molecular iodine concentration compositions or pharmaceutical formulations is substantially non-aqueous. In certain embodiments, the high molecular iodine concentration compositions or pharmaceutical formulations is water-free. In certain embodiments, the high molecular iodine concentration compositions or pharmaceutical formulations is substantially water-free.

In certain embodiments, the high molecular iodine concentration compositions or pharmaceutical formulations has a water content of no more than about 5% wt, no more than about 4.5% wt, no more than about 4% wt, no more than about 3.5% wt, no more than about 3% wt, no more than about 2.5% wt, no more than about 2% wt, no more than about 1.9% wt, no more than about 1.8% wt, no more than about 1.7% wt, no more than about 1.6% wt, no more than about 1.5% wt, no more than about 1.4% wt, no more than about 1.3% wt, no more than about 1.2% wt, no more than about 1.1% wt, no more than about 1% wt, no more than about 0.9% wt, no more than about 0.8% wt, no more than about 0.7% wt, no more than about 0.6% wt, no more than about 0.5% wt, no more than about 0.4% wt, no more than about 0.3% wt, no more than about 0.2% wt, or no more than about 0.1% wt of the total weight of the high molecular iodine concentration compositions or pharmaceutical formulations.

In certain embodiments, the high molecular iodine concentration compositions or pharmaceutical formulations are alcohol-free. In certain embodiments, the high molecular iodine concentration compositions or pharmaceutical formulations are substantially alcohol-free.

In certain embodiments, the high molecular iodine concentration compositions or pharmaceutical formulations has an alcohol content of no more than about 50% wt, no more than about 40% wt, no more than about 30% wt, no more than about 20% wt, no more than 10% wt, no more than about 5% wt, no more than about 4.5% wt, no more than about 4% wt, no more than about 3.5% wt, no more than about 3% wt, no more than about 2.5% wt, no more than about 2% wt, no more than about 1.9% wt, no more than about 1.8% wt, no more than about 1.7% wt, no more than about 1.6% wt, no more than about 1.5% wt, no more than about 1.4% wt, no more than about 1.3% wt, no more than about 1.2% wt, no more than about 1.1% wt, no more than about 1% wt, no more than about 0.9% wt, no more than about 0.8% wt, no more than about 0.7% wt, no more than about 0.6% wt, no more than about 0.5% wt, no more than about 0.4% wt, no more than about 0.3% wt, no more than about 0.2% wt, or no more than about 0.1% wt of the total weight of the high molecular iodine concentration compositions or pharmaceutical formulations.

In certain embodiments, the high molecular iodine concentration composition or pharmaceutical formulation is complexed iodine-free. In certain embodiments, the high molecular iodine concentration composition or pharmaceutical formulation is substantially complexed iodine-free.

In certain embodiments, the high molecular iodine concentration compositions or pharmaceutical formulation has a total concentration of complexed iodine of no more than about 30.0 ppm wt/v, no more than about 25.0 ppm wt/v, no more than about 20.0 ppm wt/v, no more than about 15.0 ppm wt/v, no more than about 10.0 ppm wt/v, no more than about 8.0 ppm wt/v, no more than about 5.0 ppm wt/v, no more than about 4.5 ppm wt/v, no more than about 4.0 ppm wt/v, no more than about 3.5 ppm wt/v, no more than about 3.0 ppm wt/v, no more than about 2.5 ppm wt/v, no more than about 2.0 ppm wt/v, no more than about 1.5 ppm wt/v, no more than about 1.0 ppm wt/v, or no more than about 0.5 ppm wt/v.

In certain embodiments, concentrations of the iodine-containing species that are not molecular iodine of the high molecular iodine concentration compositions or pharmaceutical formulations are no more than about 30.0 ppm wt/v, no more than about 25.0 ppm wt/v, no more than about 20.0 ppm wt/v, no more than about 15.0 ppm wt/v, no more than about 10.0 ppm wt/v, no more than about 8.0 ppm wt/v, no more than about 5.0 ppm wt/v, no more than about 4.5 ppm wt/v, no more than about 4.0 ppm wt/v, no more than about 3.5 ppm wt/v, no more than about 3.0 ppm wt/v, no more than about 2.5 ppm wt/v, no more than about 2.0 ppm wt/v, no more than about 1.5 ppm wt/v, no more than about 1.0 ppm wt/v, or no more than about 0.5 ppm wt/v.

In certain embodiments, the high molecular iodine concentration compositions or pharmaceutical formulations further comprise one or more additives. Examples of the one or more additives are, without limitation, gelling agents, polymers, viscosity enhancing agents, unsaturated fatty acids, desiccants, and fragrances.

In certain embodiments, the viscosities of the high molecular iodine concentration compositions or pharmaceutical formulations are no greater than about 100,000 Centipoise (cps), no greater than about 50,000 cps, no greater than about 1,000 cps, or no greater than about 500 cps. In certain embodiments, the viscosities of the high molecular iodine centration compositions or pharmaceutical formulations is about 2,000 cps.

Examples of polymers for use in the high molecular iodine concentration compositions or pharmaceutical formulations include carbopols and HPMA polymers.

An example of desiccants for use in the high molecular iodine concentration compositions or pharmaceutical formulations includes zeolites.

In certain embodiments, the high molecular iodine concentration compositions or pharmaceutical formulations further comprise an unsaturated fatty acid that imparts a long-lasting residual bactericidal activity. Examples of the unsaturated fatty acids include lactic acid, myristic acid, 1-monolaurin, dodeconic acid and caprylic acid. Lauric acid, lactic acid and caprylic acid can be incorporated directly into propylene glycol.

In certain embodiments, molecular iodine remains stable in the high molecular iodine concentration compositions or pharmaceutical formulations. For example, the concentration changes of molecular iodine in the high molecular iodine concentration compositions or pharmaceutical formulations are less than about 5%, less than about 4%, less than about 3%, less than about 2%, less than about 1%, or less than about 0.5% after 1, 2, 3, 4, 5, 6, 7, 8, 9, 10, 11, 12, 24, or 36 months at room temperature. In certain embodiments, the concentration changes of molecular iodine in the high molecular iodine concentration compositions or pharmaceutical formulations are less than 10% after 26 months at room temperature. In certain embodiments, the high molecular iodine concentration compositions or pharmaceutical formulations are placed at room temperature in dark.

In certain embodiments, the shelf-lives of the high molecular iodine concentration compositions or pharmaceutical formulations are at least 1 month, 2 months, 3 months, 4 months, 5 months, 6 months, 7 months, 8 months, 9 months, 10 months, 11 months, 1 year, 1.5 years, 2 years, 2.5 years, 3 years, 3.5 years, 4 years, 4.5 years, or 5 years. In certain embodiments, the high molecular iodine concentration compositions or pharmaceutical formulations are stored at room temperature. In certain embodiments, the high molecular iodine concentration composition or pharmaceutical formulation are stored in dark at room temperature. In certain embodiments, the packages where the high molecular iodine concentration composition or pharmaceutical formulation are stored in are closed containers. In certain embodiments, the packages where the high molecular iodine concentration composition or pharmaceutical formulation are stored in are closed containers that prevent more than 90% environmental light exposure for the high molecular iodine concentration compositions or pharmaceutical formulations stored therein.

In certain embodiments, the iodine uptake ratio of the high molecular iodine concentration composition or pharmaceutical formulation is at least about 99%, at least about 95%, at least about 90%, at least about 85%, at least about 80%, at least 75%, or at least 70%.

In certain embodiments, the high molecular iodine concentration compositions or pharmaceutical formulations are non-staining. In certain embodiments, the high molecular iodine concentration compositions or pharmaceutical formulations are stain free. In certain embodiments, the high molecular iodine concentration compositions or pharmaceutical formulations are substantially stain free.

In certain embodiments, the high molecular iodine concentration compositions or pharmaceutical formulations are non-staining; and have a concentration of molecular iodine that is about 1,121 ppm to about 12,250 ppm, about 1,121 ppm to about 8,400 ppm, about 1,121 ppm to about 4,400 ppm, about 1,121 ppm to about 2,200 ppm, about 1,121 ppm to about 1,655 ppm, 1,274 ppm to about 12,250 ppm, about 1,274 ppm to about 8,400 ppm, about 1,274 ppm to about 4,400 ppm, about 1,274 ppm to about 2,200 ppm, about 1,274 ppm to about 1,655 ppm, 1,400 ppm to about 12,250 ppm, about 1,400 ppm to about 8,400 ppm, about 1,400 ppm to about 4,400 ppm, about 1,400 ppm to about 2,200 ppm, or about 1,400 ppm to about 1,655 ppm wt/v (e.g., 1,500 ppm wt/v); and a concentration of the organic carrier that is no less than about 93.5% wt, no less than 95% wt, no less than about 98% wt, or no less than about 99% wt of the total weight of the high molecular iodine concentration compositions or pharmaceutical formulations.

In certain embodiments, the high molecular iodine concentration compositions or pharmaceutical formulations are stain free; and have a concentration of molecular iodine that is about 1,121 ppm to about 13,900 ppm, about 1,121 ppm to about 15,000 ppm, about 1,121 ppm to about 17,000 ppm, about 1,274 ppm to about 13,900 ppm, about 1,274 ppm to about 15,000 ppm, about 1,274 ppm to about 17,000 ppm, about 1,400 ppm to about 13,900 ppm, about 1,400 ppm to about 15,000 ppm, or about 1,400 ppm to about 17,000 ppm, and a concentration of the organic carrier that is no less than about 93.5% wt, no less than 95% wt, no less than about 98% wt, or no less than about 99% wt of the total weight of the high molecular iodine concentration compositions or pharmaceutical formulations.

In certain embodiments, the high molecular iodine concentration compositions or pharmaceutical formulations are substantially stain free; and have a concentration of molecular iodine that is about 1,121 ppm to about 33,000 ppm, about 1,121 ppm to about 66,000 ppm, about 1,121 ppm to about 68,000 ppm, about 1,274 ppm to about 33,000 ppm, about 1,274 ppm to about 66,000 ppm, or about 1,274 ppm to about 68,000 ppm, about 1,400 ppm to about 33,000 ppm, about 1,400 ppm to about 66,000 ppm, or about 1,400 ppm to about 68,000 ppm wt/v, and a concentration of the organic carrier that is no less than about 93.5% wt, no less than 95% wt, no less than about 98% wt, or no less than about 99% wt of the total weight of the high molecular iodine concentration compositions or pharmaceutical formulations.

In certain embodiments, the high molecular iodine concentration compositions or pharmaceutical formulations may leave a stain on a subject's skin at the site of administration but the stain dissipates after 1 sec, 2 sec, 3 sec, 4 sec, 5 sec, 6 sec, 7 sec, 8 sec, 9 sec, 10 sec, 20 sec, 30 sec, 40 sec, 50 sec, 1 min, 2 min, 3 min, 4 min, 5 min, 6 min, 7 min, 8 min, 9 min, 10 min, 12 min, 13 min, 14 min, 15 min, 20 min, 25 min, 30 min, 1 hr, 1.5 hr, 2 hr, 2.5 hr, 3 hr, 3.5 hr, 4 hr, 4.5 hr, 5 hr, 5.5 hr, 6 hr, 6.5 hr, 7 hr, or 8 hr.

In certain embodiments, the high molecular iodine concentration compositions or pharmaceutical formulations are not irritative to a subject's skin. In certain embodiments, the high molecular iodine concentration compositions or pharmaceutical formulations are not irritative to a subject's skin after they are in contact with the subject skin for 1 sec, 2 sec, 3 sec, 4 sec, 5 sec, 6 sec, 7 sec, 8 sec, 9 sec, 10 sec, 20 sec, 30 sec, 40 sec, 50 sec, 1 min, 2 min, 3 min, 4 min, 5 min, 6 min, 7 min, 8 min, 9 min, 10 min, 12 min, 13 min, 14 min, 15 min, 20 min, 25 min, 30 min, 1 hr, 1.5 hr, 2 hr, 2.5 hr, 3 hr, 3.5 hr, 4 hr, 4.5 hr, 5 hr, 5.5 hr, or 6 hr.

In certain embodiments, the high molecular iodine concentration compositions or pharmaceutical formulations are not cytotoxic.

In certain embodiments, the high molecular iodine concentration compositions or pharmaceutical formulations are biostatic persistent. In certain embodiments, the high molecular iodine concentration compositions or pharmaceutical formulations are biostatic persistent for one or more microorganisms for at least 6 hr, at least 7 hr, at least 8 hr, at least 9 hr, at least 10 hr, at least 11 hr, at least 12 hr, at least 13 hr, at least 14 hr, at least 15 hr, at least 16 hr, at least 17 hr, at least 18 hr, at least 19 hr, at least 20 hr, at least 21 hr, at least 22 hr, at least 23 hr, or at least 24 hr.

In certain embodiments, the high molecular iodine concentration compositions or pharmaceutical formulations are biocidal persistent. In certain embodiments, the high molecular iodine concentration compositions or pharmaceutical formulations have at least 1 log, 2 log, 3 log, 4 log, 5 log, or 6 log biocidal persistence for one or more microorganisms for at least 15 min, at least 30 min, at least 45 min, at least 1 hr, at least 2 hr, at least 3 hr, at least 4 hr, at least 5 hr, at least 6 hr, at least 7 hr, at least 8 hr, at least 9 hr, at least 10 hr, at least 11 hr, at least 12 hr, at least 13 hr, at least 14 hr, at least 15 hr, at least 16 hr, at least 17 hr, at least 18 hr, at least 19 hr, at least 20 hr, at least 21 hr, at least 22 hr, at least 23 hr, or at least 24 hr.

In certain embodiments, the high molecular iodine concentration compositions or pharmaceutical formulations have prolonged biocidal activities. In certain embodiments, the high molecular iodine concentration compositions or pharmaceutical formulations have at least 1 log, 2 log, 3 log, 4 log, 5 log, or 6 log prolonged biocidal activities for one or more microorganisms for at least 15 min, at least 30 min, at least 45 min, at least 1 hr, at least 2 hr, at least 3 hr, at least 4 hr, at least 5 hr, at least 6 hr, at least 7 hr, at least 8 hr, at least 9 hr, at least 10 hr, at least 11 hr, at least 12 hr, at least 13 hr, at least 14 hr, at least 15 hr, at least 16 hr, at least 17 hr, at least 18 hr, at least 19 hr, at least 20 hr, at least 21 hr, at least 22 hr, at least 23 hr, or at least 24 hr.

In certain embodiments, for a tissue (e.g., hand) of a subject, if the tissue is administered with a therapeutically effective amount of an embodiment of the high molecular iodine concentration compositions or pharmaceutical formulations and the tissue is then exposed to an environment of a microorganism of a first concentration, the concentration of the microorganism on the tissue remains at least 1 log less than the first concentration for at least 15 min, at least 30 min, at least 45 min, at least 1 hr, at least 2 hr, at least 3 hr, at least 4 hr, at least 5 hr, at least 6 hr, at least 7 hr, at least 8 hr, at least 9 hr, at least 10 hr, at least 11 hr, at least 12 hr, at least 13 hr, at least 14 hr, at least 15 hr, at least 16 hr, at least 17 hr, at least 18 hr, at least 19 hr, at least 20 hr, at least 21 hr, at least 22 hr, at least 23 hr, or at least 24 hr.

II. Articles Comprising the High Molecular Iodine Concentration Compositions or Pharmaceutical Formulations Another aspect of the disclosure relates to an article comprising the high molecular iodine concentration composition or pharmaceutical formulation. In certain embodiments, the article is a pharmaceutically acceptable article comprising the pharmaceutical formulation.

In certain embodiments, the article is a container comprising one or more compartments. In certain embodiments, the high molecular iodine concentration composition or pharmaceutical formulation is packaged in a container that has 1, 2, 3, 4, 5, 6, 7, 8, 9, 10, 11, 12, 13, 14, 15, 16, 17, 18, 19, or 20 compartments.

In certain embodiments, the compartment holds a unit dose of a therapeutically effective and/or prophylactically effective amount of the high molecular iodine concentration composition or pharmaceutical formulation. Examples of unit dose include 0.1 mL, 0.2 mL, 0.3 mL, 0.4 mL, 0.5 mL, 0.6 mL, 0.7 mL, 0.8 mL, 0.9 mL, or 1 mL.

Examples of the containers include capsules, bottles, pouches, and tubes.

In certain embodiments, the pharmaceutical formulation is applied to a surface of the article that will be in contact with a biological tissue of a subject when administered. Examples of such articles include wiping articles, ports, catheters, surgical tools, and films. Examples of the wiping articles include wipes, fabrics, cloths, paper, and cotton.

III. Uses of the High Molecular Iodine Concentration Compositions and Pharmaceutical Formulations Embodiments of the high molecular iodine concentration compositions or pharmaceutical formulations have not only the known uses for molecular iodine, but also unexpected uses due to the high concentration of molecular iodine in the high molecular iodine concentration composition or pharmaceutical formulations as well as the surprisingly little or no stain or irritancy on a subject's skin, low cytotoxicity, and high stability of the high molecular iodine concentration composition or pharmaceutical formulations.

A. Killing or Inhibiting the Growth of Microorganism and/or Parasites

Another aspect of the invention provides a method of disinfecting a space or surface by killing or inhibiting the growth of a microorganism and/or parasite on a surface or in a space by applying an effective amount of the high molecular iodine concentration composition to the surface or space. The high molecular iodine concentration composition or pharmaceutical formulation may be applied by spraying, or wiping.

Another aspect of the invention provides a method of killing or inhibiting the growth of a microorganism and/or parasite on or in a subject by administering a therapeutically effective amount or a prophylactically effective amount of the high molecular iodine concentration composition or pharmaceutical formulation to the subject. In certain embodiments, the subject is a human. In certain embodiments, the high molecular iodine concentration composition or pharmaceutical formulation may be a solution, a viscous solution, a cream, an ointment or a suspension which is used by applying a few drops to the hands and rubbing the hands or applying a few drops to a treatment area on the skin and rubbing the solution into the skin. In certain embodiments, the high molecular iodine concentration composition or pharmaceutical formulation is a hand sanitizer. In certain embodiments, the high molecular iodine concentration composition or pharmaceutical formulation is a hand sanitizer which has an $I_2$ concentration of 1,500 ppm (wt/v).

In certain embodiments, the subject is a domesticated animal. Examples of domesticated animals include horse, cow, sheep, goat, pig, dog, and cat. In certain embodiments, the microorganism is present at a treatment site in or on the subject. In certain embodiments, an undesired biofilm is present at the treatment site.

Another aspect of the invention provides a method of disrupting and/or eliminating an undesired biofilm present at a treatment site in or on a subject by administering a therapeutically effective amount or prophylactically effective amount of the high molecular iodine concentration composition or pharmaceutical formulation to the undesired biofilm present at the treatment site in or on the subject.

Another aspect of the invention provides a method of disinfecting or sanitizing a subject's hands by killing or inhibiting the growth of a microorganism and/or parasite on the hands of a subject by administering a therapeutically effective amount or a prophylactically effective amount of the high molecular iodine concentration composition or pharmaceutical formulation to the subject's hands.

Another aspect of the invention provides a method of treating or preventing a condition associated with a microorganism and/or parasite of a subject comprising administering to the subject a therapeutically effective amount or a prophylactically effective amount of the high molecular iodine concentration composition or pharmaceutical formulation.

In certain embodiments, the condition to be treated or prevented by the high molecular iodine concentration composition or pharmaceutical formulation is a tissue condition associated with the microorganism and/or parasite. In certain embodiments, the tissue is a mucosal tissue or a cutaneous tissue.

In certain embodiments, the mucosal tissue surrounds or is in a biological cavity. Examples of biological cavities include eye cavity, ear cavity, oral cavity, nasal cavity, vaginal cavity, rectal cavity, and urethral cavity.

Examples of the microorganism to be killed or growth of which to be inhibited by the high molecular iodine concentration composition or pharmaceutical formulation include virus, bacteria, fungus, and protozoa.

Examples of virus to be inactivated or growth of which to be inhibited by the high molecular iodine concentration composition or pharmaceutical formulation include adenoviruses (e.g., human adenovirus), Norovirus, Reovirus, Rotavirus, Aphthovirus, Parechovirus, papovaviruses (e.g, Polyoma virus and SV40), Erbovirus, Kobuvirus, Teschovirus, Reoviruses (e.g., rotavirus and human reovirus), Hepatovirus, Hepatitis E virus, Rubella virus, Lymphocytic choriomeningitis virus, retroviruses (e.g., HIV-1, HIV-2, rous sarcoma virus (rSV), and mouse leukemia viruses), HTLV-I, herpesviruses (e.g., Human herpes Simplex Virus 1 and 2), Cardiovirus (e.g., Norwalk virus), Orthomyxovirus (e.g., Influenza Virus A, B and C), Isavirus, Thogotovirus, Coxsackie Virus, virus and semliki forest virus and the flaviviruses (group b) (e.g., Dengue virus, yellow fever virus and the St. Louis encephalitis virus), Yellow fever virus, Hepatitis A virus, Hepatitis B virus, Hepatitis C virus, Measles virus, Mumps virus, Respiratory syncytial virus, Bunyaviruses, (e.g., bunyawere (encephalitis), California encephalitis virus), Hantavirus, filoviruses, (e.g., Ebola virus, Marburg virus), Corona virus, Astroviruses, Borna disease virus, Poxviruses, (Vaccinia virus and variola (Smallpox)), Parvoviruses (e.g., Adeno associated virus (aav)), Picornaviruses (e.g., Poliovirus), Togavi ruses (e.g., including the alpha viruses (group a), e.g., Sindbis), Rhabdovi viruses, (e.g., vesicular stomatitis virus (VSV) and rabies virus), Arena viruses (e.g., lassa virus), Coronaviruses (e.g., common cold (rhinovirus), GI distress viruses, SARS-Cov-2, SARS), Ebola, Human Papilloma virus (HPV), Herpes Simplex virus 1 or 2, Human Immunodeficiency Virus (HIV), Hepatitis A virus (HAV), Hepatitis B virus (HBV), and Hepatitis C virus (HCV).

Examples of conditions associated with virus to be treated or prevented by the high molecular iodine concentration composition or pharmaceutical formulation include COVID-19, SARS, Ebola, HPV infection (e.g., plantar warts), herpes, AIDS, hepatitis A, hepatitis B, Hepatitis C, adenoviral conjunctivitis, viral keratitis (e.g., herpes simplex virus epithelial keratitis, herpes simplex virus stromal keratitis, herpes simplex virus endothelial keratitis, herpes zoster virus epithelial keratitis).

Examples of bacteria to be killed or growth of which to be inhibited by the high molecular iodine concentration composition or pharmaceutical formulation include gram-positive and gram-negative bacteria, e.g., *Bacillus oleronius, Streptococcus pyogenes, Erysipelothrix rhusiopathiae, Mycobacterium tuberculosis, Mycobacterium bovis, Escherichia coli*, Extended Spectrum Beta Lactamase resistant *E. coli* (ESBL), *Shigella flexneri, Staphylococcus aureus, Staphylococcus epidermidis, Serratia marcescens, Vibrio cholera*, MRSA, *Salmonella enterica, Gonorrhea, Syphilis, Shewanella algae, Shewanella putrefaciens, Chlamydia, Chlamydia trachomatis, Chlamydia pneumoniae, Chlamydia psittacci, Aeromonas hydrophila, Vibrio species, Pasteurella multocida, Stapylococcus species, Corynebacterium* species, *Pripionibacterium* species, and antibiotic resistant bacteria, e.g., antibiotic resistant flesh eating bacteria.

Examples of conditions associated with bacteria to be treated or prevented by the high molecular iodine concentration composition or pharmaceutical formulation include tuberculosis, periodontitis, acne (e.g., *Propionibacterium acnes*), rosacea, impetigo, cellulitis, folliculitis, blepharitis (e.g., anterior blepharitis, posterior blepharitis, rosacea blepharitis), bacterial conjunctivitis, blepharoconjunctivits, bacterial corneal ulceration, post-operative endophthalmitis, endophthalmitis after intravitreal or intracameral injection, and infections caused by the bacterium (e.g., urinary tract infections).

Examples of fungus to be killed or growth of which to be inhibited by the high molecular iodine concentration composition or pharmaceutical formulation include *Apophysomyces variabilis, Aspergillus, Basidiobolus ranarum, Blastomyces dermatitidi, Coccidioides* (e.g., *Coccidioides posadasii, Coccidioides immitis*), *Conidiobolus* (e.g., *Conidiobolus coronatus, Conidiobolus incongruous*), *Epidermophyton, Fonsecaea* (e.g., *Fonsecaea pedrosoi, Fonsecaea compacta*), *Fusarium, Geotrichum candidum, Herpotrichiellaceae* (e.g., *Exophiala jeanselmei*), *Histoplasma* (e.g., *Histoplasma capsulatum, Histoplasma duboisii*), *Hortaea werneckii, lacazia* (e.g., *Lacazia loboi*), *Hyalohyphomycosis, Lichtheimia corymbifera, Malassezia furfur, Microsporum* (e.g., *Microsporum canis, Microsporum gypseum*), *Mucor indicus*, onychomycosis (e.g., Distal subungual onychomycosis, Proximal subungual onychomycosis), *Phialophora verrucose, Piedraia hortae, Pityrosporum, Pseudallescheria boydii, Rhizopus oryzae, Sporothrix schenckii, Syncephalastrum racemosum, Talaromyces marneffei, Trichophyton* (e.g., *Trichophyton* mbmm, *Trichophyton mentagrophytes*), and yeast (e.g., *Candida* such as *Candida albicans, Candida glabrata, Candida tropicalis, Candida lusitaniae; Cryptococcus neoformans; Pneumocystis* such as *Pneumocystis jirovecii*).

Examples of conditions associated with fungus to be treated or prevented by the high molecular iodine concentration composition or pharmaceutical formulation are Alternariosis, black Piedra, blastomycosis, chromoblastomycosis, conidiobolomycosis, favus, fungal folliculitis, fungal corneal ulceration, Lobomycosis, onychomycosis, Otomycosis, Phaeohyphomycosis Pityrosporum folliculitis, ringworm, tinea (e.g., tinea pedis, tinea cruris, tinea barbae, tinea manuum, tinea unguium, tinea unguium, tinea faciei, tinea versicolon, tinea nigra, tinea corporis gladiatorum, tinea imbricate, tinea incognito), yeast infection (e.g., seborrheic dermatitis, vaginal yeast infections).

Examples of protozoa to be killed or growth of which to be inhibited by the high molecular iodine concentration composition or pharmaceutical formulation include *Acanthamoeba, Leishmania* parasites, *Trypanosoma, Entamoeba histolytica*, and *Toxoplasma gondii*.

Examples of conditions associated with protozoa to be treated or prevented by the high molecular iodine concentration composition or pharmaceutical formulation include *Acanthamoeba* infections (e.g., *Acanthamoeba* corneal ulceration), *Acanthamoeba* keratitis, Leishmaniasis, trypanosomiases, Amebiasis, and Toxoplasmosis.

Examples of parasites to be killed or growth of which to be inhibited by the high molecular iodine concentration composition or pharmaceutical formulation include Cercarial Dermatitis (Swimmer's Itch), Cryptosporidiosis, *Demodex* species (e.g., *Demodex* mite, *Demodex folliculorum*, and *D. brevis*), *Encephalitozoon intestinalis, Enterocytozoon bieneusi, Loa*, Red mite (*Dermanyssus gallinae*), *Rhinosporidium seeberi*, Scabies mite (*Sarcoptes scabiei*), Spiny rat mite (*Laelaps echidnina*), and Tropical rat mite (*Ornithonyssus bacoti*).

Examples of conditions related to a parasite to be treated or prevented by the high molecular iodine concentration composition or pharmaceutical formulation include mite dermatitis caused by the mites listed above, e.g., scabies, Red mite infestation, Cercarial Dermatitis, Tropical rat mite dermatitis, Spiny rat mite dermatitis, *Demodex folliculorum* dermatitis, loiasis, *Cryptosporidium* infection, and *Demodex* blepharitis.

B. Uses on Skin Conditions

Another aspect of the invention relates to a method of treating or preventing a skin condition of a subject comprising administering to the subject a therapeutically effective amount or a prophylactically effective amount of the high molecular iodine concentration composition or pharmaceutical formulation.

In certain embodiments, examples of the skin condition to be treated or prevented by the high molecular iodine concentration composition or pharmaceutical formulation are, without limitation:

1) skin conditions associated with a biological reaction of a subject to an exogenously introduced irritant; and
2) skin conditions associated with an autoimmune disease.

In certain embodiments, the skin conditions to be treated or prevented by the high molecular iodine concentration composition or pharmaceutical formulation include acne, Granuloma gluteale infantum, and rosacea.

In certain embodiments, the skin conditions to be treated or prevented by the high molecular iodine concentration composition or pharmaceutical formulation include eczema (e.g., subacute eczema, asteatotic eczema), dermatitis (e.g., rhus dermatitis, allergic contact dermatitis, atopic dermatitis), urticaria, psoriasis, chronic or acute itching, impetigo, cellulitis, and folliculitis.

In certain embodiments, the exogenously introduced irritant that is associated with a skin condition to be treated or prevented by the high molecular iodine concentration composition or pharmaceutical formulation is introduced to the subject by an animal (e.g., insect stings and bites, and jellyfish stings) or a plant (e.g., poison oak, poison sumac, or poison ivy).

Examples of the insects that are associated with a skin condition to be treated or prevented by the high molecular iodine concentration composition or pharmaceutical formulation include bee, wasp, hornet, scorpion, ant, spider and mosquito.

Examples of the jellyfish include *Physalia* sp. (Portuguese Man-o-War, Blue-bottle), Cubozoan jellyfish (e.g., *Chironex fleckeri*), Carybdeids (e.g., *Carybdea arborifera* and *Alatina moseri*), *Linuche unguiculta* (Thimble jellyfish), a jellyfish responsible for Irukandji syndrome (*Carukia barnesi*) and *Pelagia noctiluca*.

Examples of the exogenously introduced irritants that are associated with a skin condition to be treated or prevented by the high molecular iodine concentration composition or pharmaceutical formulation include apitoxin (bee venom), histamine, tyramine, serotonin, catecholamines, hydrolases (wasp venoms), anticoagulant (mosquito saliva), proteinaceous porins, neurotoxic peptides, and bioactive lipids.

In certain embodiments, examples of the autoimmune diseases that are associated with skin conditions to be treated or prevented by the high molecular iodine concentration composition or pharmaceutical formulation include diabetes, scleroderma, psoriasis, dermatomyositis, epidermolysis bullosa, and bullous pemphigoid.

In certain embodiments, the skin condition to be treated or prevented by the high molecular iodine concentration composition or pharmaceutical formulation is associated with diabetes. Examples of skin conditions associated with diabetes include acanthosis *nigricans*, bullosis diabeticorum (diabetic blisters), digital sclerosis, disseminated granuloma annulare, eruptive xanthomatosis, and necrobiosis lipoidica diabeticorum.

In certain embodiments, the skin condition to be treated or prevented by the high molecular iodine concentration composition or pharmaceutical formulation is associated with an immune response.

In certain embodiments, the skin condition to be treated or prevented by the high molecular iodine concentration composition or pharmaceutical formulation is associated with an inflammatory response.

C. Uses on Wound-Healing and/or Wound-Prevention

Another aspect of the invention relates to a method of fostering wound-healing or preventing a wound of a subject comprising administering to the subject a therapeutically effective amount or a prophylactically effective amount of the high molecular iodine concentration composition or pharmaceutical formulation.

In certain embodiments, the high molecular iodine concentration composition or pharmaceutical formulation is applied to a wound or tissue in proximity of the wound. In certain embodiments, the tissue is a mucosal tissue or a cutaneous tissue.

In certain embodiments, the high molecular iodine concentration composition or pharmaceutical formulation is applied to a tissue where an incision will be created before the incision is created. For example, the high molecular iodine concentration composition or pharmaceutical formulation may be applied to an area of tissue where or in proximity to where a surgical procedure will be performed.

In certain embodiments, the wound to be healed in presence of the high molecular iodine concentration composition or pharmaceutical formulation is healed with a scar less severe than a similar wound healed without administration of the high molecular iodine concentration composition or pharmaceutical formulation. In certain embodiments, the scar is less severe as characterized by one or more improvements, e.g., without limitation, reduction of the scar height, reduction of the scar surface, reduction of the thickness of the scar, improvement of the pliability of the scar, improvement of the texture of the scar, reduction of pigmentation of the scar, and reduction of vascularity of the scar. See, e.g., Fearmonti et al., "A Review of Scar Scales and Scar Measuring Devices," Eplasty, 2010:10 e43, which is incorporated by reference (https://www.ncbi.nlm.nih.gov/pmc/articles/PMC2890387/, attached as Appendix I). In certain embodiments, the one or more improvements of the scar are at least about 10%, about 10% to about 100%, at least about 20%, at least about 30%, at least about 40%, at least about 50%, at least about 60%, at least about 70%, at least about 80%, at least about 90%, at least about 95%, or at least about 99%. In certain embodiments, the reduction of the scar height, the reduction of the scar surface, and/or the reduction of the thickness of the scar are/is at least about 10%, about 10% to about 100%, at least about 20%, at least about 30%, at least about 40%, at least about 50%, at least about 60%, at least about 70%, at least about 80%, at least about 90%, at least about 95%, or at least about 99%.

In certain embodiments, the wound to be healed in presence of the high molecular iodine concentration composition or pharmaceutical formulation is healed without a visible scar.

In certain embodiments, the wound to be healed in presence of the high molecular iodine concentration composition or pharmaceutical formulation is healed in a shorter period of time in the presence of the high molecular iodine concentration composition or pharmaceutical formulation compared to similar wound healed without the presence of the high molecular iodine concentration composition or pharmaceutical formulation. In certain embodiments, the presence of the high molecular iodine concentration composition or pharmaceutical formulation shortens the wound-healing period by at least about 10%, about 10% to about 99%, at least about 20%, at least about 30%, at least about 40%, at least about 50%, at least about 60%, at least about 70%, at least about 80%, at least about 90%, at least about 95%, or at least about 99%.

In certain embodiments, the wound to be healed in presence of the high molecular iodine concentration composition or pharmaceutical formulation is inflicted by a cut, a friction, cold, heat, radiation (e.g., sunburn), a chemical, electricity, a microorganism and/or parasite infection, pressure, and/or a condition of the subject (e.g., diabetes). For example, in certain embodiments, the subject is diabetic (i.e., a subject having a condition, and the condition is diabetes). Examples of wounds in a diabetic subject include bullosis diabeticorum (diabetic blisters), eruptive xanthomatosis, and neuropathic ulcers (e.g., diabetic foot ulcers). In certain embodiments, the wound is a decubitus ulcer (i.e., pressure ulcer, pressure sore, or bedsore).

In certain embodiments, the high molecular iodine concentration composition or pharmaceutical formulation is applied as a spray, a bandage impregnated with the high molecular iodine concentration composition or pharmaceutical formulation, or a cream.

D. Uses for Pre-, Post- and Intra-Operative Infection Prevention and Tumor Inhibition Another aspect of the invention relates to a method of treating a surgical site to foster healing, prevent infection, and/or inhibit tumor recurrence in a subject in need comprising administering to the subject a therapeutically effective amount or a prophylactically effective amount of the high molecular iodine concentration composition or pharmaceutical formulation. In certain embodiments, the method of treating a surgical site is performed as a pre-surgical treatment, a post-surgical treatment, or a treatment during a surgery.

A surgical site refers to an incision site on a subject, or any part of a subject's anatomy in organs or spaces which were opened or manipulated during a surgery. In certain embodiments, the incision site includes a superficial incision site, e.g., involving skin or subcutaneous tissue. In certain embodiments, the incision site includes a deep incision site, e.g., in tissues deeper than the skin or subcutaneous tissue, such as fascial and muscle layers.

In certain embodiments, the high molecular iodine concentration composition or pharmaceutical formulation is applied to a surgical site or tissue in proximity of the surgical site.

In certain embodiments, the high molecular iodine concentration composition or pharmaceutical formulation is applied to a surgical site as a surgical lavage (pre-surgical, post-surgical, or during surgery) as a liquid stream or as a spray. Examples of surgical lavage include esophageal lavage, and pleural lavage. Examples of surgery include pleurodesis procedure, cytoreductive surgery, thoracic surgery, esophageal resection, complete resection or pleural reductive surgery for thymoma, primary functional endoscopic sinus surgery, spinal surgery, and colonic resection.

In certain embodiments, the high molecular iodine concentration composition or pharmaceutical formulation is administered as an eyelid antisepsis prior, during, or after an eye surgery (e.g., cataract surgery) or other procedures on or proximate to an eye (e.g., intravitreal injection, intracameral injection). In certain embodiments, the eyelid antisepsis is applied to eyelid by hand or by an article comprising the high molecular iodine concentration composition or pharmaceutical formulation (e.g., an eyelid wipe).

In certain embodiments, the high molecular iodine concentration composition or pharmaceutical formulation is applied to a surgical site comprising a chest cavity (i.e., a space between a subject's lung and chest wall). For example, the high molecular iodine concentration composition or pharmaceutical formulation may be administered before, during, or after a pleurodesis procedure in a subject in need.

In certain aspects, the high molecular iodine concentration composition or pharmaceutical formulation is applied to a surgical site, and the surgical site comprises a tumor. In certain embodiments, the tumor comprises a benign tumor. In certain embodiments, the tumor comprises a premalignant tumor. In certain embodiments, the tumor comprises a malignant tumor.

Examples of benign tumors to be treated by the high molecular iodine concentration composition or pharmaceutical formulation include adenomas, fibromas, hemangiomas, and lipomas.

Examples of premalignant tumors to be treated by the high molecular iodine concentration composition or pharmaceutical formulation include actinic keratosis, cervical dysplasia, metaplasia of the lung, and leukoplakia.

Examples of malignant tumors to be treated by the high molecular iodine concentration composition or pharmaceutical formulation include carcinomas, sarcomas, germ cell tumors, blastomas, adenocarcinoma, melanoma, basal cell carcinoma, squamous cell carcinoma, NUT carcinoma, ductal carcinoma in situ (DCIS), invasive ductal carcinoma, malignant rhabdoid tumor, Wilms tumor, renal cell carcinoma, chondrosarcoma, Ewing sarcoma, osteosarcoma, Desmoid tumor, hepatoblastoma, hepatocellular carcinoma, alveolar soft-part sarcoma, angiosarcoma, fibrosarcoma, liposarcoma, neurofibrosarcoma, rhabdomyosarcoma, synovial sarcoma, adrenal tumor, carcinoid tumor, carney triad, multiple endocrine neoplasia (MEN), neuroendocrine tumors, paragangliomas, pheochromocytomas, thyroid carcinoma, pancreatic tumor, nasopharyngeal carcinoma, ovarian tumor, testicular tumor, thoracic tumor, and retinoblastoma.

In certain embodiments, the malignant tumors to be treated by the high molecular iodine concentration composition or pharmaceutical formulation is caused by a cancer. Examples of cancer include bladder cancer, breast cancer, cervical cancer, colon cancer, rectal cancer, colorectal cancer, endometrial cancer, kidney cancer, lip cancer, oral cancer, ovarian cancer, testicular cancer, melanoma, nonmelanoma skin cancer, mesothelioma, non-small cell lung cancer, small cell lung cancer, pancreatic cancer, prostate cancer, bone cancer, liver cancer, and thyroid cancer.

In certain embodiments, the high molecular iodine concentration composition or pharmaceutical formulation is administered by intrapleural irrigation to the subject, and the subject is suffering from epithelial or biphasic mesothelioma. In some embodiments, the surgical site is associated with cytoreductive surgery. In some embodiments, the surgical site is associated with thoracic surgery.

In further embodiments, the high molecular iodine concentration composition or pharmaceutical formulation is administered by esophageal lavage or esophageal washout to a subject undergoing esophageal resection.

In certain embodiments, the high molecular iodine concentration composition or pharmaceutical formulation is administered by pleural lavage to a subject undergoing complete resection or pleural reductive surgery for thymoma.

In some embodiments, the high molecular iodine concentration composition or pharmaceutical formulation is administered post-surgery as a post-operative rinse to a subject following primary functional endoscopic sinus surgery.

In other embodiments, the high molecular iodine concentration composition or pharmaceutical formulation is administered to a surgical site by lavage to prevent surgical site infection (SSI) following a surgery. In certain embodiments, the surgery is a spinal surgery.

In further embodiments, the high molecular iodine concentration composition or pharmaceutical formulation is administered during a surgery as a whole colon washout to prevent anastomotic recurrence after colonic resection for colorectal cancer.

In further embodiments, the high molecular iodine concentration composition or pharmaceutical formulation is administered during a surgery as a whole or partial colon washout to prevent infections after surgery.

E. Uses on Ophthalmic Conditions

Another aspect of the invention relates to a method of treating or preventing an ophthalmic condition in a subject in need comprising administering to the subject a therapeutically effective amount or a prophylactically effective amount of the high molecular iodine concentration composition or pharmaceutical formulation at or proximate to a site of the ophthalmic condition.

In certain embodiments of the methods, examples of the ophthalmic conditions to be treated or prevented by the high molecular iodine concentration composition or pharmaceutical formulation include blepharitis (e.g., anterior blepharitis, posterior blepharitis, rosacea blepharitis, *Demodex* blepharitis), blepharoconjunctivits, conjunctivitis (e.g., adenoviral conjunctivitis, bacterial conjunctivitis), molluscum contagiosum (e.g., eyelid molluscum contagiosum), corneal ulcer (e.g., bacterial corneal ulceration, fungal corneal ulceration, *Acanthamoeba* corneal ulceration), bacterial keratitis, viral keratitis (e.g., herpes simplex virus epithelial keratitis, herpes simplex virus stromal keratitis, herpes simplex virus endothelial keratitis, herpes zoster virus epithelial keratitis), post-operative endophthalmitis, endophthalmitis after intravitreal or intracameral injection, papilloma (e.g., conjunctival papilloma, corneal squamous papilloma, eyelid squamous papilloma), and verrucae (e.g., eyelid verrucae).

In certain embodiments, the ophthalmic condition to be treated or prevented by the high molecular iodine concentration composition or pharmaceutical formulation is an infection associated with one or more infectious agents. Examples of the agents include bacteria (e.g., *Stapylococcus* species, *Corynebacterium* species, *Pripionibacterium* species), *Demodex*, fungus (e.g., yeast), and virus.

In certain embodiments of the methods, the high molecular iodine concentration composition or pharmaceutical formulation is administered as an eyelid antisepsis prior to eye surgery (e.g., cataract surgery) or other procedures on or proximate to an eye (e.g., intravitreal injection, intracameral injection).

F. Administration of the High Molecular Iodine Concentration Compositions and Pharmaceutical Formulations In certain embodiments of the methods, the high molecular iodine concentration composition or pharmaceutical formulation is applied on a surface or in a space where the microorganism or parasite is at or in proximity. In certain embodiments of the methods, the high molecular iodine concentration composition or pharmaceutical formulation is administered on or in proximity to a tissue where the microorganism, parasite, or condition or disease is located. In certain embodiments, the high molecular iodine concentration composition or pharmaceutical formulation is administered by applying the article to the subject.

In certain embodiments, the high molecular iodine concentration composition or pharmaceutical formulation is administered on or in is a mucosal tissue or a cutaneous tissue.

In certain embodiments, the mucosal tissue the high molecular iodine concentration composition or pharmaceutical formulation is administered on or in is in or surrounds a biological cavity. Examples of biological cavities include eye cavity, ear cavity, oral cavity, nasal cavity, vaginal cavity, rectal cavity, and urethral cavity.

In certain embodiments, the tissue the high molecular iodine concentration composition or pharmaceutical formulation is administered on or in is at a respiratory tract or at a gastrointestinal tract.

In one embodiment, the high molecular iodine concentration composition is formulated into a vaginal lubricant or gel to provide treatment for or prophylactic protection from viral, bacterial or fungal infections.

In certain embodiments, the high molecular iodine concentration compositions or pharmaceutical formulations can be administered by one or more routes selected from the group consisting of topical, transscleral, transbuccal, transocular, transmeatal, transnasal, trasmucosal, transvaginal, transanal, transurethral, and inhalation.

In certain embodiments, the high molecular iodine concentration composition or pharmaceutical formulation is administered every 10 min, 20 min, 30 min, 40 min, 50 min, 1 hr, 2 hr, 3 hr, 4 hr, 5 hr, 6 hr, 7 hr, 8 hr, 9 hr, 10 hr, 11 hr, $I_2$ hr, 13 hr, 14 hr, 16 hr, 16 hr, 17 hr, 18 hr, 19 hr, 20 hr, 21 hr, 22 hr, 23 hr, 24 hr, 36 hr, or 48 hr.

In certain embodiments, the high molecular iodine concentration composition or pharmaceutical formulation is administered four times a day, three times a day, twice a day, once a day, or once every other day.

In certain embodiments, the high molecular iodine concentration composition may be applied to a surface of a biological tissue such that the biological tissue will absorb molecular iodine and release molecular iodine, and the release of molecular iodine may last for about 1 to 48 hours, or about 1, 2, 3, 4, 5, 6, 7, 8, 9, 10, 11, 12, 13, 14, 15, 16, 17, 18, 19, 20, 21, 22, 23, 24, 25, 26, 27, 2, 29, 30, 31, 32, 33, 34, 35, 36, 37, 38, 39, 40, 41, 42, 43, 44, 45, 46, 47, or 48 hours. In certain embodiments, the high molecular iodine concentration composition of formulation is administered to the subject for about 5 to about 6,000 seconds, about 5 sec to about 30 min, about 10, 20, 30, 40, 50, or 60 seconds, or about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 min, which may continuously provide a therapeutically effective and/or prophylactically effective amount of $I_2$ for about 12 to 36 hours, about 1 to 48 hours, or about 1, 2, 3, 4, 5, 6, 7, 8, 9, 10, 11, 12, 13, 14, 15, 16, 17, 18, 19, 20, 21, 22, 23, 24, 25, 26, 27, 2, 29, 30, 31, 32, 33, 34, 35, 36, 37, 38, 39, 40, 41, 42, 43, 44, 45, 46, 47, or 48 hours. For example, as shown in Example 3, administration of an embodiment of high molecular iodine concentration composition disclosed herein to a pig skin inhibited yeast growth on the pig skin for at least 20 hours.

IV. Preparation of High Molecular Iodine Concentration Compositions

Provided are also methods for preparing the high molecular iodine concentration compositions. In certain embodiments, the high molecular iodine concentration composition is prepared by dispersing iodine into the organic carrier. In certain embodiments, the preparation method comprises:
1) dispersing an iodine composition in a first organic solvent to prepare a first iodine dispersion; and
2) dispersing the first iodine dispersion into a second organic solvent to provide the high molecular iodine concentration composition as desired.

In certain embodiments, all organic solvents are anhydrous.

In certain embodiments, the first and the second organic solvents are the same.

In certain embodiments, the first and the second organic solvents are different, and the first organic solvent has better solubility of iodine than the second organic solvent.

In certain embodiments, the first organic solvent has a viscosity less than 10 centipoise.

In certain embodiments, the first iodine dispersion has a molecular iodine concentration at least ten times of that of the high molecular iodine concentration composition.

Examples of the first organic solvent include, without limitation, propylene glycol, alcohols (e.g., ethanol and propanols such as isopropanol and 1-propanol), and dimethyl sulfoxide. Examples of the second organic solvent include, without limitation, glycols with molecular weight of less than 300 (e.g., glycerin, propylene glycol), and combinations thereof.

In certain embodiments, the preparation method comprises:
1) mixing elemental iodine in ethanol to prepare a first iodine ethanol concentrate that has $I_2$ concentration of about 5% to about 40% wt; and
2) mixing the first iodine ethanol concentrate into a glycol with molecular weight of less than 300 (e.g., glycerin, propylene glycol, and combinations thereof) to provide the high molecular iodine concentration composition as desired.

In certain embodiments, the preparation of the high molecular iodine concentration composition comprises mixing the first iodine ethanol concentrate with the glycol with molecular weight of less than 300 for at least twenty minutes.

The above disclosure and the following examples are illustrative of the teachings of this application and are not meant to limit the scope and application of the invention. The examples and embodiments are for illustrative and will suggest modifications to persons skilled in the art which are included within the spirit and purview of this application and scope of the appended claims.

EXAMPLES

Figure 1:
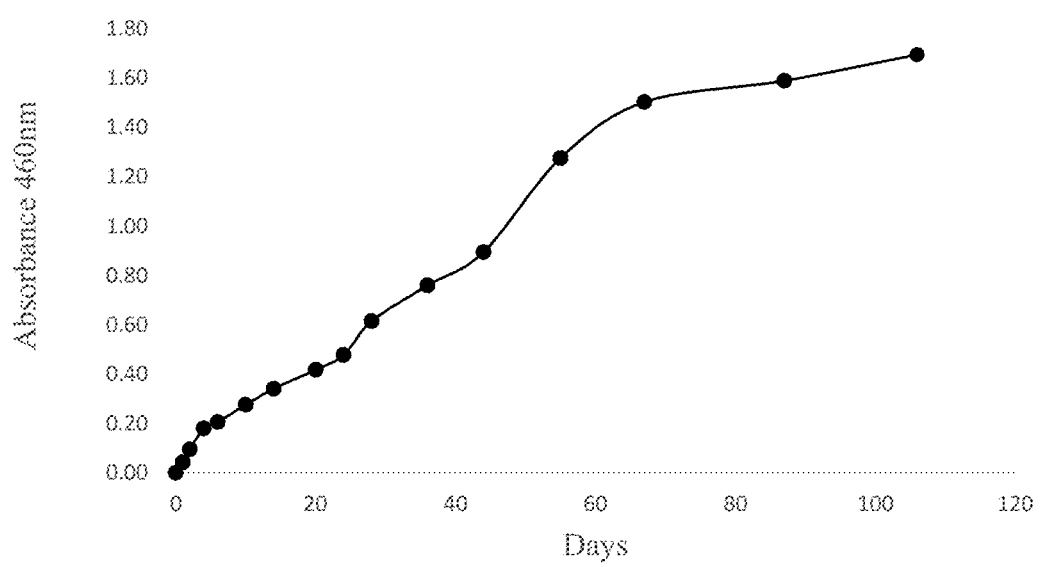
FIG. 1 shows absorbance values for molecular iodine dissolving in glycerin at different time points from Example 1A.

Example 1. Preparation of Embodiments of the High Molecular Iodine Concentration Composition A. Preparation of an $I_2$-Glycerin Composition According to an Embodiment of the Disclosure A total of 33.74 grams of analytical grade elemental iodine (United Chemicals, Wuxi, Jiangsu, China Lot #2020-01-01) was placed in a 240 mL glass borosilicate jar that had a PTFE screw top. A total of 144.24 grams of glycerin (Spectrum Chemicals, New Brunswick, NJ 08901, Lot #2IE0215) was weighed into the glass jar on top of the elemental iodine. A Circulus™ magnetic stir bar (VWR, Radnor, PA 19087, Cat #58947-849) was used to vigorously disperse the elemental iodine with the glycerin at a spin rate of 300 rpm during the initial 23 days, 150 rpm for the next 30 days and then without agitation for the remaining time. At different time points the mixing was stopped and less than 1 mL of material was removed to measure the absorbance at 460 nm in a Cole Parmer 1100 Spectrophotometer. The absorbance values at the different time points are shown in FIG. 1. Even under vigorous agitation it took a long time for the elemental iodine to dissolve in the glycerin such that it was impractical to contemplate preparing batches of material for commercial sales.

B. Another Preparation of an $I_2$-Glycerin Composition According to an Embodiment of the Disclosure An alternate approach was undertaken to prepare a dispersion of elemental iodine of glycerin. Prior experiments had demonstrated that iodine was not stable in ethanol as there was a loss of over 15% of molecular iodine after 15 days at room temperature when stored at room temperature in the dark. A total of 15.15 grams of molecular iodine was dissolved in 80 mL of absolute ethanol (ThermoFisher Scientific, Fair Lawn, NJ, 07410, Lot #B0538618A) and the volume was brought to a total of 100 mL ethanol resulting in an ethanol-iodine solution having 150,000 ppm molecular iodine. A five-liter chamber was charged with 4 liters of glycerin and the glycerin was stirred using a rotary mixer. Once the glycerin reached steady state of agitation the iodine-ethanol mixture was added dropwise to the glycerin over a period of 20 minutes. The mixture was continuously mixed and every five minutes a 0.5 mL volume was removed and an absorbance reading at 460 nm was taken. The mixture was homogenous within 45 minutes as judged by identical values of three successive absorbance readings which indicated a total molecular iodine concentration of 1,500 ppm (wt/v). The iodine species of the $I_2$-glycerin composition prepared was substantially molecular iodine. The controlled addition of a concentrated ethanol-iodine solution into an organic carrier provides the ability to accurately prepare compositions that contain high concentration of molecular iodine. The stability of molecular iodine in this composition did not exhibit any loss at room temperature over the first monitoring period which was 113 days total and over the second monitoring period which was 480 days total.

C Another Preparation of an $I_2$-Glycerin Composition According to an Embodiment of the Disclosure Analytical grade molecular iodine (United Chemicals, Wuxi, Jiangsu, China Lot #2020-01-01) was dissolved in propylene glycol (Alfa Asear, Lot 10225033) to a concentration of 10 grams per 100 mL or 100,000 ppm (w/v). This solution was used as an iodine concentrate and diluted to a final concentration of 1,500 ppm of molecular iodine in the following compositions: pure glycerin, pure propylene glycol, propylene glycol with 10% citric acid, propylene glycol with 5% citric acid, and propylene glycol with 1% citric acid.

Example 2. Vapor Pressure Measurement and Absorbance in Skin of an Embodiment of the High Molecular Iodine Concentration Composition A. Vapor Pressure Measurement and Absorbance in Pig Skin The vapor pressure of molecular iodine dissolved in glycerin is significantly lower than the vapor pressure observed in an aqueous solution. This experiment was designed to determine if iodine dissolved in glycerin has any propensity to partition into mammalian skin. Pigskins were purchased from a local supermarket and cut into 2 by 5 cm pieces (total of 15). The pigskins had a thickness around 3 mm (2.5-3.5 mm). An $I_2$-glycerin composition as prepared according to Example 1B (1,500 ppm (wt/v)) was used.

Fifteen pieces of pigskins were washed with tap water and then dried with a paper towel and weighed. The squares of pigskin were randomly assigned to a control group and four different treatment groups. Each group of pigskins was placed in a 30-mL clear glass bottle with a PTFE lid before being submerged in a glycerin composition. The control group was submerged in pure glycerin. The treatment groups were submerged in the $I_2$-glycerin composition for 3, 6, 12 or 24 hours. The weight of pigskin used for each group and the total weight of glycerin composition added to each treatment is shown in Table 1 below.

TABLE 1

Amount of Material Used to Treat Each Group

| Treatment | Glycerin | $I_2$-Glycerin | $I_2$-Glycerin | $I_2$-Glycerin | $I_2$-Glycerin |
|---|---|---|---|---|---|
| Pigskin(g) | 8.10 | 7.86 | 8.04 | 8.19 | 7.64 |
| Weight of Treatment | 30.48 | 31.41 | 30.83 | 30.36 | 30.71 |
| Exposure Time (hr) | 24 | 3 | 6 | 12 | 24 |

The concentration of $I_2$ absorbed into pigskin was measured by determining the concentration of $I_2$ that remained in the glycerin for each treatment group. The $I_2$ concentration was determined by measuring the absorbance at 460 nm in a Cole Parmer 1100 Spectrophotometer. The initial absorbance of the $I_2$-glycerin material before contact with the pigskin was 0.429. As $I_2$ diffused into pigskin the absorbance of the $I_2$-glycerin was reduced (see, e.g., Table 2).

TABLE 2

Iodine in Glycerin after Contact with Pigskin

| Sample | Absorbance 460 nm | Initial $I_2$ (mg) | Final $I_2$ (mg) |
|---|---|---|---|
| Glycerin | 0.010 | | |
| $I_2$-Glycerin at time 0 | 0.429 | | |
| $I_2$-Glycerin after 3 hr w pigskin | 0.229 | 37.69 | 20.15 |
| $I_2$-Glycerin after 6 hr w pigskin | 0.190 | 37.00 | 16.41 |
| $I_2$-Glycerin after 12 hr w pigskin | 0.181 | 36.43 | 15.36 |
| $I_2$-Glycerin after 24 hr w pigskin | 0.187 | 36.85 | 16.01 |

Figure 2:
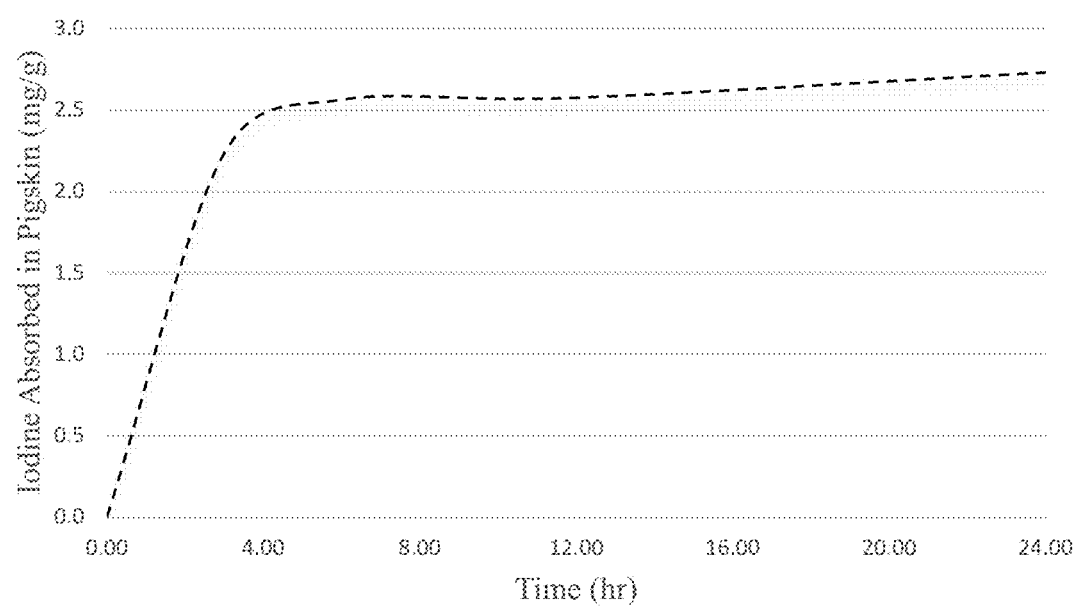
FIG. 2 shows absorbance rates of molecular iodine dissolved in glycerin absorbed into mammalian skin under the conditions in Example 2A.

The data demonstrates that iodine dissolved in glycerin was absorbed into mammalian skin despite the fact that the glycerin has an extremely strong affinity for molecular iodine as demonstrated by the dramatically reduced vapor pressure of molecular iodine in glycerin as compared to water. FIG. 2 shows that by three to six hours the mammalian skin was saturated with iodine under the conditions used.

B. Uneven Distribution of $I_2$ Throughout Epidermis, Dermis, and Subcutaneous Tissues of Pig Skin The vapor pressure of molecular iodine dissolved in glycerin is significantly lowered as compared to the vapor pressure observed in an aqueous solution. This experiment was designed to determine if iodine dissolved in glycerin has any propensity to partition into mammalian skin. Pigskins were purchased from a local supermarket, and cut into 2 by 5 cm pieces (total of 15). The pigskins had a thickness around 3 mm (2.5-3.5 mm). An $I_2$-glycerin composition as prepared according to Example 1B for the various concentrations used.

Iodine Tincture USP and povidone-iodine (PVP-I) were known to kill pathogens on the surface of skin. However, it is not known whether aqueous topical iodine compositions allow $I_2$ to diffuse into the subcutaneous tissue of mammals. Various topical iodine compositions were compared to determine whether $I_2$ applied to the epidermis results in accumulation of $I_2$ into subcutaneous tissue. Subcutaneous tissue was also exposed to said different topical iodine compositions to determine if $I_2$ can be absorbed upon direct exposure. The only composition that allowed $I_2$ deposition in subcutaneous tissue was the glycerin-$I_2$ compositions tested. PVP-I, Iodine Tincture USP and $I_2$ in ethanol all stained the epidermis heavily but did provide meaningful penetration of $I_2$ into the subcutaneous tissue.

Subcutaneous tissue is not homogenous as there are different types of biomolecules present, e.g. collagen fibers, elastin fibers, blood vessels, sebaceous glands, nerve endings and hair follicle roots. The $I_2$ molecule is hydrophobic and highly polarizable. The results showed that $I_2$ did not distribute evenly in subcutaneous tissue. Instead, $I_2$ accumulated into regions of the subcutaneous tissue. This may be one reason why high concentrations of $I_2$ were necessary to achieve some of the beneficial clinical outcomes reported in this application. That is, it is necessary to have highly concentrated areas of $I_2$ in the subcutaneous tissue to provide a reservoir of $I_2$ that can diffuse throughout the skin.

Pig skin was used for all experiments. Skin was hydrated by soaking in deionized water for 30-minutes prior to experiments. All experiments were conducted at 20° C. Exposure of the different topical iodine compositions was accomplished by repeatedly administering 10 µl to the epidermis of a 1.77 square centimeter piece of skin in 10-minute intervals over the course of a 90-minute period; or alternatively, 2 µl in 10-minute intervals for square pieces of skin that were 0.5 mm on a side. After application, the topical compositions were spread using an L-shaped spreader for 20 seconds to achieve full coverage of area. Applications were not removed after each 10-minute period, but instead were cumulatively added until the 90-minute period had ceased. A clean scalpel was used to achieve clean cross-sections for viewing.

a. PVP-I

Figure 3:
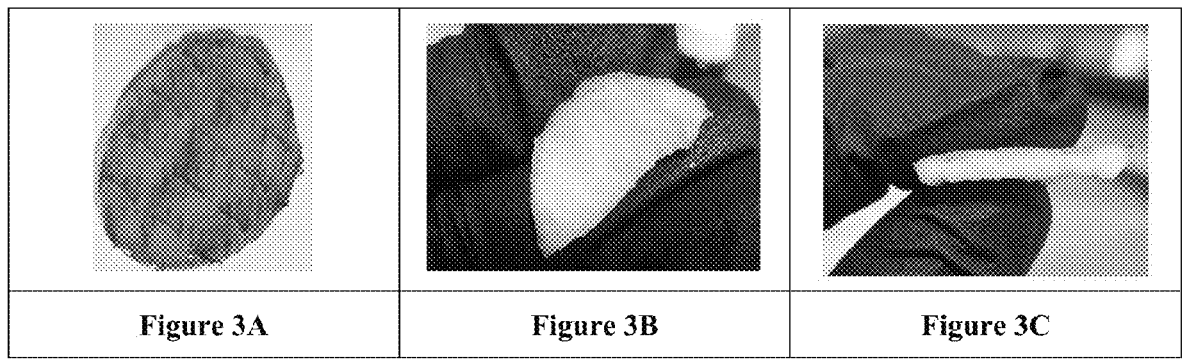
FIGS. 3A-3C show the staining of skin from epidermal administration of 100 μL of PVP-I over 90 minutes.
Figure 4:
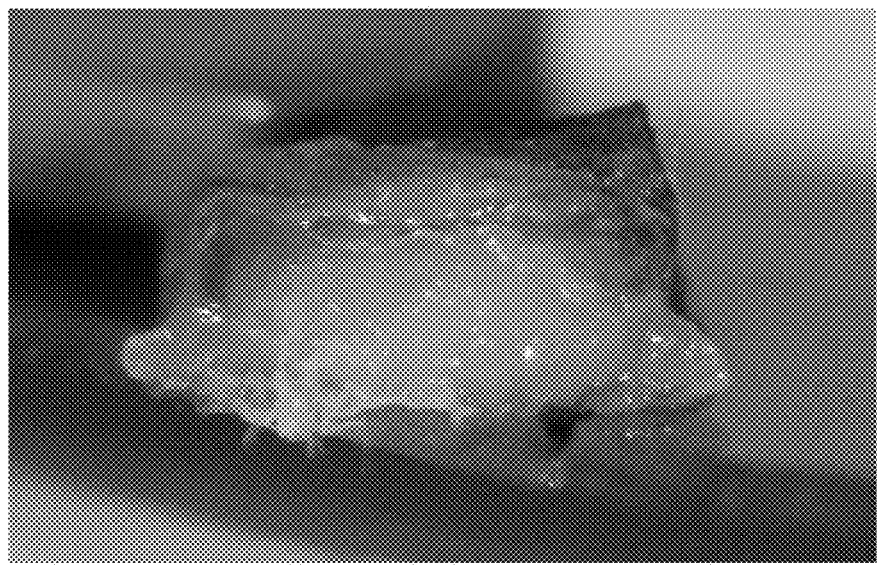
FIG. 4 shows a cross-section of a 0.5 mm piece of tissue halved after exposure to PVP-I.

PVP-I (CVS Health Povidone-Iodine Solution 10%—lot A61689; 1% available iodine) was topically applied in 10 µl increments over 90 minutes to observe how concentrations of PVP-I administered to the epidermis (FIG. 3A) affected layers of the tissue. Iodine was observed within the top layer of skin, the epidermis (FIG. 3A), but was not be seen throughout the dermis (FIG. 3C) or subcutaneous tissue (FIG. 3B). The epidermis was clearly stained (FIG. 3A) but the dermis and subcutaneous tissue (FIG. 4) remained unaffected. After removing the epidermis, $I_2$ was not observed in dermal layer (FIG. 4) indicating that staining only persisted into the top layer of the skin (FIG. 3A). Furthermore, a cross-section of a 0.5 mm piece of tissue halved after exposure to PVP-I showed no $I_2$ staining (FIG. 4).

b. Iodine Tincture USP

Iodine Tincture USP (CVS Health Brand: Active ingredients: Iodine 2%, Sodium Iodide 2.4%, Alcohol 47%; Lot #A63340) was applied in 10 µl increments over the course of 90 minutes. Similar to PVP-I, the epidermis (FIG. 5A) was stained by $I_2$ after epidermal administration of the Iodine Tincture USP. However, distribution of $I_2$ into the subcutaneous tissue was not observed either (FIGS. 5B and 5C).

c. $I_2$ in Ethanol

Figures 6A, 6B:
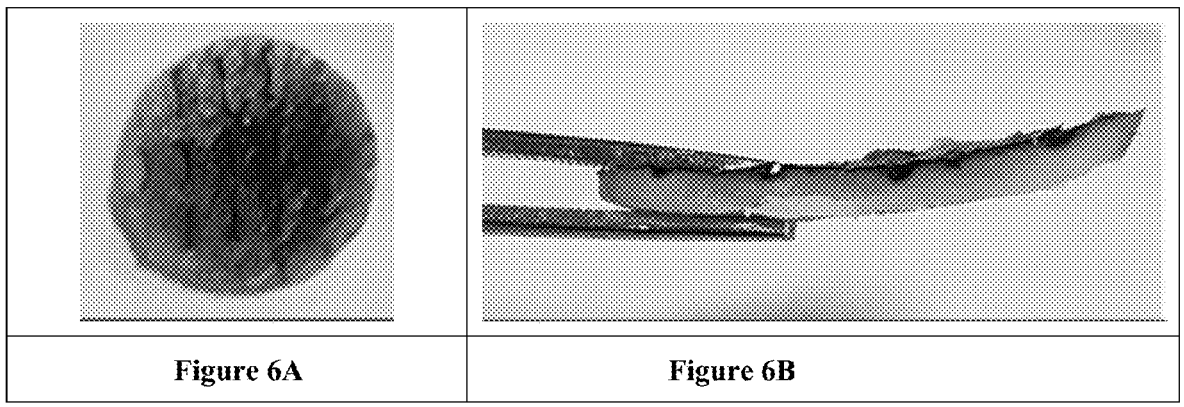
FIGS. 6A-6B show the staining of pig skin from epidermal administration of an embodiment of molecular iodine composition in ethanol ($I_2$-ethanol composition) with $I_2$ concentration of 150,000 ppm (wt/v) over 90 minutes.

A very high concentration of $I_2$ in ethanol (150,000 ppm $I_2$-ethanol) was tested to determine if such an elevated concentration could deliver $I_2$ into subcutaneous tissue. $I_2$-ethanol was applied over a course of 90 minutes when up to 100 µl in 10-minute increments. Again, the epidermis was stained (FIG. 6A). However, no $I_2$ was observed in the subcutaneous tissue as shown by the cross-section of the pig skin (FIG. 6B).

d. $I_2$ in Glycerin 66,000 ppm $I_2$-glycerin was applied epidermally to a pig skin. Surprisingly, $I_2$ was not only observed on the epidermis (FIG. 7A) but also was observed in multiple areas within 3 minutes after epidermally applying 30 µl of the $I_2$-glycerin. After removing the epidermis residual $I_2$ can be clearly observed (FIG. 7B). To confirm that the coloration was $I_2$, a SenSafe Iodine Check test strip (Industrial Test Systems, Inc., Rock Hill, S.C.) was applied to the subcutaneous tissue and the test strip indicated an $I_2$ concentration of 3 ppm at the highest concentration. Nevertheless, $I_2$ did not seem to be distributed evenly into the subcutaneous tissue (e.g., (FIG. 7B)).

In another experiment, presence of $I_2$ in subcutaneous tissue was measured from subcutaneous tissue treated with 15,200 ppm $I_2$-glycerin composition directly using a SenSafe Iodine Check test strip. Ten 5 mm×5 mm square pieces of subcutaneous tissue from pig was submerged in 15,200 ppm $I_2$-glycerin composition for 15 minutes, then rinse with deionized water seven times and submerged in 1 mL of distilled water. Each piece of subcutaneous tissue was obtained by removing epidermis from a piece of pig skin. Afterwards, at 15, 30, 45, 60, 75 and 90 minutes and then every 30 minutes after that, a piece of subcutaneous tissue was removed from distilled water and tested for the presence of $I_2$ using a SenSafe Iodine Check test strip. Each piece of subcutaneous tissue was maintained in contact with a test strip for up to 5 minutes or until the color no longer changed. The peak color for each piece can be seen in FIG. 8A-8J. SenSafe Iodine Check test strip in contact with the treated subcutaneous tissue 2.5 hours after the $I_2$-glycerin treatment or later did not change color.

The color of the SenSafe Iodine Check test strip ranged from 0 ppm (yellow) to 5 ppm (teal-green color). Images of the SenSafe Iodine Check test strips used to test the subcutaneous tissue after incubation in 15,200 ppm $I_2$-glycerin are shown sequentially in FIGS. 8A-8J, and the $I_2$ concentrations measured are summarized in Table 3. Surprisingly, a substantial amount of $I_2$ diffused into subcutaneous tissue did not react with the biological matrix as reflected by the observation that outgassing of $I_2$ from subcutaneous tissue lasted for up to 2.5 hours. This was the first demonstration that $I_2$ remained stable in a biological tissue. Furthermore, $I_2$ escaped from subcutaneous tissue that was not covered by dermis or epidermis in a shorter period of time (2.5 hr) than from a piece of skin with dermis and epidermis (e.g., at least 20 hrs shown in Example 3).

TABLE 3

$I_2$ concentration of subcutaneous tissue after $I_2$-glycerin (15,200 ppm) treatment measured by SenSafe Iodine Check test strip

| Time after treatment (min) | $I_2$ concentration (ppm) | FIG. No. |
|---|---|---|
| 15 | 5 | 8A |
| 30 | 5 | 8B |
| 45 | 5 | 8C |
| 60 | 4 | 8D |
| 75 | 2 | 8E |
| 90 | 1 | 8F |
| 120 | 0.5 | 8G |
| 150 | 0 | 8H |

TABLE 3-continued

I$_2$ concentration of subcutaneous tissue after I$_2$-glycerin (15,200 ppm) treatment measured by SenSafe Iodine Check test strip

| Time after treatment (min) | I$_2$ concentration (ppm) | FIG. No. |
|---|---|---|
| 180 | 0 | 8I |
| 210 | 0 | 8J |

Example 3. An Embodiment of the High Molecular Iodine Concentration Compositions Inhibited Microorganism Growth on Pigskin for a Long Time after the Administration Experiment 2 demonstrated that iodine in glycerin can be absorbed into mammalian skin. This experiment explored whether iodine absorbed into mammalian skin would exhibit residual biocidal activity. An I$_2$-glycerin composition as prepared according to Example 1B (1,500 ppm (wt/v)) was used. A 2 cm×5 cm piece of pigskin from a local supermarket was submerged in the 1,500 ppm (wt/v) I$_2$-glycerin material for 3 hours. Tap water was run over both sides of the pigskin with rubbing to thoroughly wash both sides of the treated skin. Baker's yeast (0.42 grams) from a local supermarket was dispersed in 800 mL of tap water to yield a suspension that contained >0.5 mg/mL of Baker's yeast. The washed I$_2$-glycerin treated pigskin was then submerged in 30 mL of the yeast suspension for 20 minutes. As a control, an identical piece of pigskin that was washed but not treated with the I$_2$-glycerin composition was also submerged in 30 mL of the yeast suspension for 20 minutes.

An Aquavial water test kit (AquaBSsafe, Cambridge, ON N1R 8B5, Canada) was used to determine if the treated pig skin emitted a level of molecular iodine that would inhibit the growth of yeast. The Aquavial water test kit relies upon the change in color of a pH sensitive dye to detect the growth of microbes. The growth media used in the Aquavial water test kit is colored; growth of microbes in the media will reduce this color. A Cole Parmer 1100 Spectrophotometer set to 550 nm was used to measure the concentration of the dye in the growth media. The initial absorbance of the dye in the growth media was 0.40. After 2.5 hours the absorbance in the sample from untreated pigskin was 0.214; this reduction in color indicates growth of yeast. In comparison the absorbance in the sample of the treated pigskin was 0.367 which indicates that the growth of yeast was inhibited. After 20 hours the absorbance in the sample from untreated pigskin was 0.008 as compared to an absorbance of 0.232 in the sample of the treated pigskin. These results indicate that I$_2$ emitted from the treated pigskin and inhibited the growth of yeast for at least 20 hours.

Example 4. Biocidal Persistence Embodiment of the High Molecular Iodine Concentration Composition A 1,500 ppm I$_2$-glycerin (wt/v) composition as prepared according to Example 1B and used to demonstrate a biocidal persistence of treated skin for at least 6 hours. An experiment that was substantially more demanding than that defined by FDA based upon the test method known as ASTM E 2755-15 was designed for testing of the biocidal persistence of the 1,500 ppm I$_2$-glycerin (wt/v) composition. In essence, hands were first exposed to the 1,500 ppm I$_2$-glycerin (wt/v) composition and then after a defined time period, hands were contaminated with a high level of bacteria. After one minute of the bacteria exposure, the number of remaining bacteria were determined. The 1,500 ppm I$_2$-glycerin (wt/v) composition not only had biostatic persistence which only required maintaining a low level of residual bacteria on skin for at least 6 hours after the last administration of the I$_2$-glycerin composition, but also showed biocidal persistence when a high bacterial challenge up to 6 hours after the last administration of the 1,500 ppm I$_2$-glycerin (wt/v) composition was reduced by about 1 log.

A. I$_2$-Glycerin on *Staphylococcus aureus*

In one example, biocidal persistence of the 1,500 ppm I$_2$-glycerin (wt/v) composition was determined on human hands after application of a *Staphylococcus aureus* suspension at 1, 3 and 6 hours after the last administration of the 1,500 ppm I$_2$-glycerin (wt/v) composition.

Adult subjects whose hands were determined to be free from any damage were consented and told to refrain from using any antimicrobial for 24 hours prior to the test date. At the start of the test, the hands and fingers of the subjects were artificially contaminated using 0.2 mL of a high titer (≥10E8 cfu) *S. aureus* for at least 1 minute.

Control Group: The subject's hands were placed in a sterile bag and 200 mL Dey Engley neutralization broth was added and the bag was then secured with a tourniquet. The whole surface of the hands was massaged for 60 seconds to 120 seconds. A volume of 0.10 mL was removed from the broth and spread on a mannitol salt agar and incubated at 32.5° C. at 24 hours.

Treatment Groups: Three mL of the 1,500 ppm I$_2$-glycerin (wt/v) composition was applied to each subjects' hands and rubbed into the whole surface of the hands. After 1, 3 and 6 hours of the application of the 1,500 ppm I$_2$-glycerin (wt/v) composition, the hands were challenged by applying 0.2 mL of a high titer (≥10E8 cfu) *S. aureus* for at least 1 minute. Then, each hand was placed in a sterile bag, respectively, and 200 mL Dey Engley neutralization broth was added in the bag, and the bag was then secured with a tourniquet. The whole surface of the hands was massaged for 60 seconds to 120 seconds. A volume of 0.10 mL was removed from the broth and spread on a mannitol salt agar and incubated at 32.5° C. at 24 hours.

The control group demonstrated a bacterial count of 7.3×10E8 cfu/hand. The challenge to treated hands after 1 hour demonstrated a bacterial count of 6.6×10E6 cfu/hand which represents a 2 log inactivation or reduction of bacteria. The challenge to treated hands after 3 hours demonstrated a bacterial count of 4.5×10E7 cfu/hand which represents more than a 1 log inactivation or reduction of bacteria. The challenge to treated hands after 6 hours demonstrated a bacterial count of 6.9×10E7 cfu/hand which represents more than a 1 log inactivation or reduction of bacteria.

B. I$_2$-Glycerin on *E. coli*

*Escherichia coli* (ATCC11229; Manassas, VA) was purchased and grown on MacConkey Agar (Ward's Science, Henrietta, NY; Cat. #WARD470180-742; various Lots). One experiment was conducted each day to allow I$_2$ to out-gas from skin prior to conducting another experiment. On the day of an experiment, bacteria were harvested with a loop and suspended in water such that a 1/100 dilution of the *E. coli* yielded an optical density between 0.80 and 1.2 optical density at 600 nm. Quantification of this stock solution of *E. coli* was performed each day and the number of bacteria contained is a 2 µL volume ranged between 1,000 and 5,000 cfu.

Prior to conducting the experiment hands were washed with bar soap and dried. A 5 volume of a 1,500 ppm $I_2$-glycerin (wt/v) composition as prepared according to Example 1B was deposited on the finger pads of the pinky (P), ring finger (R), middle finger (M) and index finger (I) of a single hand. The $I_2$-glycerin was spread over the finger pad with a plastic loop. Different times, i.e. 30, 60, 120, 240 and 300 minutes, elapsed after the administration of the $I_2$-glycerin composition before challenging the treated finger pads with 2 µL of an *E. coli* suspension. The *E. coli* were allowed to dry on the finger pads and then after 10 minutes the finger pads were contacted to a plate of MacConkey Agar. The agar was incubated overnight at 37° C. and the colony counts for each finger pad were recorded. For each experiment, the thumb was not treated with $I_2$-glycerin and was used as a control.

A concentration above 1,100 ppm provided an antibacterial activity to kill dried *E. coli* about 30 minutes after application to human skin. Longer period for biocidal persistence were achieved as the concentration of $I_2$ increased. At 15,000 ppm $I_2$ provided complete kill of *E. coli* 2 hours after application.

TABLE 4

Biocidal Persistence of $I_2$-Glycerin Compositions at Various $I_2$ Concentrations.

| Time Delay Before *E. coli* Challenge (min) | FIG. No.* | Concentration (ppm) | *E. coli* Counts on Finger Pads | | | | |
|---|---|---|---|---|---|---|---|
| | | | P | R | M | I | C |
| 30 min | 9K | Lugol's Solution | 1 | 22 | 13 | 9 | tntc* |
| 30 min | 9L | 10% PVP-I | 0 | 0 | 21 | 63 | tntc |
| 30 min | 9A | 424 | 34 | 18 | 26 | 43 | 148 |
| 30 min | 9B | 948 | 0 | 0 | 9 | 6 | tntc** |
| 30 min | 9C | 1,100 | 3 | 8 | 7 | 16 | 161 |
| 30 min | 9D | 1,274 | 0 | 0 | 0 | 0 | tntc |
| 30 min | 9E | 1,500 | 0 | 0 | 0 | 0 | 28 |
| 30 min | 9F | 4,077 | 0 | 0 | 0 | 0 | 27 |
| 60 min | Not shown | 4,077 | 8 | 21 | 17 | 25 | 168 |
| 30 min | 9G | 8,703 | 0 | 0 | 0 | 0 | 32 |
| 60 min | 9H | 8,703 | 0 | 0 | 0 | 0 | 46 |
| 120 min | 9I | 8,703 | 0 | 0 | 11 | 1 | 68 |
| 120 min | 9J | 15,200 | 0 | 0 | 0 | 0 | 76 |
| 240 min | Not shown | 15,200 | 3 | 10 | 25 | 40 | 23 |
| 300 min | Not shown | 15,200 | 38 | 0 | 36 | 0 | 65 |

**P: pinky; R: ring finger; M: middle figure; I: index finger; and T: thumb.
*tntc: too numerous to count.

C. PVP-I on *E. coli*

Stock *E. coli* 1/500 was used on finger pads (the 1/100 dilution had an OD 600 of 1.12). a 10 µL 1/100,000 dilution was plated for quantification purposes. 5 µL 10% PVP-I solution was applied to the finger pads of the four fingers on the left, waited for 30 min; and then added 2 of the 1/500 *E. coli* finger pads of the left hand and thoroughly dried with hair dryer; waited for 10 minutes and then took an imprint of the left hand; place in incubator for overnight treatment. Data are shown in Table 4 and FIG. 9N.

D. Lugol's Solution on *E. coli*

Stock *E. coli* 1/500 was used on finger pads (the 1/100 dilution had an OD 600 of 1.12). a 10 µL 1/100,000 dilution was plated for quantification purposes. 5 µL 10% Lugol's solution was applied to the finger pads of the four fingers on the left, waited for 30 min; and then added 2 of the 1/500 *E. coli* on finger pads of the left hand and thoroughly dried with hair dryer; waited for 10 minutes and then took an imprint of the left hand; place in incubator for overnight treatment. Data are shown in Table 4 and FIG. 9O.

E. Biocidal Embodiments of the High Molecular Iodine Concentration Composition were Effective to Neutralize Significant Bioburden.

$I_2$-glycerin compositions with various $I_2$ concentrations were tested against *E. coli* challenges with various bacteria amounts on human skin.

Bacterial suspensions were prepared fresh daily prior to use in experiment noting the OD600 1:100 dilution and CFU/ml were calculated based on plating 1:100,000 dilutions after 24 hours. MacConkey agar plates were acquired from Ward's Science through VWR (MacConkey Agar Cat #WARD470180-742; Lot #1382103) and directly through the supplier IPM Scientific (Cat #11066-024 Lot #1612104). Fingers and thumb were properly readied before experiments by thoroughly washing hands for 20 seconds and then wiping with an alcohol wipe to eliminate background bacteria.

Different amounts of bacteria were deposited on the finger pads of the pinky, ring finger, middle finger, index finger and thumb of a hand. The finger pads of the pinky received 2 µL of the bacteria suspension; the ring finger received 4 (2 µL applied two times sequentially) total; the middle finger received 6 (2 µL applied three times sequentially); the index finger received 8 µL (2 µL applied four times sequentially) and 2 µL was applied to the thumb which served as a positive growth control. The 2 µL of bacterial suspension was allowed to dry completely between each successive loading. Control fingers were used to quantify the number of viable bacteria on each finger.

To treat the dried *E. coli*, 5 µL of an $I_2$-glycerin composition prepared according to the method described in Example 1B was spread with a 10 µL virgin loop spreader. The $I_2$-glycerin remained in contact with the skin for 10 minutes and then 5 µL of 0.1N sodium thiosulfate was applied to each finger pad to neutralize any residual iodine. An additional 30 seconds was allotted for this step. Control finger pads confirmed that the presence of thiosulfate did not prevent the growth of the bacteria. Fingertips were plated by contacting agar for 2 minutes continuously. $I_2$-glycerin compositions with various $I_2$ concentrations ranging from 450 ppm to 15,200 ppm were tested. All experiments were designed and set-up with similar conditions.

Treatments using concentrations from 450 ppm-1,100 ppm did not reduce the number of *E. coli* enumerated as compared to control finger pads. Therefore, bioburdens associated with high bacteria amount deposited on skin was material. A bioburden of 3,000 cfu/cm² on human skin of upper extremities may be considered clinical elevated bacterial level although higher concentrations have been measured before. Other areas of skin or mammal (e.g., human) body can contain much higher concentrations of bacteria/bioburden. Therefore, the bioburden tested herein are not extreme. A 2 µl drop of the tested *E. coli* suspension dried down in a circle with a surface area of approximately 0.6283 cm² to provide a bioburden concentration of about 1 million cfu/cm². The lowest $I_2$-glycerin concentration that the 5 µL high molecular iodine concentration compositions demonstrated meaningful bacterial kill for bioburdens of about 1 million cfu/cm² was 7,803 ppm $I_2$ (FIG. 10B). The pinky finger treated with 2 µL of $I_2$-glycerin composition at 7,803 ppm concentration demonstrated over 99% bacterial kill for 2 µL of the bacteria suspension applied (620,000 cfu). With 4 µL of the bacteria suspension applied (1,240,000 cfu), 70% was reduced and a similar reduction was observed with 8 µL of the bacteria suspension applied (2,480,000 cfu) after 10 minutes. This was further confirmed with the treatment with $I_2$-glycerin composition at 15,200 ppm $I_2$ concentration, which demonstrated a 100% reduction against 2 μL of bacteria suspension applied (580,000 cfu), 90% reduction in the 4 μL bacteria suspension applied (1,160,000 cfu) and 6 μL bacteria suspension applied (1,740,000 cfu), and 70% reduction in the 8 μL of bacteria suspension applied (2,320,000 cfu).

Example 5. An Embodiment of the High Molecular Iodine Concentration Composition Effectively Inhibited Growth of Various Bacteria A. An Embodiment of the High Molecular Iodine Concentration Composition Effectively Inhibited Growth of Various Bacteria.

Suspension testing of an example of the high molecular iodine concentration compositions herein (1,500 ppm (wt/v) $I_2$-glycerin as prepared according to Example 1B) was conducted. The biocidal activity of the iodine composition was tested against *Escherichia coli, Shigella flexneri, Staphylococcus aureus, Staphylococcus epidermidis, Serratia marcescens, Vibrio cholera*, and *Salmonella enterica*. Bacteria were grown in culture and diluted in culture media to a concentration of $10^7$ colony forming units (CFU) per plate. One mL of each bacterial suspension was placed in a 1 mL test tube and 0.10 mL of the $I_2$-glycerin composition was added. Timepoints were taken at 15, 30, 60 and 120 seconds. Controls for each bacterium were conducted, and growth media was added instead of the $I_2$-glycerin; controls were diluted in growth media and then plated. At 15 seconds there was a 4 log reduction for all bacteria treated with the $I_2$-glycerin compared with the controls. At 120 seconds there was a 6 log reduction for all bacteria treated with the $I_2$-glycerin composition compared with the controls.

B. An Embodiment of the High Molecular Iodine Concentration Composition Effectively Killed Various Bacteria.

An example of the high molecular iodine concentration compositions (1,500 ppm (wt/v) $I_2$-glycerin as prepared according to Example 1B) was tested on *E. coli* (ATCC 10536) and *S. aureus* (ATCC 6538). The test temperature was 22 degrees centigrade and the contact time was 30 seconds. Neutralization was performed using a solution of sodium thioglycollate 2.0 g/L, sodium thiosulfate 12.0 g/L, sodium bisulfite 5.0 g/L, Polysorbate 80 10.0 g/L and lecithin 14.0 g/L. The initial bacterial concentration was $2.2 \times 10^6$ CFU/mL for *E. coli* and $2.1 \times 10^6$ CFU/mL *S. aureus*. Complete kill, i.e., a 5 log reduction, was observed for both bacterial species within 30 seconds.

C. Embodiments of the High Molecular Iodine Concentration Composition Effectively Killed Various Bacteria.

Example of the high molecular iodine concentration compositions (1,500 ppm (wt/v) $I_2$ as prepared according to Example 1B) were tested against *Staphylococcus aureus, Escherichia coli, Staphylococcus epidermidis, Pseudomonas aeruginosa*, and *Salmonella enterica*. Bacteria were grown in culture and diluted in culture media to a concentration of 10E6 colony forming units (CFU) per mL. One mL or each bacterial suspension was placed in a 5 mL test tube and 0.50 mL of each 1,500 ppm (w/V) molecular iodine composition was added and immediately mixed for 15 seconds on a vortex mixer (American Scientific, Cat. No. S8223-1). After 2 minutes the iodine was neutralized by adding 1 mL of 0.2N sodium thiosulfate and then 0.10 mL of the resulting mixture was spread on blood agar plates, grown for 24 hours at 37 degrees centigrade and the number of colonies were counted. Controls were prepared by adding growth media instead of the iodine containing solutions; controls were diluted (1/100, 1/1000 and 1/10,000 in growth media and then plated. None of the bacteria survived by the two-minute time point. The positive controls all demonstrated growth at each dilution.

Example 6. >5.17 Log Reduction of SARS COV-2 within 30 Seconds without Cytotoxicity of Vero E6 Cells Observed Using with an Embodiment of the High Molecular Iodine Concentration Composition A 1,500 ppm $I_2$-glycerin (wt/v) composition as prepared according to Example 1B was used for this example to demonstrate the ability of an embodiment of the high molecular iodine concentration composition to inactivate SARS-Related Coronavirus 2 (SARS COV-2). The SARS-Related Coronavirus 2 used in this example was BEI Resources NR-52281, strain isolate USA-W 1/2020. Stock virus was prepared by collecting the supernatant culture fluid from 75-100% infected culture cells. The cells were disrupted, and cell debris removed by centrifugation at approximately 2,000 RPM for five minutes at approximately 4° C. The supernatant was removed, aliquoted, and the high titer stock virus was stored at <−70° C. until the day of use. On the day of use, two aliquots of stock virus were removed, thawed, combined and maintained at a refrigerated temperature until used in the assay. The test virus was used undiluted in the test. The stock virus tested demonstrated cytopathic effects (CPE) typical of Coronavirus on Vero E6 cells.

Vero E6 cells were used as indicator cells for this test. Cultures or Vero E6 cells were obtained from the American Type Culture Collection, Manassas, VA (ATCC CRL-1586). The cells were seeded into multiwell cell culture plates and maintained at 36-38° C. in a humidified atmosphere of 5-7% $CO_2$. On the day of testing, the cells were observed as having proper cell integrity and confluency, and therefore, were acceptable for use in this study. The cell maintenance medium and the test medium used was Minimum Essential Medium (MEM) supplemented with 2% (v/v) heat-inactivated fetal bovine serum (FBS), 10 pg/mL gentamicin, 100 units/mL penicillin, 2.5 μg/mL amphotericin B, 2.0 mM L-glutamine, 0.1 mM NEAA and 1 mM sodium pyruvate. The interfering substance used was bovine serum albumin (BSA) that was prepared by dissolving 0.3003 g of bovine serum albumin fraction V in a 100.0 mL aliquot of sterile distilled water (3% wt/v) and sterilized by membrane filtration through a 0.2 micron filter. The final concentration of bovine serum albumin (BSA) in the test was 0.3 g BSA per liter.

The test article was allowed to equilibrate at 20.0 prior to starting the test. A 200 μl aliquot of interfering substance was added to a sterile snap cap tube, a 200 μL aliquot of the test virus suspension was added to the tube, carefully avoiding the upper part of the sides of the tube, and mixed using a vortex type mixer. A 1,600 μL aliquot of the test solution was added and a timer was immediately started. The solution was mixed using a vortex mixer and placed in a water bath at 20.0 for 30 seconds. Just before the end of the exposure time, the solution was mixed using a vortex type mixer. At the end of the exposure time, a 500 μL aliquot of the test mixture was transferred to a tube containing 4.5 mL ice-cold MEM+2% FBS. A dilution series with a factor of ten was prepared within 30 minutes in sterile tubes and then assayed for the presence of virus using cell culture monolayers. Sterile water was substituted for the iodine-glycerin material for provide a virus control experimental arm.

To check for possible morphological alterations of cells by the 1,500 ppm $I_2$-glycerin (wt/v) composition, a 200 μL aliquot of sterile distilled water and a 200 μL aliquot of a 10-fold dilution of interfering substance were mixed with a 1,600 μL aliquot of the product test solution. The ratio of test substance volume used was the same as used in the virucidal test. A 500 aliquot of the mixture was transferred to a tube containing 4.5 mL ice-cold MEM+2% FBS test medium. A 100 μL aliquot of a 100-fold through a 10,000-fold dilution was inoculated into the indicator cell culture using six wells per dilution. Any microscopic changes in the cells were recorded.

Virus suspensions were titered by 10-fold serial dilution and inoculated into cell cultures using six wells per dilution. The cultures were incubated at 36-38° C. in a humidified atmosphere or 5-7% $CO_2$ (6.0% $CO_2$) in sterile disposable cell culture labware. The cultures were scored periodically for seven days for the absence or presence of CPE, cytotoxicity, and for viability.

The virus control was tested at 0 and 30 seconds and demonstrated a titer of 6.67 log at each timepoint. Cytotoxicity of the 1,500 ppm $I_2$-glycerin (wt/v) composition was not observed and therefore did not affect the ability of the test method to detect a 4 log reduction of virus. At 30 seconds virus treated with the 1,500 ppm $I_2$-glycerin (wt/v) composition could not be detected and therefore the test method demonstrated greater than a 5.17 log reduction of SARS-Related Coronavirus 2 within 30 seconds.

Example 7. Cytotoxicity Evaluation of an Embodiment of the High Molecular Iodine Concentration Composition The potential cytotoxicity of a $I_2$-glycerin composition with 1,500 ppm $I_2$ (wt/v) was evaluated. The cytotoxicity testing was conducted per ISO 10993-5: Part 5. The test was conducted per paragraph 8.3 by directly depositing the $I_2$-glycerin composition as prepared according to Example 1B into the cells (direct contact testing). The morphological properties of the cells were evaluated after 24 hours of contact with the test article and graded per the standard where a score of 2 or higher is considered cytotoxic. The test results are shown below. The test article was determined to meet ISO requirements as the score after 24 hours was 1. These results were dramatically different from those repeatedly reported for 10% PVP-I. The toxicity from PVP-I has repeatedly been ascribed to the low concentration of $I_2$ present in this material. The data shown here demonstrate that unexpectedly, a high concentration of $I_2$ showed only slight toxicity with a reactive grade of 1.

TABLE 5

Reactivity Grade for Direct Contact Test

| Grade | Reactivity | Description of Reactivity Zone |
|---|---|---|
| 0 | None | No detectable zone around or under specimen |
| 1 | Slight | Some malformed or degenerated cells under specimen |
| 2 | Mild | Zone limited to area under specimen |
| 3 | Moderate | Zone extending specimen size up to 1.0 cm |
| 4 | Severe | Zone extending farther than 1.0 cm beyond specimen |

Table adopted from ISO 10993-5: 2009, Biological evaluation of medical devices - Part 5: Tests for in vitro cytotoxicity.
A reactivity grade greater than 2 is considered to have a cytotoxic effect.

Example 8. Various Embodiments of the High Molecular Iodine Concentration Compositions Showed Different Levels of Stain on a Subject's Skin A series of high molecular iodine concentration compositions with various molecular iodine concentrations ($I_2$ concentrations) were prepared by the same method described to evaluate their respective levels of staining. High molecular iodine concentration compositions having $I_2$ concentrations up to 5,000 ppm were prepared by dispersing $I_2$ in anhydrous ethanol to provide an iodine preparation ($1.515 \times 10^5$ PPM) which was then diluted in anhydrous glycerin to provide high molecular iodine concentration compositions with $I_2$ concentrations of 1,025 ppm, 1,655 ppm, 2,000 ppm, 2,200 ppm, 4,100 ppm, and 4,400 ppm. High molecular iodine concentration compositions with higher $I_2$ concentrations were prepared by dissolving $I_2$ into anhydrous glycerin directly to reach the desired $I_2$ concentration. The concentrations of molecular iodine in the $I_2$-glycerin composition tested for staining were: 1,025 ppm, 1,655 ppm, 2,000 ppm, 2,200 ppm, 4,100 ppm, 4,400 ppm, 8,200 ppm, 8,400 ppm, 12,250 ppm, 13,900 ppm, 15,000 ppm, 16,500 ppm, 17,000 ppm, 33,000 ppm, 66,000 ppm, and 68,000 ppm.

A. Staining Effects of High Molecular Iodine Concentration Compositions Having Concentration of 1,025 ppm, 2,000 ppm, 4,100 ppm, 8,200 ppm, 16,500 ppm, 33,000 ppm, and 66,000 ppm A drop (0.15 mL to 0.2 mL) of the high molecular iodine concentration compositions of each concentration was administered to the forearm of a volunteer, remained pooled at the site of administration for one minute, and then the residue was wiped off after 1 minute.

FIG. 10A shows the initial administration of the $I_2$-glycerin compositions onto the forearm of the subject. From the left to the right were $I_2$-glycerin compositions with molecular iodine concentration of 1,025 ppm; 2,000 ppm; 4,100 ppm; 8,200 ppm; 16,500 ppm; 33,000 ppm; and 66,000 ppm, respectively. It appeared that the static viscosity of the $I_2$-glycerin compositions was influenced by the concentration of molecular iodine.

FIG. 10B shows 1 min. after the $I_2$-glycerin compositions with different molecular iodine concentrations were administered on the forearm before the residue was wiped off. No observable stain was left for the $I_2$-glycerin compositions with molecular iodine concentration of 1,025 ppm (FIG. 10B, compared to the left-most spot shown in FIG. 10A). In contrast, there was unabsorbed $I_2$-glycerin at higher molecular iodine concentrations.

FIG. 10C below shows the skin of the subject at 5 minutes after the initial administration of the $I_2$-glycerin compositions with different molecular iodine concentrations. No observable stain was left with the $I_2$-glycerin compositions with molecular iodine concentrations of 1,025 ppm, 2,000 ppm, or 4,100 ppm (FIG. 10C, compared to the three spots at the far left shown in FIG. 10A).

FIG. 10D below shows the skin of the subject at 15 minutes after the initial administration of the $I_2$-glycerin compositions with different molecular iodine concentrations. No discoloration was observed for the $I_2$-glycerin compositions with molecular iodine concentrations of 1,025 ppm, 2,000 ppm, 4,100 ppm, 8,200 ppm, or 16,500 ppm (FIG. 10D, compared to the five spots at the far left shown in FIG. 10A).

FIG. 10E below shows a visible stain on the skin of the subject at 30 minutes after the initial administration of the $I_2$-glycerin composition with a molecular iodine concentration of 66,000 ppm (FIG. 10E, the spot at the right), while the stains from the $I_2$-glycerin composition with a molecular iodine concentration of 8,200 ppm, 16,500 ppm, and 33,000 ppm continued to fade away compared to FIG. 10D.

Unexpectedly, these results demonstrate that it is possible to apply the high molecular iodine concentration compositions with high concentrations of $I_2$ to a subject's skin with little or no visible staining.

B. Staining Effects of High Molecular Iodine Concentration Compositions Having Concentration of 1,655 ppm, 15,000 ppm, and 68,000 ppm Two to three drops of the high molecular iodine concentration compositions of $I_2$ at concentrations of 1,655 ppm, 15,000 ppm, and 68,000 ppm were administered to a subject's hands, respectively. Immediately after administration, the drops were spread over the entire surface of both hands by rubbing both hands together. The staining results are summarized in Table 6 below.

TABLE 6

Staining results for high molecular iodine concentration compositions with concentration of $I_2$ of 1,655 ppm, 15,000 ppm, and 68,000 ppm

| $I_2$ conc. (ppm) | Staining results |
|---|---|
| 68,000 | A stain was observed immediately after administration, but the stain disappeared within 60 minutes after administration. |
| 15,000 | A stain was observed immediately after administration, but the stain disappeared within 5 minutes after administration. |
| 1,655 | No stain was observed after administration. |

C. Staining Effects of High Molecular Iodine Concentration Compositions Having Concentration of 2,200 ppm, 4,400 ppm, 8,400 ppm, 12,250 ppm, 13,900 ppm, and 17,000 ppm Two to three drops of the high molecular iodine concentration compositions of $I_2$ at concentrations of 2,200 ppm, 4,400 ppm, 8,400 ppm, 12,250 ppm, 13,900 ppm, and 17,000 ppm were administered to a subject's hands, respectively. Immediately after administration, the drops were spread over the entire surface of both hands by rubbing both hands together. The staining results are summarized in Table 7, FIGS. 11A (before application) & 11B (0 sec after application), FIGS. 12A (before application) & 12B (0 sec after application), FIGS. 13A (before application) & 13B (0 sec after application), FIGS. 14A (before application) & 14B (0 sec after application), FIGS. 15A (before application) & 15B-15E (0 sec, 30 sec, 1 min, and 2 min after application, respectively), and FIGS. 16A&16B (before application, as two sets of experiments were run) & 16C-16F (0 min, 1 min, 5 min, and 9 min after application, respectively). No stain was observed immediately after administration of the high molecular iodine concentration compositions of $I_2$ concentrations of 2,200 ppm (FIG. 11B), 4,400 ppm (FIG. 12B), 8,400 ppm (FIG. 13B), and 12,250 ppm (FIG. 14B); and although stain was observed immediately after administration but the stain disappeared within 2 minutes and 10 minutes after administration of the high molecular iodine concentration composition of 13,900 ppm (FIGS. 15B-15E) and 17,000 ppm (FIGS. 16C-16F), respectively.

TABLE 7

Staining effects of high molecular iodine concentration compositions with concentration of $I_2$ of 2,200 ppm, 4,400 ppm, 8,400 ppm, 12,250 ppm, 13,900 ppm, and 17,000 ppm

| $I_2$ conc. (ppm) | Staining effects | FIG. No. |
|---|---|---|
| 2,200 | No stain was observed after administration. | FIG. 11B |
| 4,400 | No stain was observed after administration. | FIG. 12B |

TABLE 7-continued

Staining effects of high molecular iodine concentration compositions with concentration of $I_2$ of 2,200 ppm, 4,400 ppm, 8,400 ppm, 12,250 ppm, 13,900 ppm, and 17,000 ppm

| $I_2$ conc. (ppm) | Staining effects | FIG. No. |
|---|---|---|
| 8,400 | No stain was observed after administration. | FIG. 13B |
| 12,250 | No stain was observed after administration. | FIG. 14B |
| 13,900 | A stain was observed immediately after administration, but the stain disappeared within 2 minutes after administration. | FIG. 15B-15E |
| 17,000 | A stain was observed immediately after administration, but stain disappeared within 10 minutes after administration. | FIG. 16C-16F |

Example 9. Treatment Effects of an Embodiment of the High Molecular Iodine Concentration Composition A. Treating Plaque Psoriasis with an Embodiment of the High Molecular Iodine Concentration Composition The finger of a sixty-five-year-old Asian male with a diagnosis of plaque psoriasis is shown in FIG. 17A. The condition was chronic and none of the available drug therapies available had any effect on symptoms which included swelling, stiffness, discoloration and plaques. Twice a day 0.2 mL of an embodiment of the high molecular iodine concentration composition (1,500 ppm (wt/v) $I_2$-glycerin as prepared according to Example 1B) was applied to each hand and rubbed into the skin. After one week there was tangible improvements in symptoms as can be observed in FIG. 17B: swelling was reduced, plaques were reduced and skin coloration improved.

B. Treating Hives with an Embodiment of the High Molecular Iodine Concentration Composition In another instance a young male who suffered severe breakouts of hives that prevented sleep for up to a week was treated by spraying the 1,500 ppm (wt/v) $I_2$-glycerin composition as prepared according to Example 1B onto the hives. The 1,500 ppm $I_2$-glycerin composition brought rapid relief as the subject was able to sleep without any itching.

C. Treating Poison Sumac Rash with an Embodiment of the High Molecular Iodine Concentration Composition In another instance an adult female contacted poison oak of her left hand. Application of the 1,500 ppm (wt/v) $I_2$-glycerin composition as prepared according to Example 1B eliminated itching within an hour and resolved the poison sumac rash within two days. These clinical observations indicate that high level of molecular iodine was effective to remediate symptoms associated with immune mediated conditions.

D. Treating Bee Sting with an Embodiment of the High Molecular Iodine Concentration Composition A 26-year-old Caucasian female who is highly allergic to insect bites was stung by a bee on her left ankle. The subject used her EpiPen® to control for anaphylaxis. Within 24 hours the area surrounding the sting site as well as the entire left foot and ankle (up to mid-calf) was extensively swollen (FIG. 18A). Blistering from the inflammation and swelling was observed (FIG. 18B). Ice was applied to the ankle without any symptom relief. Cortisone cream was applied liberally to alleviate the itching but the itching and swelling continued. Finally, the subject applied two drops (0.3 to 0.4 mL) of the 1,500 ppm (wt/v) $I_2$-glycerin composition as prepared according to Example 1B to the bite and within 10 minutes the swelling went down and there was no itchiness. FIG. 18C shows reduced swelling post application of the 1,500 ppm (wt/v) $I_2$-glycerin composition in the left ankle of the subject after about 30 minutes. FIG. 18D shows a dramatic reduction in blistering at the bite area 30 minutes after the 1,500 ppm (wt/v) $I_2$-glycerin composition was applied to the area of the bee sting. The 1,500 ppm (wt/v) $I_2$-glycerin composition was applied to the bee sting ten times over the next 72 hours at which point in time the bee string was largely resolved (FIG. 18E).

E. Treating Plantar Wart with an Embodiment of the High Molecular Iodine Concentration Composition A 52-year old male of European descent was treated for a painful plantar wart on the bottom of his large right toe. Prior to treatment the wart was painful to walk on and interfered with his quality of life. The treating physician prescribed cryotherapy 4 times over a course of 21 days between each treatment. After the first freezing and removal of tissue the individual was pain free. Treatment of the wart was interrupted due to the COVID-19 pandemic and the wart grew back. Pain from the wart eventually equaled the pain level that induced the patient to initially seek medical help.

In an evening of the first day, one drop (0.15 mL to 0.2 mL) of the 1,500 ppm (wt/v) $I_2$-glycerin composition as prepared according to Example 1B was applied to the wart. By the next morning, the individual had no pain associated with walking on the toe. Areas of the wart became darkly stained overnight. Thereafter, the wart was treated twice a day, with one drop (0.15 mL to 0.2 mL) of the 1,500 ppm (wt/v) $I_2$-glycerin composition each morning and evening. Each morning prior to treatment an Emory board was run over the wart two times to remove the top layer of dead skin prior to administering the 1,500 ppm (wt/v) $I_2$-glycerin composition. After two days there was a significant change in the appearance of the wart and the areas of staining were coming to the surface of the epidermis (FIG. 19A). By the morning of the sixth day, there was a substantial improvement in the wart (FIG. 19B). The thickened skin, or collar surrounding the wart was about 50% gone and the reduction in pain was associated with the reduction in skin thickening. FIG. 19C shows the wart after treatment of 2 months and 1 week.

It is known that foot warts lie below the skin surface and are challenging to treat. Without wishing to be bound by any theory, these results could indicate that the molecular iodine in the 1,500 ppm (wt/v) $I_2$-glycerin composition was absorbed into skin and was effective in the epidermis and dermis. The inactivation of human papilloma virus (HPV) was likely associated with the dark areas of staining observed during treatment. These observations also indicate that high concentrations of molecular iodine had favorable toxicological properties as there was clear evidence of growth of new skin.

F. Treating Tinea with an Embodiment of the High Molecular Iodine Concentration Composition A patient was treated for tinea with 1,500 ppm (wt/v) $I_2$-glycerin composition as prepared according to Example 1B twice a day. The 1,500 ppm (wt/v) $I_2$-glycerin composition was administered to cover the skin area to be treated. The patient's condition before treatment is shown in FIG. 20A; which appeared to be completely resolved after treatment of two weeks (FIG. 20B).

Before the treatment, the patient was treated with Dettol which was chloroxylenol 4.8% wt/v as the active ingredient dispersed in pine oil, isopropyl alcohol, castor oil, caustic soda solution, caramel, and/or water. He had an allergic reaction to Dettol.

G. Treating Seborrheic Dermatitis with an Embodiment of the High Molecular Iodine Concentration Composition A sixty-five-year-old Caucasian male was diagnosed by his dermatologist with seborrheic dermatitis. Seborrheic dermatitis is believed to be an inflammatory reaction to yeast that lives on the skin's surface. The yeast is believed to overgrow which causes the immune system to react which leads to an inflammatory response that results in skin changes. The patient was instructed to wash affected areas twice daily with a 2% zinc pyrithione solution and apply a moisturizer. The patient followed this routine for over a month without any benefit. The patient then initiated a treatment regime using a 1,500 ppm (wt/v) $I_2$-glycerin composition as prepared according to Example 1B twice a day. The 1,500 ppm (wt/v) $I_2$-glycerin composition was administered to cover the skin area to be treated. A picture of the symptoms associated with this dermatitis at the time of diagnosis (baseline) is shown in 21A. The patient applied the 1,500 ppm (wt/v) $I_2$-glycerin composition to the affected areas on his face in the morning and in the evening for 14 days. Symptoms showed a significant improvement by day 7 (results not shown) and by day 14 the condition was almost completely resolved (FIG. 21B).

H. Treating Fungal Nails with an Embodiment of the High Molecular Iodine Concentration Composition A subject's fungal nails are shown in FIG. 22A. Twice a day 0.2 mL of an embodiment of the high molecular iodine concentration composition (1,500 ppm (wt/v) $I_2$-glycerin as prepared according to Example 1B) was applied to the toes and rubbed into the skin. After thirty days improvements were observed as shown in FIG. 22B, while conventional antifungal treatment of fungal nails may take several months to see results. See, e.g., https://www.mayoclinic.org/diseases-conditions/nail-fungus/diagnosis-treatment/drc-20353300.

Fungal nail infections (also referred to as "onychomycosis") are common infections of the fingernails or toenails that can cause the nail to become discolored, thick, and more likely to crack and break. Infections are more common in toenails than fingernails. See, e.g., https://www.cdc.gov/fungal/nail-infections.html. Fungal nail infections may be caused by various types of fungi (e.g., yeasts or molds). Fungal nail infections could be difficult to cure and typically won't go away without antifungal treatment that can take several months to be effective. This example showed unexpected effectiveness of the embodiment of the high molecular iodine concentration composition for treatment of fungal nails.

Example 10. Additional Examples

Example 1': A non-aqueous high molecular iodine concentration solution comprising:
molecular iodine having a concentration of about 1,500 ppm by wt/v,
glycerin having a concentration of about 99% wt of the total weight of the solution, and
ethanol having a concentration of about 1% or less of the total weight of the solution.

Example 2': The solution of Example 1', wherein the ethanol concentration is 0.1%.

Example 3': The solution of Example 1', wherein the solution is complexed iodine free.

Example 4': The solution of Example 1', wherein the solution is substantially complexed iodine-free.

Example 5': The solution of Example 1', wherein the molecular iodine concentration is at least 99% of all iodine species in the solution.

Example 6': The solution of Example 1', wherein the high molecular iodine concentration solution does not exhibit any molecular iodine loss at room temperature for at least three months.

Example 7': The solution of Example 1', wherein the high molecular iodine concentration solution does not exhibit molecular iodine loss at room temperature for at least a year.

Example 8': The solution of Example 1', wherein the high molecular iodine concentration solution does not exhibit molecular iodine loss at room temperature for 480 days.

Example 9': The solution of Example 1', wherein the solution is not cytotoxic.

Example 10': The solution of Example 1', wherein the solution is biostatic persistent.

Example 11': The solution of Example 1', wherein the solution is biocidal persistent.

Example 12': The solution of Example 1, wherein the solution is non-staining.

Example 13': A high molecular iodine concentration composition comprising:
molecular iodine having a concentration of about 1,400 ppm to about 150,000 ppm, about 1,400 ppm to about 100,000 ppm, about 1,400 ppm to about 68,000 ppm, about 1,400 ppm to about 66,000 ppm, about 1,400 ppm to about 60,000 ppm, about 1,400 ppm to about 55,000 ppm, about 1,400 ppm to about 50,000 ppm, about 1,400 ppm to about 45,000 ppm, about 1,400 ppm to about 40,000 ppm, about 1,400 ppm to about 35,000 ppm, about 1,400 ppm to about 30,000 ppm, about 1,400 ppm to about 25,000 ppm, about 1,400 ppm to about 20,000 ppm, about 1,400 ppm to about 15,200 ppm, about 1,400 ppm to about 15,000 ppm, about 1,400 ppm to about 10,000 ppm, about 1,400 ppm to about 8,703 ppm, about 1,400 ppm to about 8,000 ppm, about 1,400 ppm to about 5,000 ppm, about 1,400 ppm to about 4,077 ppm, about 1,400 ppm to about 2,000 ppm, about 1,400 ppm to about 1,700 ppm, about 1,274 ppm to about 150,000 ppm, about 1,274 ppm to about 100,000 ppm, about 1,274 ppm to about 68,000 ppm, about 1,274 ppm to about 66,000 ppm, about 1,274 ppm to about 60,000 ppm, about 1,274 ppm to about 55,000 ppm, about 1,274 ppm to about 50,000 ppm, about 1,274 ppm to about 45,000 ppm, about 1,274 ppm to about 40,000 ppm, about 1,274 ppm to about 35,000 ppm, about 1,274 ppm to about 30,000 ppm, about 1,274 ppm to about 25,000 ppm, about 1,274 ppm to about 20,000 ppm, about 1,274 ppm to about 15,200 ppm, about 1,274 ppm to about 15,000 ppm, about 1,274 ppm to about 10,000 ppm, about 1,274 ppm to about 8,703 ppm, about 1,274 ppm to about 8,000 ppm, about 1,274 ppm to about 5,000 ppm, about 1,400 ppm to about 4,077 ppm, about 1,274 ppm to about 2,000 ppm, about 1,274 ppm to about 1,700 ppm, about 1,500 ppm, about 2,000 ppm, about 4,077 ppm, about 4,100 ppm, about 8,200 ppm, about 8,703 ppm, about 15,200 ppm, about 16,500 ppm, or about 33,000 ppm by wt/v; and an organic carrier having a concentration of no less than about 93.5% wt, no less than about 95% wt, no less than about 98% wt, or no less than about 99% wt of the total weight of the high molecular iodine concentration composition.

Example 14': A high molecular iodine concentration composition comprising:
molecular iodine having a concentration of about 1,025 ppm to about 66,000 ppm; and
an organic carrier having a concentration of about 95% wt or higher, about 98% wt or higher, or about 99% wt or higher; and
the high molecular iodine concentration composition being non-staining, stain free or substantially stain free.

Example 15': The high molecular iodine concentration composition of Example 13' or 14', the organic carrier being selected from the group consisting of glycols with molecular weight of less than 300 (e.g., propylene glycol, di-propylene glycol, and glycerin), propylene glycol monomethyl ether acetate, dimethyl sulfoxide, alcohols (e.g., ethanol, propanols such as isopropanol and 1-propanol), and any mixtures of the foregoing.

Example 16': The high molecular iodine concentration composition of any one of Examples 13'-15', being complexed iodine-free of substantially complexed iodine-free.

Example 17': The high molecular iodine concentration composition of any one of Examples 13'-16', at least about 95%, at least about 96%, at least about 97%, at least about 98%, at least about 99%, or at least about 99.9% of all iodine species in the high molecular iodine concentration composition being molecular iodine.

Example 18': The high molecular iodine concentration composition of any one of Examples 13'-17', being stable.

Example 19': The high molecular iodine concentration composition of any one of Examples 13'-18', the concentration change of the molecular iodine in the high molecular iodine concentration composition being less than about 5%, less than about 4%, less than about 3%, less than about 2%, less than about 1%, or less than about 0.5% after 3, 6, 12, 24, or 36 months at room temperature.

Example 20': The high molecular iodine concentration composition of any one of Examples 13'-19', being alcohol-free or substantially alcohol free.

Example 21': The high molecular iodine concentration composition of any one of Examples 13'-20', the alcohol content being less than 5% wt, less than about 4% wt, less than about 3% wt, less than about 2% wt, less than about 1.9% wt, less than 1.8% wt, less than 1.7% wt, less than 1.6% wt, less than about 1.5% wt, less than 1.4% wt, less than 1.3% wt, less than 1.2% wt, or less than 1.1% wt, less than about 1% wt, less than about 0.9% wt, less than 0.8% wt, less than 0.7% wt, less than 0.6% wt, less than about 0.5% wt, less than 0.4% wt, less than 0.3% wt, less than 0.2% wt, or less than 0.1% wt.

Example 22': The high molecular iodine concentration composition of any one of Examples 13'-21', being non-aqueous, substantially non-aqueous, water-free or substantially water-free.

Example 23': The high molecular iodine concentration composition of any one of Examples 13'-22', the water content being less than about 2% wt, less than about 1.9% wt, less than 1.8% wt, less than 1.7% wt, less than 1.6% wt, less than about 1.5% wt, less than 1.4% wt, less than 1.3% wt, less than 1.2% wt, or less than 1.1% wt, less than about 1% wt, less than about 0.9% wt, less than 0.8% wt, less than 0.7% wt, less than 0.6% wt, less than about 0.5% wt, less than 0.4% wt, less than 0.3% wt, less than 0.2% wt, or less than 0.1% wt.

Example 24': The high molecular iodine concentration composition of any one of Examples 13'-23', being biostatic resistance, biocidal resistance, or has prolonged biocidal activity.

Example 25': The high molecular iodine concentration composition of any one of Examples 13'-24', further comprising one or more additives selected from the group consisting of gelling agents, polymers, viscosity enhancing agents, unsaturated fatty acids, desiccants, and fragrances.

Example 26': The high molecular iodine concentration composition of Example 25', the gelling agents being selected from the group consisting of synthetic hydrocolloids, e.g., homopolymers of acrylic acid such as those offered by Lubrizol Advanced Materials, Inc., Cleveland, OH, including Ultrez 10®, Ultrez 20®, Ultrez 30® and the Carbopols including Carbopol® 934, Carbopol® 940, Carbopol® 980, Carbopol® SC-200; methyl glucoside derivatives; alcohol esters such as monohydric alcohol esters, polyhydric alcohol esters; polyethylene glycols (PEG) such as PEG-diisostearate, propoxylated PEG monolaurate, polyglyeryl-3-laurate, natural hydrocolloids like carrageenan, locust bean gum, guar gum, acacia, tragacanth, alginic acid, or gelatin, and semisynthetic hydrocolloids like carboxymethyl cellulose, methyl cellulose and hydroxypropyl methyl cellulose.

Example 27': A pharmaceutical formulation comprising the high molecular iodine concentration composition of any one of the previous Examples.

Example 28': A method of killing or inhibiting the growth of a parasite and/or a microorganism on or in a subject comprising administering a therapeutically effective amount or a prophylactically effective amount of the high molecular iodine concentration composition or pharmaceutical formulation of any one of the previous Examples to the subject.

Example 29': A method of treating or preventing a condition associated with a parasite and/or a microorganism of a subject comprising administering a therapeutically effective amount or a prophylactically effective amount of the high molecular iodine concentration composition or pharmaceutical formulation of any one of the previous Examples to the subject.

Example 30': The method of Example 28' or Example 29', the microorganism being selected from the group consisting of virus, bacteria, fungus, and protozoa.

Example 31': The method of Example 30', the virus being selected from the group consisting of adenoviruses (e.g., human adenovirus), Norovirus, Reovirus, Rotavirus, Aphthovirus, Parechovirus, papovaviruses (e.g, Polyoma virus and SV40), Erbovirus, Kobuvirus, Teschovirus, Reoviruses (e.g., rotavirus and human reovirus), Hepatovirus, Hepatitis E virus, Rubella virus, Lymphocytic choriomeningitis virus, retroviruses (e.g., HIV-1, HIV-2, rous sarcoma virus (rSV), and mouse leukemia viruses), HTLV-I, herpesviruses (e.g., Human herpes Simplex Virus 1 and 2), Cardiovirus (e.g., Norwalk virus), Orthomyxovirus (e.g., Influenza Virus A, B and C), Isavirus, Thogotovirus, Coxsackie Virus, virus and semliki forest virus and the flaviviruses (group b) (e.g., Dengue virus, yellow fever virus and the St. Louis encephalitis virus), Yellow fever virus, Hepatitis A virus, Hepatitis B virus, Hepatitis C virus, Measles virus, Mumps virus, Respiratory syncytial virus, Bunyaviruses, (e.g., bunyawere (encephalitis), California encephalitis virus), Hantavirus, filoviruses, (e.g., Ebola virus, Marburg virus), Corona virus, Astroviruses, Borna disease virus, Poxviruses, (Vaccinia virus and variola (Smallpox)), Parvoviruses (e.g., Adeno associated virus (aav)), Picornaviruses (e.g., Poliovirus), Togavi ruses (e.g., including the alpha viruses (group a), e.g., Sindbis), Rhabdo viruses, (e.g., vesicular stomatitis virus (VSV) and rabies virus), Arena viruses (e.g., lassa virus), Coronaviruses (e.g., common cold (rhinovirus), GI distress viruses, SARS-Cov-2, SARS), Ebola, Human Papilloma virus (HPV), Herpes Simplex virus 1 or 2, Human Immunodeficiency Virus (HIV), Hepatitis A virus (HAV), Hepatitis B virus (HBV), Hepatitis C virus (HCV), and prions.

Example 32': The method of Example 31, the condition associated with the virus being selected from the group consisting of COVID-19, SARS, Ebola, HPV infection (e.g., plantar warts), herpes, AIDS, hepatitis A, hepatitis B, and Hepatitis C.

Example 33': The method of Example 30', the bacterium being selected from the group consisting of *Bacillus oleronius, Streptococcus pyogenes, Erysipelothrix rhusiopathiae, Mycobacterium tuberculosis, Mycobacterium bovis, Escherichia coli*, Extended Spectrum Beta Lactamase resistant *E. Coli* (ESBL), *Shigella flexneri, Staphylococcus aureus, Staphylococcus epidermidis, Serratia marcescens, Vibrio cholera*, MRSA, *Salmonella enterica*, Gonorrhea, Syphilis, *Shewanella algae, Shewanella putrefaciens, Chlamydia, Chlamydia trachomatis, Chlamydia pneumoniae, Chlamydia psittacci, Aeromonas hydrophila, Vibrio species, Pasteurella multocida*, antibiotic resistant bacteria, and antibiotic resistant flesh eating bacteria.

Example 34': The method of Example 33, the condition associated with the bacterium being selected from the group consisting of tuberculosis, periodontitis, acne (e.g., *Propionibacterium acnes*), rosacea, impetigo, cellulitis, folliculitis, and infections caused by the bacterium.

Example 35': The method of Example 30', the fungus being selected from the group consisting of *Aspergillus, Coccidioides, Histoplasma capsulatum, Trichophyton, Microsporum, Epidermophyton*, yeast, *Candida*, and *Candida albicans*.

Example 36': The method of Example 35', the condition associated with the fungus being selected from the group consisting of ringworm, yeast infection, and seborrheic dermatitis.

Example 37': The method of Example 30', the protozoa being selected from the group consisting of *Acanthamoeba, Leishmania* parasites, *Trypanosoma, Entamoeba histolytica*, and *Toxoplasma gondii*.

Example 38': The method of Example 37', the condition associated with the protozoa being selected from the group consisting of *Acanthamoeba* infections, *Acanthamoeba keratitis*, Leishmaniasis, trypanosomiases, Amebiasis, and Toxoplasmosis.

Example 39': The method of Example 30', the parasite being selected from the group consisting of Scabies mite (*Sarcoptes scabiei*), Red mite (*Dermanyssus gallinae*), Cercarial Dermatitis (Swimmer's Itch), Tropical rat mite (*Ornithonyssus bacoti*), Spiny rat mite (*Laelaps echidnina*), *Demodex* species (e.g., *Demodex* mite), *Loa*, and Cryptosporidiosis.

Example 40': The method of Example 39', the condition associated with the parasite being selected form the group consisting of mite dermatitis caused by the mites listed above, e.g., scabies, Red mite infestation, Cercarial Dermatitis, Tropical rat mite dermatitis, Spiny rat mite dermatitis, *Demodex folliculorum* dermatitis, Loiasis, and *Cryptosporidium* infection.

Example 41': A method of killing microbes comprising administering a high concentration molecular iodine solution of about 1,500 ppm by wt/v molecular iodine, and glycerin having a concentration of about 99% wt of the total weight of the solution to a treatment area on a human subject.

Example 42': The method of any one of Examples 28'-41', wherein the treatment area is on or under the skin.

Example 43': The method of any one of Examples 28'-42', wherein the molecular iodine is absorbed by the epidermis.

Example 44': The method of any one of Examples 28'-42', wherein the molecular iodine is absorbed by the subcutaneous tissue.

Example 45': The method of any one of Examples 28'-42', wherein the molecular iodine is absorbed by the dermal tissue.

Example 46': The method of any one of Examples 28'-42', where in the molecular iodine outgasses from the skin.

Example 47': The method of any one of Examples 28'-42' wherein the microbes or microorganism are bacteria, virus or yeast.

Example 48': The method of Example 47', where in the bacteria is selected from the group consisting of *Escherichia coli, Shigella flexneri, Staphylococcus aureus, Staphylococcus epidermidis, Serratia marcescens, Vibrio cholera, Pseudomonas aeruginosa* and *Salmonella enterica*.

Example 49': The method of anyone of Examples 33', 34', and 48', wherein the outgassing of molecular iodine completely kills bacteria for 30 minutes after administration.

Example 50': The method of anyone of Examples 33', 34', and 48', wherein the outgassing of molecular iodine completely kills bacteria for 60 minutes, 90 minutes, 120 minutes, or 150 minutes after administration.

Example 51': A method of treating or preventing a skin condition of a subject comprising administering a therapeutically effective amount or a prophylactically effective amount of the high molecular iodine concentration composition or pharmaceutical formulation of any one of the previous Examples to the subject, the skin condition being selected from the group consisting of:
1) skin conditions associated with a biological reaction of a subject to an exogenously introduced irritant;
2) skin conditions associated with an autoimmune disease; and
3) acne and rosacea.

Example 52': The method of Example 51', the exogenously introduced irritant being introduced to the subject by an animal (e.g., insect stings and bites, and jellyfish stings) or a plant (e.g., poison oak, poison sumac, or poison ivy).

Example 53': The method of Example 52', the insects being selected from the group consisting of bee, wasp, hornet, scorpion, ant, spider, and mosquito; and the jellyfish being selected from the group consisting of *Physalia* sp. (Portuguese Man-o-War, Blue-bottle), Cubozoan jellyfish (e.g., *Chironex fleckeri*), Carybdeids (e.g., *Carybdea arborifera* and *Alatina moseri*), *Linuche unguiculta* (Thimble jellyfish), a jellyfish responsible for Irukandji syndrome (*Carukia barnesi*) and *Pelagia noctiluca*.

Example 54': The method of Example 53', the exogenously introduced irritant being selected from the group consisting of apitoxin (bee venom), histamine, tyramine, serotonin, catecholamines, hydrolases (wasp venoms), anticoagulant (mosquito saliva), proteinaceous porins, neurotoxic peptides, and bioactive lipids.

Example 55': The method of Example 51', the autoimmune disease being selected from the group consisting of diabetes, scleroderma, psoriasis, dermatomyositis, epidermolysis bullosa, and bullous pemphigoid.

Example 56': The method of Example 55', the condition being diabetes, and the skin condition being selected from the group consisting of acanthosis *nigricans*, bullosis diabeticorum (diabetic blisters), digital sclerosis, disseminated granuloma annulare, eruptive xanthomatosis, and necrobiosis lipoidica diabeticorum.

Example 57': The method of any one of Examples 51' to 56', the condition being associated with an immune response.

Example 58': The method of any one of Examples 51' to 57', the condition being associated with an inflammatory response.

Example 59': A method of fostering wound-healing or preventing a wound of a subject comprising administering a therapeutically effective amount or prophylactically effective amount of the high molecular iodine concentration composition or pharmaceutical formulation of any one of Examples 1-27 to the subject.

Example 60': The method of Example 59', the wound healed in presence of the high molecular iodine concentration composition or pharmaceutical formulation being healed with a scar less severe and/or in a shorter period of time than a similar wound healed without administration of the high molecular iodine concentration composition or pharmaceutical formulation.

Example 61': The method of Example 59' or 60', the wound being inflicted by a cut, a friction, cold, heat, radiation (e.g., sunburn), a chemical, electricity, a microorganism and/or parasite infection, pressure, and/or a condition of the subject (e.g., diabetes).

Example 62': The method of Example 61', the condition of the subject being diabetes, and the wound being selected from the group consisting of bullosis diabeticorum (diabetic blisters), eruptive xanthomatosis, and neuropathic ulcers (e.g., diabetic foot ulcers).

Example 63': The method of Example 59', the wound being inflicted by pressure, and the wound being a decubitus ulcer (i.e., pressure ulcer, pressure sore, or bedsore).

Example 64': The method of any one of Examples 59' to 63', the high molecular iodine concentration composition or pharmaceutical formulation being applied before the wound being inflicted.

Example 65': The method of any one of Examples 28' to 42', the high molecular iodine concentration composition or pharmaceutical formulation being applied to a tissue where the condition being at or in proximity.

Example 66': The method of Example 65', the tissue being a mucosal tissue or a cutaneous tissue.

Example 67': The method of Example 66', the mucosal tissue being in or surrounds a biological cavity selected from the group consisting of eye cavity, ear cavity, oral cavity, nasal cavity, vaginal cavity, rectal cavity, and urethral cavity.

Example 68': A method of treating a surgical site to foster healing, prevent infection, and/or inhibit tumor recurrence in a subject in need comprising administering to the subject a therapeutically effective amount or a prophylactically effective amount of the high molecular iodine concentration composition or pharmaceutical formulation of any one of Examples 1-27 to the subject.

Example 69': The method of Example 68', the high molecular iodine concentration composition or pharmaceutical formulation being applied to a surgical site or tissue in proximity of the surgical site.

Example 70': The method of Example of 69', the high molecular iodine concentration composition or pharmaceutical formulation being applied to a surgical site as a surgical lavage (pre-surgical, post-surgical, or during surgery).

Example 71': The method of Example 70', the surgical lavage being applied as a liquid stream or as a spray.

Example 72': The method of Example 68', the high molecular iodine concentration composition or pharmaceutical formulation being applied to a surgical site comprising a chest cavity.

Example 73': The method of Example 68', the surgical site comprises a tumor.

Example 74': The method of Example 73', the tumor comprises a benign tumor, a premalignant tumor, or a malignant tumor.

Example 75': The method of Example 74', the benign tumor being selected from the group consisting of adenomas, fibromas, hemangiomas, and lipomas.

Example 76': The method of Example 74', the premalignant tumor being selected from the group consisting of actinic keratosis, cervical dysplasia, metaplasia of the lung, and leukoplakia.

Example 77': The method of Example 74', the malignant tumor being selected from the group consisting of carcinomas, sarcomas, germ cell tumors, blastomas, adenocarcinoma, melanoma, basal cell carcinoma, squamous cell carcinoma, NUT carcinoma, ductal carcinoma in situ (DCIS), invasive ductal carcinoma, malignant rhabdoid tumor, Wilms tumor, renal cell carcinoma, chondrosarcoma, Ewing sarcoma, osteosarcoma, Desmoid tumor, hepatoblastoma, hepatocellular carcinoma, alveolar soft-part sarcoma, angiosarcoma, fibrosarcoma, liposarcoma, neurofibrosarcoma, rhabdomyosarcoma, synovial sarcoma, adrenal tumor, carcinoid tumor, carney triad, multiple endocrine neoplasia (MEN), neuroendocrine tumors, paragangliomas, pheochromocytomas, thyroid carcinoma, pancreatic tumor, nasopharyngeal carcinoma, ovarian tumor, testicular tumor, thoracic tumor, and retinoblastoma.

Example 78': The method of Example 74', the malignant tumor being caused by a cancer.

Example 79': The method of Example 78', the cancer being selected from the group consisting of breast cancer, cervical cancer, colon cancer, rectal cancer, colorectal cancer, endometrial cancer, kidney cancer, lip cancer, oral cancer, ovarian cancer, testicular cancer, melanoma, non-melanoma skin cancer, mesothelioma, non-small cell lung cancer, small cell lung cancer, pancreatic cancer, prostate cancer, bone cancer, liver cancer, and thyroid cancer.

Example 80': The method of Example 78', the high molecular iodine concentration composition or pharmaceutical formulation being administered by intrapleural irrigation to the subject, and the subject being suffering from epithelial or biphasic mesothelioma.

Example 81': The method of Example 78', the high molecular iodine concentration composition or pharmaceutical formulation being administered by esophageal lavage or esophageal washout to a subject undergoing esophageal resection.

Example 82': The method of Example 70', the high molecular iodine concentration composition or pharmaceutical formulation being administered by pleural lavage to a subject undergoing complete resection or pleural reductive surgery for thymoma.

Example 83': The method of Example 68', the high molecular iodine concentration composition or pharmaceutical formulation being administered post-surgery as a post-operative rinse to a subject following primary functional endoscopic sinus surgery.

Example 84': The method of Example 68', the high molecular iodine concentration composition or pharmaceutical formulation being administered to a surgical site by lavage to prevent surgical site infection (SSI) following a surgery.

Example 85': The method of Example 84', the surgery being a spinal surgery.

Example 86': The method of any one of Examples 68', 74', 75', 78', and 79', the high molecular iodine concentration composition or pharmaceutical formulation being administered during a surgery as a whole colon washout to prevent anastomotic recurrence after colonic resection for colorectal cancer.

Example 87': Method of making a high molecular iodine concentration solution comprising:
dissolving molecular iodine into an absolute ethanol to form an iodine-ethanol mixture, combining the molecular iodine-ethanol mixture with a glycerin to form an iodine-ethanol-glycerin mixture having a final concentration of 1,500 ppm of molecular iodine, and
mixing the iodine-ethanol-glycerin mixture until the mixture becomes a homogenous solution.

Example 88': The method of Example 87', wherein the iodine-ethanol mixture has a concentration of about 0.19 gm/ml.

Example 89': The method of Example 87', wherein the iodine-ethanol mixture is added dropwise into the glycerin.

Example 90': The method of Example 89', wherein the molecular iodine is added dropwise over a period of about twenty minutes.

Example 91': The method of Example 87', wherein the iodine-ethanol-glycerin mixture is mixed for about forty-five minutes.

Example 92': The method of Example 87', wherein the high molecular iodine concentration solution does not exhibit molecular iodine loss at room temperature for at least three months.

Example 93': The method of Example 87', wherein the high molecular iodine concentration solution does not exhibit molecular iodine loss at room temperature for at least a year Example 94': The method of Example 87', wherein the high molecular iodine concentration solution does not exhibit molecular iodine loss at room temperature for 480 days.

Example 95': Method of making a high molecular iodine concentration solution comprising:
dissolving molecular iodine into a propylene glycol to from an iodine concentrate having a molecular iodine concentration of about 100,000 ppm (w/v),
diluting the molecular iodine with an organic carrier selected from the group consisting pure glycerin, pure propylene glycol, propylene glycol with 10% citric acid, propylene glycol with 5% citric acid, and propylene glycol with 1% citric acid to form high molecular iodine concentration solution having a final concentration of 1,500 ppm of molecular iodine.

Example 96': The method of Example 95', wherein the organic carrier is pure glycerin.

What is claimed is:

1. A non-aqueous high molecular iodine concentration solution comprising:
molecular iodine having a concentration of about 1,500 ppm by wt/v,
glycerin having a concentration of about 99% wt of the total weight of the solution, and
ethanol having a concentration of about 0.1% to about 1% of the total weight of the solution, wherein the non-aqueous high molecular iodine concentration solution remains stable after 480 days at room temperature.

2. The solution of claim 1, wherein the solution is complexed iodine free.

3. The solution of claim 1, wherein the solution is substantially complexed iodine-free.

4. The solution of claim 1, wherein the molecular iodine concentration is at least 99% of all iodine species in the solution.

5. The solution of claim 1, wherein the solution is biostatic persistent.

6. The solution of claim 1, wherein the solution is biocidal persistent.

7. A high molecular iodine concentration composition comprising:

molecular iodine having a concentration of about 1,400 ppm to about 150,000 ppm, about 1,400 ppm to about 100,000 ppm, about 1,400 ppm to about 68,000 ppm, about 1,400 ppm to about 66,000 ppm, about 1,400 ppm to about 60,000 ppm, about 1,400 ppm to about 55,000 ppm, about 1,400 ppm to about 50,000 ppm, about 1,400 ppm to about 45,000 ppm, about 1,400 ppm to about 40,000 ppm, about 1,400 ppm to about 35,000 ppm, about 1,400 ppm to about 30,000 ppm, about 1,400 ppm to about 25,000 ppm, about 1,400 ppm to about 20,000 ppm, about 1,400 ppm to about 15,200 ppm, about 1,400 ppm to about 15,000 ppm, about 1,400 ppm to about 10,000 ppm, about 1,400 ppm to about 8,703 ppm, about 1,400 ppm to about 8,000 ppm, about 1,400 ppm to about 5,000 ppm, about 1,400 ppm to about 4,077 ppm, about 1,400 ppm to about 2,000 ppm, about 1,400 ppm to about 1,700 ppm, about 1,274 ppm to about 150,000 ppm, about 1,274 ppm to about 100,000 ppm, about 1,274 ppm to about 68,000 ppm, about 1,274 ppm to about 66,000 ppm, about 1,274 ppm to about 60,000 ppm, about 1,274 ppm to about 55,000 ppm, about 1,274 ppm to about 50,000 ppm, about 1,274 ppm to about 45,000 ppm, about 1,274 ppm to about 40,000 ppm, about 1,274 ppm to about 35,000 ppm, about 1,274 ppm to about 30,000 ppm, about 1,274 ppm to about 25,000 ppm, about 1,274 ppm to about 20,000 ppm, about 1,274 ppm to about 15,200 ppm, about 1,274 ppm to about 15,000 ppm, about 1,274 ppm to about 10,000 ppm, about 1,274 ppm to about 8,703 ppm, about 1,274 ppm to about 8,000 ppm, about 1,274 ppm to about 5,000 ppm, about 1,400 ppm to about 4,077 ppm, about 1,274 ppm to about 2,000 ppm, about 1,274 ppm to about 1,700 ppm, about 1,500 ppm, about 2,000 ppm, about 4,077 ppm, about 4,100 ppm, about 8,200 ppm, about 8,703 ppm, about 15,200 ppm, about 16,500 ppm, or about 33,000 ppm by wt/v;

an organic carrier having a concentration of no less than about 93.5% wt, no less than about 95% wt, no less than about 98% wt, or no less than about 99% wt of the total weight of the high molecular iodine concentration composition;

the organic carrier being selected from the group consisting of glycerin, propylene glycol, and combinations thereof; and ethanol having a concentration of about 0.1% to about 1% of the total weight of the solution, wherein the high molecular iodine concentration composition remains stable after 480 days at room temperature.

8. A method of killing or inhibiting the growth of a parasite and/or a microorganism on or in a subject comprising administering a therapeutically effective amount or a prophylactically effective amount of the high molecular iodine concentration composition of claim 7 to the subject.

9. A method of killing or inhibiting the growth of a parasite and/or a microorganism on or in a subject comprising administering a therapeutically effective amount or a prophylactically effective amount of the non-aqueous high molecular iodine concentration solution of claim 1 to the subject.

* * * * *